US012112435B1

(12) United States Patent
Bhushan et al.

(10) Patent No.: US 12,112,435 B1
(45) Date of Patent: Oct. 8, 2024

(54) COLLABORATION SPACES IN EXTENDED REALITY CONFERENCE SESSIONS

(71) Applicant: SPLUNK INC., San Francisco, CA (US)

(72) Inventors: Devin Bhushan, San Jose, CA (US); Caelin Thomas Jackson-King, Santa Clara, CA (US); Stanislav Yazhenskikh, Santa Clara, CA (US); Jim Jiaming Zhu, Scarborough (CA)

(73) Assignee: SPLUNK INC., San Francisco, CA (US)

( * ) Notice: Subject to any disclaimer, the term of this patent is extended or adjusted under 35 U.S.C. 154(b) by 0 days.

(21) Appl. No.: 17/246,434

(22) Filed: Apr. 30, 2021

Related U.S. Application Data

(60) Provisional application No. 63/158,303, filed on Mar. 8, 2021, provisional application No. 63/157,527, filed
(Continued)

(51) Int. Cl.
*G06T 19/00* (2011.01)
*G06T 7/13* (2017.01)
(Continued)

(52) U.S. Cl.
CPC .............. *G06T 19/006* (2013.01); *G06T 7/13* (2017.01); *G06T 17/20* (2013.01); *G06V 10/44* (2022.01);
(Continued)

(58) Field of Classification Search
CPC ......... G06T 19/006; G06T 17/20; G06T 7/13; G06T 2200/24; G06T 2219/024;
(Continued)

(56) References Cited

U.S. PATENT DOCUMENTS

| 6,434,278 B1 | 8/2002 | Hashimoto |
| 7,937,344 B2 | 5/2011 | Baum et al. |

(Continued)

FOREIGN PATENT DOCUMENTS

| EP | 3 343 516 A1 | 7/2018 | |
| WO | WO-2018222188 A1 * | 12/2018 | ........... G06Q 10/101 |

OTHER PUBLICATIONS

Splunk Enterprise 8.0.0 Overview, available online, retrieved May 20, 2020 from docs.splunk.com.
(Continued)

*Primary Examiner* — Michelle Chin
(74) *Attorney, Agent, or Firm* — Artegis Law Group, LLP

(57) ABSTRACT

Extended reality (XR) software application programs establish remote collaboration sessions in which a host device and one or more remote devices can interact. When initiating a remote collaboration session, an XR application in a host device determines a collaboration area. The collaboration area corresponds to a portion of a real-world environment that is shared by the host device with the one or more remote devices. In some embodiments, the collaboration area can be determined automatically and/or based on user input. The XR application causes sensors associated with the host device to scan the collaboration area. Then, the XR application transmits, to the one or more remote devices, a three-dimensional representation of the collaboration area for rendering in one or more remote XR environments.

20 Claims, 37 Drawing Sheets

Related U.S. Application Data on Mar. 5, 2021, provisional application No. 63/154,605, filed on Feb. 26, 2021, provisional application No. 63/151,031, filed on Feb. 18, 2021.

(51) Int. Cl.
| | |
|---|---|
| *G06T 17/20* | (2006.01) |
| *G06V 10/44* | (2022.01) |
| *H04L 65/1069* | (2022.01) |
| *H04L 65/403* | (2022.01) |
| *H04N 7/15* | (2006.01) |

(52) U.S. Cl.
CPC ........ *H04L 65/1069* (2013.01); *H04L 65/403* (2013.01); *H04N 7/157* (2013.01); *G06T 2200/24* (2013.01); *G06T 2219/024* (2013.01)

(58) Field of Classification Search
CPC ... G06V 10/44; H04L 65/1069; H04L 65/403; H04N 7/157
See application file for complete search history.

(56) References Cited

U.S. PATENT DOCUMENTS

| | | | |
|---|---|---|---|
| 8,112,425 | B2 | 2/2012 | Baum et al. |
| 8,751,529 | B2 | 6/2014 | Zhang et al. |
| 8,788,525 | B2 | 7/2014 | Neels et al. |
| 9,171,402 | B1 | 10/2015 | Allen et al. |
| 9,215,240 | B2 | 12/2015 | Merza et al. |
| 9,286,413 | B1 | 3/2016 | Coates et al. |
| 10,127,258 | B2 | 11/2018 | Lamas et al. |
| 11,127,223 | B1 | 9/2021 | Bhushan et al. |
| 2005/0128210 | A1 | 6/2005 | Berger |
| 2007/0025624 | A1 | 2/2007 | Baumberg |
| 2007/0177583 | A1 | 8/2007 | Vernal et al. |
| 2008/0246765 | A1 | 10/2008 | Grenfell |
| 2009/0244065 | A1 | 10/2009 | Storti et al. |
| 2011/0102460 | A1 | 5/2011 | Parker |
| 2013/0162633 | A1 | 6/2013 | Berger et al. |
| 2014/0063024 | A1 | 3/2014 | Zhang et al. |
| 2014/0204077 | A1 | 7/2014 | Kamuda et al. |
| 2014/0343909 | A1 | 11/2014 | Guerillot |
| 2014/0354685 | A1 | 12/2014 | Lazarow et al. |
| 2015/0243069 | A1 | 8/2015 | Knoblauch et al. |
| 2016/0148433 | A1 | 5/2016 | Petrovskaya et al. |
| 2016/0300385 | A1 | 10/2016 | Bell et al. |
| 2016/0364907 | A1 | 12/2016 | Schoenberg |
| 2017/0024930 | A1 | 1/2017 | Chuang et al. |
| 2018/0115877 | A1* | 4/2018 | Riker .................. H04L 51/066 |
| 2019/0098106 | A1 | 3/2019 | Mungel et al. |
| 2019/0197774 | A1 | 6/2019 | Molyneaux et al. |
| 2019/0369836 | A1* | 12/2019 | Faulkner ............. G06F 3/04845 |
| 2019/0372060 | A1 | 12/2019 | Li et al. |
| 2020/0066044 | A1* | 2/2020 | Stahl ..................... G06V 20/20 |
| 2020/0066045 | A1* | 2/2020 | Stahl ..................... G06T 19/20 |
| 2020/0098173 | A1 | 3/2020 | McCall |
| 2020/0105068 | A1* | 4/2020 | Panse ................... G06T 19/006 |
| 2020/0134911 | A1* | 4/2020 | van Hoff ................ G06T 7/292 |
| 2021/0090301 | A1 | 3/2021 | Mammou et al. |

OTHER PUBLICATIONS

Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carraso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.
International Search Report for Application No. PCT/US2022/016955 dated Apr. 5, 2022.
International Search Report for Application No. PCT/US2022/016950 dated Apr. 8, 2022.
Mossel et al., "Streaming and Exploration of Dynamically Changing Dense 3D Reconstructions in Immersive Virtual Reality", 2016 IEEE International Symposium on Mixed and Augmented Reality, DOI: 10.1109/ISMAR-ADJUNCT.2016.0035, Sep. 19, 2016, pp. 43-48.
Yang et al., "Learning Object Bounding Boxes for 3D Instance Segmentation on Point Clouds", NEURIPS 2019, 33rd Conference on Neural Information Processing Systems Dec. 8, 2019, 10 pages.
International Search Report for Application No. PCT/US2022/016957 dated Jun. 7, 2022.
Li et al., "3D Reconstruction and Texture Optimization Using a Sparse Set of RGB-D Cameras", 2019 IEEE Winter Conference on Applications of Computer Vision, DOI 10.1109/WACV.2019.00155, Jan. 7, 2019, pp. 1413-1422.
Hou et al., "Optimized Method for Real-time Texture Reconstruction with RGB-D Camera", DOI 10.1007/sl2209-017-0069-7, vol. 23, No. 5, 2017, pp. 493-500.
First Action Interview Office Action received for U.S. Appl. No. 17/246,423 dated Nov. 16, 2022, 7 pages.
Non Final Office Action received for U.S. Appl. No. 17/515,321 dated Feb. 3, 2023, 26 pages.
Notice of Allowance received for U.S. Appl. No. 17/515,345 dated Mar. 22, 2023, 17 pages.
Non Final Office Action received for U.S. Appl. No. 17/515,325 dated Feb. 17, 2023, 38 pages.
Final Office Action received for U.S. Appl. No. 17/246,423 dated Mar. 14, 2023, 55 pages.
Non Final Office Action received for U.S. Appl. No. 17/515,320 dated Feb. 3, 2023, 31 pages.
Non Final Office Action received for U.S. Appl. No. 17/515,345 dated Sep. 15, 2022, 22 pages.
Pre-Interview First Office Action received for U.S. Appl. No. 17/246,423 dated Oct. 5, 2022, 20 pages.
Advisory Action for U.S. Appl. No. 17/246,423, dated May 10, 2023, 4 pages.
Non Final Office Action received for U.S. Appl. No. 17/246,423 dated Jul. 7, 2023, 57 pages.
Notice of Allowance received for U.S. Appl. No. 17/515,345 dated Jul. 7, 2023, 12 pages.
Non Final Office Action received for U.S. Appl. No. 17/515,320 dated Sep. 6, 2023, 34 pages.
Advisory Action received for U.S. Appl. No. 17/515,321, dated Mar. 21, 2024, 8 pages.
Notice of Allowance received for U.S. Appl. No. 17/246,423 dated Oct. 20, 2023, 17 pages.
Final Office Action received for U.S. Appl. No. 17/515,325 dated Nov. 21, 2023, 27 pages.
Final Office Action received for U.S. Appl. No. 17/515,321 dated Dec. 13, 2023, 42 pages.
Notice of Allowance received for U.S. Appl. No. 17/515,325 dated May 14, 2024, 9 pages.
Final Office Action received for U.S. Appl. No. 17/515,320 dated Jun. 21, 2024, 42 pages.
Notice of Allowance received for U.S. Appl. No. 17/515,321, dated Jun. 10, 2024, 5 pages.

* cited by examiner

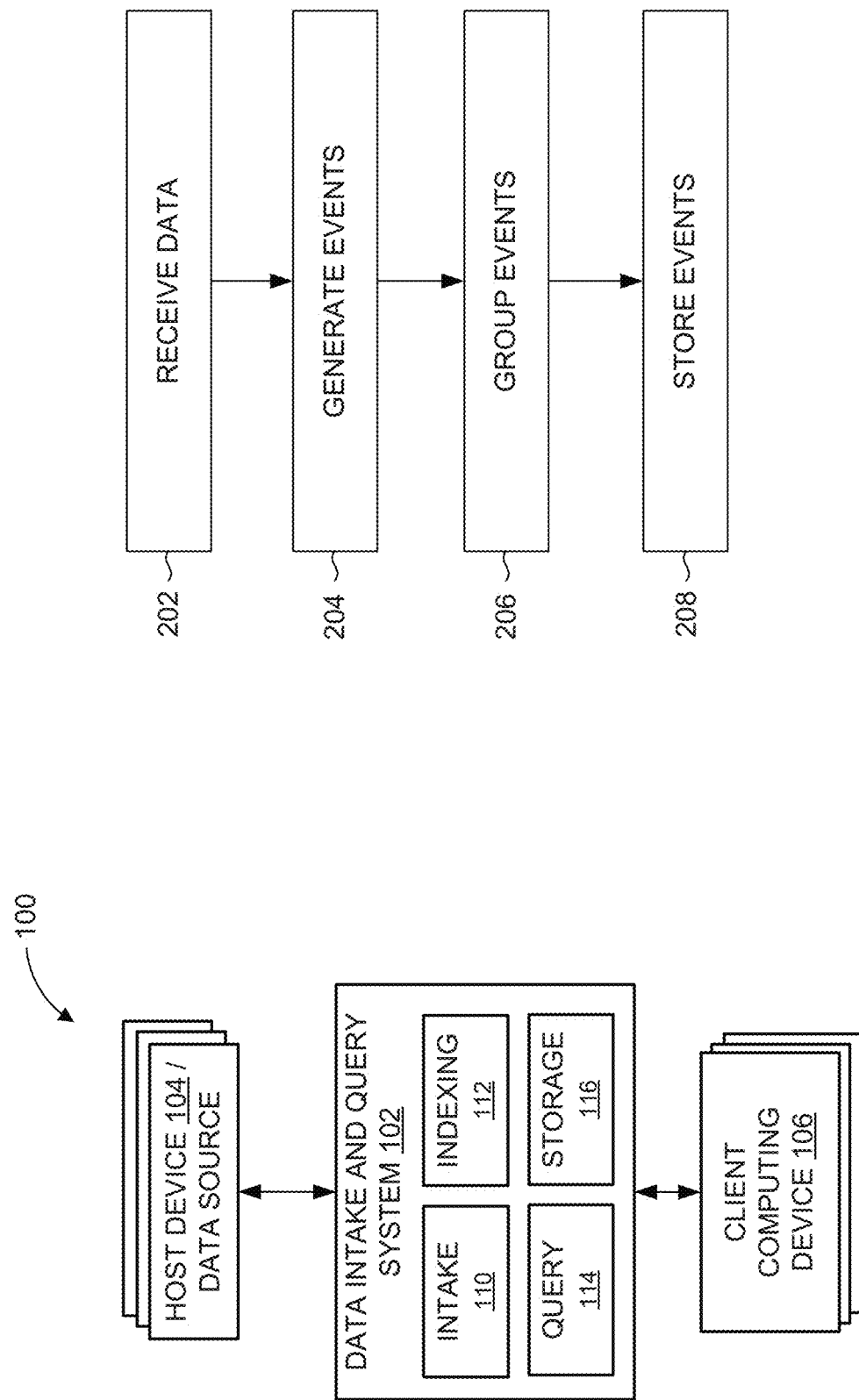

⎯ 302

⎯ 302A 127.0.0.1 -- eva [10/Oct/2000:13:55:36-0700] "GET/apache.gif HTTP/1.0" 200  2326  0.0947
127.0.0.1 -- emerson [10/Oct/2000:13:56:36-0700] "GET/eastwood.gif HTTP/1.0" 200 2980 0.0899
⎯ 302C   ⎯302B
127.0.0.3 -- eliza [10/Oct/2000:13:57:36-0700] "GET/ezra.gif HTTP/1.0" 200 2900 0.0857
[Sunday Oct 10 1:58:33 2010] [error] [client 127.10.1.1.015] File does not exist: /home/emmeline/pub_html/images/alisia.gif   ⎯302D
⎯302E
91.205.189.15 - - [28/Apr/2014:18:22:16] "GET /oldlink?itemId=EST-14&JSESSIONID=SD6SL7FF7ADFF53113 HTTP 1.1" 200 1665 "http://www.buttercupgames.com/oldlink?itemId=EST-14" "Mozilla/5.0 (Windwos NT 6.1; WOW 64) AppleWebKit/536.5 (KHTML, like Gecko) Chrome/19.0.1084.46 Safari/536.5" 159

⎯ 304

```
docker: {
        container_id: f7360a148a670c4c257f4ee024be81284b6017d72ae41ea8ee5d
}
kubernetes: {                             ⎯304A
        container_name: kube-apiserver
        host: ip-172-20-43-173.ec2.internal
        labels: {
          k8s-app: kube-apiserver
        }
master_url: https://100.64.0.1:443/api
namespace_id: e5af26aa-4ef9-11e8-a4e1-0a2bf2ab4bba
namespace_name: kube-system
pod_id: 0a73017b-4efa-11e8-a4e1-0a2bf2ab4bba
pod_name: kube-apiserver-ip-172-20-43-173.ec2.internal       ⎯304B
}
  log: I0503 23:04:12.595203     1 wrap.go:42] GET /apis/admissionregistrations.k8s.io/v1beta1/validatingwebhookconfiguration 200 [[kube-apiserver/v1.9.3 (linux/amd64) kubernetes/d283541] 127.0.0.1:55026 stream: stdout
time: 2018-05-03T23:04:12.619948395Z
}
```

⎯ 306

| time | ID | CPU | memory |
|---|---|---|---|
| 10/10/00 12:01:00.013 | eliza | 14% | 80% |
| 10/10/00 12:01:05.153 | eva | 26% | 70% |

FIG. 3A

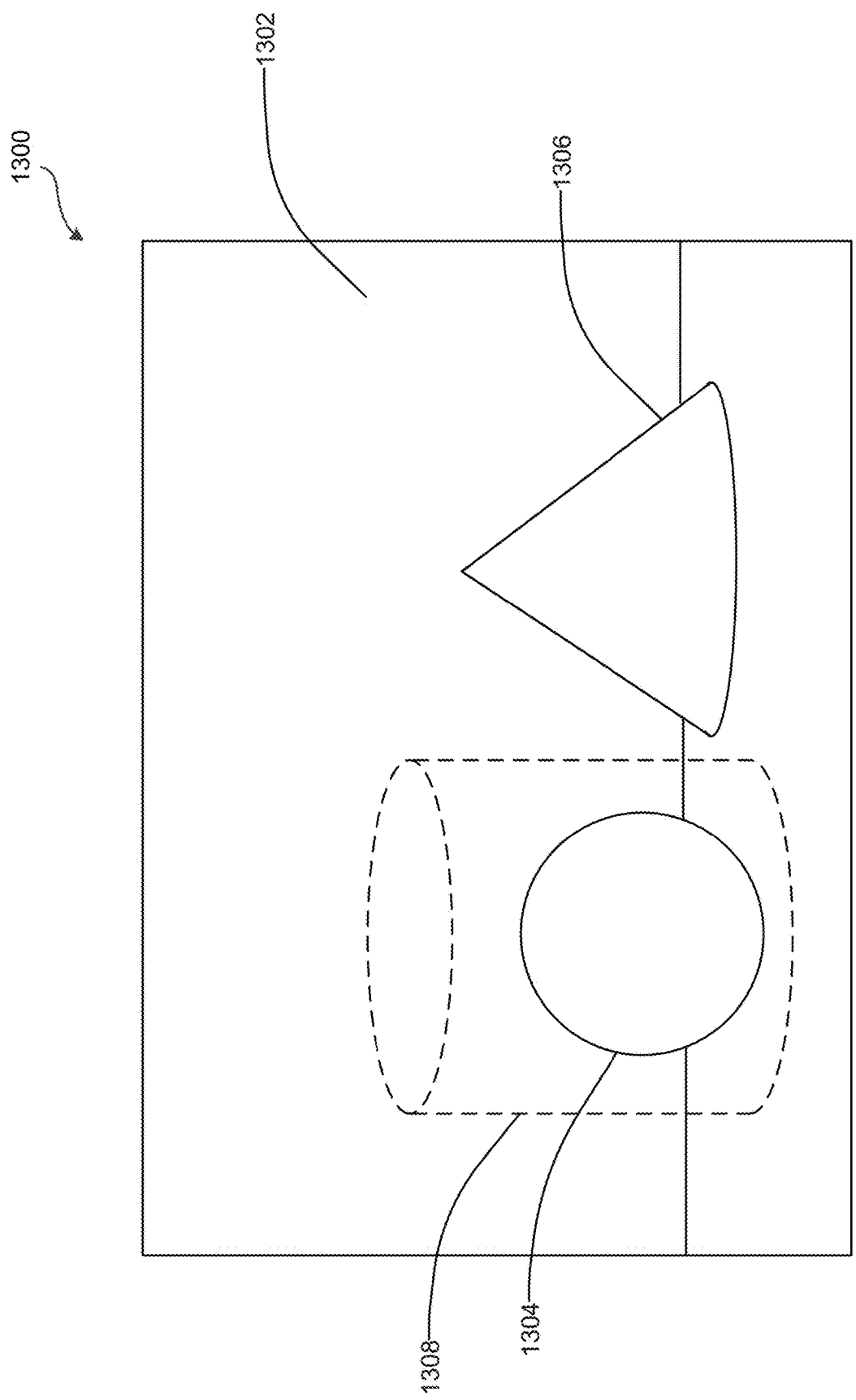

COLLABORATION SPACES IN EXTENDED REALITY CONFERENCE SESSIONS

RELATED APPLICATIONS

Any and all applications for which a foreign or domestic priority claim is identified in the Application Data Sheet as filed with the present application are incorporated by reference under 37 CFR 1.57 and made a part of this specification.

This application claims the priority benefit of United States provisional patent applications titled "Live Updates in Network Remote Collaboration," filed Feb. 18, 2021, and having Ser. No. 63/151,031; "Techniques for Live Updates in Network Remote Collaboration," filed Mar. 5, 2021, and having Ser. No. 63/157,527; "Collaboration Space Selection in Networked Remote Collaboration," filed Feb. 26, 2021, and having Ser. No. 63/154,605; and "Updating Devices in a Remote Collaboration Session," filed Mar. 8, 2021, and having Ser. No. 63/158,303. The subject matter of these related applications is hereby incorporated herein by reference.

BACKGROUND

Many information technology (IT) environments enable the access of massive quantities of diverse data stored across multiple data sources. For example, an IT environment could enable users to access text documents, user-generated data stored in a variety of relational database management systems, and machine-generated data stored in systems, such as SPLUNK® ENTERPRISE systems. While the availability of massive quantities of diverse data provides opportunities to derive new insights that increase the usefulness and value of IT systems, a common problem associated with IT environments is that curating, searching, and analyzing the data is quite technically challenging.

In particular, multiple users can have difficulty sharing real-world environments remotely. Various conventional approaches enable one user to capture three-dimensional (3D) data associated with a real-world environment and share a stream of the 3D data with remote participants who are using remote devices. However, the 3D data that is captured can include data associated with portions of the real-world environment that the user does not wish to share with the remote participants.

As the foregoing illustrates, what is needed in the art are more efficient techniques for sharing a real-world environment remotely.

BRIEF DESCRIPTION OF THE DRAWINGS

So that the manner in which the above recited features of the invention can be understood in detail, a more particular description of the invention may be had by reference to implementations, some of which are illustrated in the appended drawings. It is to be noted, however, that the appended drawings illustrate only typical implementations of this invention and are therefore not to be considered limiting of its scope, for the invention may admit to other equally effective implementations.

The present disclosure is illustrated by way of example, and not limitation, in the figures of the accompanying drawings, in which like reference numerals indicate similar elements and in which:

FIG. 1 is a block diagram of an embodiment of a data processing environment.

FIG. 2 is a flow diagram illustrating an embodiment of a routine implemented by the data intake and query system to process, index, and store data.

FIG. 3A is a block diagram illustrating an embodiment of machine data received by the data intake and query system.

FIGS. 13A-13C illustrate example collaboration areas in remote collaboration sessions, in accordance with example implementations

DETAILED DESCRIPTION

Figure 3B:
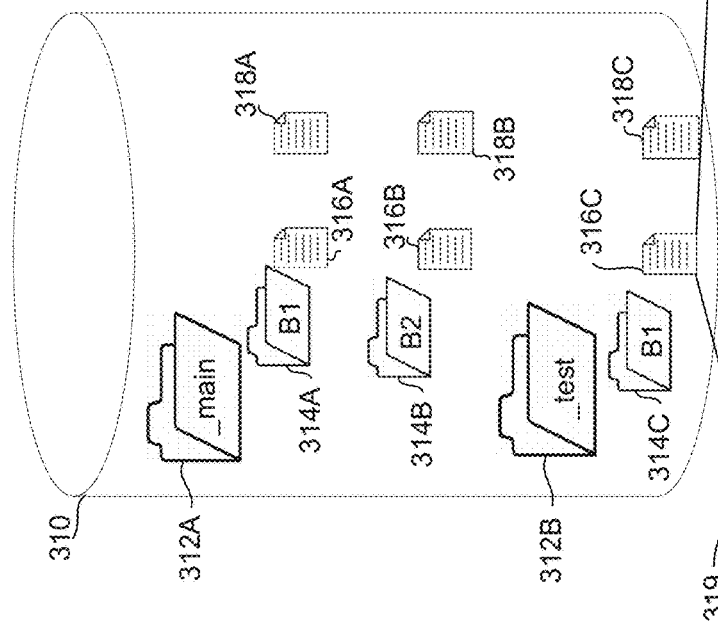
FIGS. 3B and 3C are block diagrams illustrating embodiments of various data structures for storing data processed by the data intake and query system.

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that concurrently report these types of information.

These challenges can be addressed by using an event-based data intake and query system, such as the SPLUNK® ENTERPRISE, SPLUNK® CLOUD, or SPLUNK® CLOUD SERVICE system developed by Splunk Inc. of San Francisco, California. These systems represent the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, metrics data, tracing data, and other data input sources.

In the data intake and query system, machine data is collected and stored as "events." An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp. The time stamp may be derived from the portion of machine data in the event, determined through interpolation between temporally proximate events having known timestamps, and/or may be determined based on other configurable rules for associating timestamps with events.

In some instances, machine data can have a predefined structure, where data items with specific data formats are stored at predefined locations in the data. For example, the machine data may include data associated with fields in a database table. In other instances, machine data may not have a predefined structure (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system can use flexible schema to specify how to extract information from events. A flexible schema may be developed and redefined as needed. The flexible schema can be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp, and stores the events. The system enables users to run queries against the stored events to, for example, retrieve events that meet filter criteria specified in a query, such as criteria indicating certain keywords or having specific values in defined fields. Additional query terms can further process the event data, such as, by transforming the data, etc.

As used herein, the term "field" can refer to a location in the machine data of an event containing one or more values for a specific data item. A field may be referenced by a field name associated with the field. As will be described in more detail herein, in some cases, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file can include one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source-type. When events are to be searched based on a particular field name specified in a search, the system can use one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system can utilize a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from machine data or events. In some cases, an extraction rule comprises a regular expression, where a sequence of characters form a search pattern. An extraction rule comprising a regular expression is referred to herein as a regex rule. The system applies a regex rule to machine data or an event to extract values for a field associated with the regex rule, where the values are extracted by searching the machine data/event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources.

In some embodiments, the configuration files and/or extraction rules described above can be stored in a catalog, such as a metadata catalog. In certain embodiments, the content of the extraction rules can be stored as rules or actions in the metadata catalog. For example, the identification of the data to which the extraction rule applies can be referred to a rule and the processing of the data can be referred to as an action.

1.0. Operating Environment

FIG. 1 is a block diagram of an embodiment of a data processing environment 100. In the illustrated embodiment, the environment 100 includes a data intake and query system 102, one or more host devices 104, and one or more client computing devices 106 (generically referred to as client device(s) 106).

The data intake and query system 102, host devices 104, and client devices 106 can communicate with each other via one or more networks, such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 1, it will be understood that a client computing device 106 can communicate with a host device 104 via one or more networks. For example, if the host device 104 is configured as a web server and the client computing device 106 is a laptop, the laptop can communicate with the web server to view a website.

A client device 106 can correspond to a distinct computing device that can configure, manage, or sends queries to the system 102. Examples of client devices 106 may include, without limitation, smart phones, tablet computers, handheld computers, wearable devices, laptop computers, desktop computers, servers, portable media players, gaming devices, or other device that includes computer hardware (e.g., processors, non-transitory, computer-readable media, etc.) and so forth. In certain cases, a client device 106 can include a hosted, virtualized, or containerized device, such as an isolated execution environment, that shares computing resources (e.g., processor, memory, etc.) of a particular machine with other isolated execution environments.

The client devices 106 can interact with the system 102 (or a host device 104) in a variety of ways. For example, the client devices 106 can communicate with the system 102 (or a host device 104) over an Internet (Web) protocol, via a gateway, via a command line interface, via a software developer kit (SDK), a standalone application, etc. As another example, the client devices 106 can use one or more executable applications or programs to interface with the system 102.

A host device 104 can correspond to a distinct computing device or system that includes or has access to data that can be ingested, indexed, and/or searched by the system 102. Accordingly, in some cases, a client device 106 may also be a host device 104 (e.g., it can include data that is ingested by the system 102 and it can submit queries to the system 102). The host devices 104 can include, but are not limited to, servers, sensors, routers, personal computers, mobile devices, internet of things (IoT) devices, or hosting devices, such as computing devices in a shared computing resource environment on which multiple isolated execution environment (e.g., virtual machines, containers, etc.) can be instantiated, or other computing devices in an IT environment (e.g., device that includes computer hardware, e.g., processors, non-transitory, computer-readable media, etc.). In certain cases, a host device 104 can include a hosted, virtualized, or containerized device, such as an isolated execution environment, that shares computing resources (e.g., processor, memory, etc.) of a particular machine (e.g., a hosting device or hosting machine) with other isolated execution environments.

As mentioned host devices 104 can include or have access to data sources for the system 102. The data sources can include machine data found in log files, data files, distributed file systems, streaming data, publication-subscribe (pub/sub) buffers, directories of files, data sent over a network, event logs, registries, streaming data services (examples of which can include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud PubSub, devices implementing the Java Message Service (JMS) protocol, devices implementing the Advanced Message Queuing Protocol (AMQP)), cloud-based services (e.g., AWS, Microsoft Azure, Google Cloud, etc.), operating-system-level virtualization environments (e.g., Docker), container orchestration systems (e.g., Kubernetes), virtual machines using full virtualization or paravirtualization, or other virtualization technique or isolated execution environments.

In some cases, one or more applications executing on a host device may generate various types of machine data during operation. For example, a web server application executing on a host device 104 may generate one or more web server logs detailing interactions between the web server and any number of client devices 106 or other devices. As another example, a host device 104 implemented as a router may generate one or more router logs that record information related to network traffic managed by the router. As yet another example, a database server application executing on a host device 104 may generate one or more logs that record information related to requests sent from other devices (e.g., web servers, application servers, client devices, etc.) for data managed by the database server. Similarly, a host device 104 may generate and/or store computing resource utilization metrics, such as, but not limited to, CPU utilization, memory utilization, number of processes being executed, etc. Any one or any combination of the files or data generated in such cases can be used as a data source for the system 102.

In some embodiments, an application may include a monitoring component that facilitates generating performance data related to host device's operating state, including monitoring network traffic sent and received from the host device and collecting other device and/or application-specific information. A monitoring component may be an integrated component of the application, a plug-in, an extension, or any other type of add-on component, or a standalone process.

Such monitored information may include, but is not limited to, network performance data (e.g., a URL requested, a connection type (e.g., HTTP, HTTPS, etc.), a connection start time, a connection end time, an HTTP status code, request length, response length, request headers, response headers, connection status (e.g., completion, response time(s), failure, etc.)) or device performance information (e.g., current wireless signal strength of the device, a current connection type and network carrier, current memory performance information, processor utilization, memory utilization, a geographic location of the device, a device orientation, and any other information related to the operational state of the host device, etc.), device profile information (e.g., a type of client device, a manufacturer, and model of the device, versions of various software applications installed on the device, etc.) In some cases, the monitoring component can collect device performance information by monitoring one or more host device operations, or by making calls to an operating system and/or one or more other applications executing on a host device for performance information. The monitored information may be stored in one or more files and/or streamed to the system 102

In general, a monitoring component may be configured to generate performance data in response to a monitor trigger in the code of a client application or other triggering application event, as described above, and to store the performance data in one or more data records. Each data record, for example, may include a collection of field-value pairs, each field-value pair storing a particular item of performance data in association with a field for the item. For example, a data record generated by a monitoring component may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

In some embodiments, such as in a shared computing resource environment (or hosted environment), a host device 104 may include logs or machine data generated by an application executing within an isolated execution environment (e.g., web server log file if the isolated execution environment is configured as a web server or database server log files if the isolated execution environment is configured as database server, etc.), machine data associated with the computing resources assigned to the isolated execution environment (e.g., CPU utilization of the portion of the CPU allocated to the isolated execution environment, memory utilization of the portion of the memory allocated to the isolated execution environment, etc.), logs or machine data generated by an application that enables the isolated execution environment to share resources with other isolated execution environments (e.g., logs generated by a Docker manager or Kubernetes manager executing on the host device 104), and/or machine data generated by monitoring the computing resources of the host device 104 (e.g., CPU utilization, memory utilization, etc.) that are shared between the isolated execution environments. Given the separation (and isolation) between isolated execution environments executing on a common computing device, in certain embodiments, each isolated execution environment may be treated as a separate host device 104 even if they are, in fact, executing on the same computing device or hosting device Accordingly, as used herein, obtaining data from a data source may refer to communicating with a host device 104 to obtain data from the host device 104 (e.g, from one or more data source files, data streams, directories on the host device 104, etc.). For example, obtaining data from a data source may refer to requesting data from a host device 104 and/or receiving data from a host device 104. In some such cases, the host device 104 can retrieve and return the requested data from a particular data source and/or the system 102 can retrieve the data from a particular data source of the host device 104 (e.g., from a particular file stored on a host device 104).

The data intake and query system 102 can ingest, index, and/or store data from heterogeneous data sources and/or host devices 104. For example, the system 102 can ingest, index, and/or store any type of machine data, regardless of the form of the machine data or whether the machine data matches or is similar to other machine data ingested, indexed, and/or stored by the system 102. In some cases, the system 102 can generate events from the received data, group the events, and store the events in buckets. The system 102 can also search heterogeneous data that it has stored or search data stored by other systems (e.g., other system 102 systems or other non-system 102 systems). For example, in response to received queries, the system 102 can assign one or more components to search events stored in the storage system or search data stored elsewhere.

As will be described herein in greater detail below, the system 102 can use one or more components to ingest, index, store, and/or search data. In some embodiments, the system 102 is implemented as a distributed system that uses multiple components to perform its various functions. For example, the system 102 can include any one or any combination of an intake system 110 (including one or more components) to ingest data, an indexing system 112 (including one or more components) to index the data, a storage system 116 (including one or more components) to store the data, and/or a query system 114 (including one or more components) to search the data, etc.

In the illustrated embodiment, the system 102 is shown having four subsystems 110, 112, 114, 116. However, it will be understood that the system 102 may include any one or any combination of the intake system 110, indexing system 112, query system 114, or storage system 116. Further, in certain embodiments, one or more of the intake system 110, indexing system 112, query system 114, or storage system 116 may be used alone or apart from the system 102. For example, the intake system 110 may be used alone to glean information from streaming data that is not indexed or stored by the system 102, or the query system 114 may be used to search data that is unaffiliated with the system 102.

In certain embodiments, the components of the different systems may be distinct from each other or there may be some overlap. For example, one component of the system 102 may include some indexing functionality and some searching functionality and thus be used as part of the indexing system 112 and query system 114, while another computing device of the system 102 may only have ingesting or search functionality and only be used as part of those respective systems. Similarly, the components of the storage system 116 may include data stores of individual components of the indexing system and/or may be a separate shared data storage system, like Amazon S3, that is accessible to distinct components of the intake system 110, indexing system 112, and query system 114.

In some cases, the components of the system 102 are implemented as distinct computing devices having their own computer hardware (e.g., processors, non-transitory, computer-readable media, etc.) and/or as distinct hosted devices (e.g., isolated execution environments) that share computing resources or hardware in a shared computing resource environment.

For simplicity, references made herein to the intake system 110, indexing system 112, storage system 116, and query system 114 can refer to those components used for ingesting, indexing, storing, and searching, respectively. However, it will be understood that although reference is made to two separate systems, the same underlying component may be performing the functions for the two different systems. For example, reference to the indexing system indexing data and storing the data in the storage system 116 or the query system searching the data may refer to the same component (e.g., same computing device or hosted device) indexing the data, storing the data, and then searching the data that it stored.

As will be described in greater detail herein, the intake system 110 can receive data from the host devices 104 or data sources, perform one or more preliminary processing operations on the data, and communicate the data to the indexing system 112, query system 114, storage system 116, or to other systems (which may include, for example, data processing systems, telemetry systems, real-time analytics systems, data stores, databases, etc., any of which may be operated by an operator of the system 102 or a third party). Given the amount of data that can be ingested by the intake system 110, in some embodiments, the intake system can include multiple distributed computing devices or components working concurrently to ingest the data.

The intake system 110 can receive data from the host devices 104 in a variety of formats or structures. In some embodiments, the received data corresponds to raw machine data, structured or unstructured data, correlation data, data files, directories of files, data sent over a network, event logs, registries, messages published to streaming data sources, performance metrics, sensor data, image and video data, etc.

The preliminary processing operations performed by the intake system 110 can include, but is not limited to, associating metadata with the data received from a host device 104, extracting a timestamp from the data, identifying individual events within the data, extracting a subset of machine data for transmittal to the indexing system 112, enriching the data, etc. As part of communicating the data to the indexing system, the intake system 110 can route the data to a particular component of the intake system 110 or dynamically route the data based on load-balancing, etc. In certain cases, one or more components of the intake system 110 can be installed on a host device 104.

1.1 Indexing System Overview

As will be described in greater detail herein, the indexing system 112 can include one or more components (e.g., indexing nodes) to process the data and store it, for example, in the storage system 116. As part of processing the data, the indexing system can identify distinct events within the data, timestamps associated with the data, organize the data into buckets or time series buckets, convert editable buckets to non-editable buckets, store copies of the buckets in the storage system 116, merge buckets, generate indexes of the data, etc. In addition, the indexing system 112 can update various catalogs or databases with information related to the buckets (pre-merged or merged) or data that is stored in the storage system 116, and can communicate with the intake system 110 about the status of the data storage.

As will be described in greater detail herein, the query system 114 can include one or more components to receive, process, and execute queries. In some cases, the query system 114 can use the same component to process and execute the query or use one or more components to receive and process the query (e.g., a search head) and use one or more other components to execute at least a portion of the query (e.g., search nodes). In some cases, a search node and an indexing node may refer to the same computing device or hosted device performing different functions. In certain cases, a search node can be a separate computing device or hosted device from an indexing node.

Queries received by the query system 114 can be relatively complex and identify a set of data to be processed and a manner of processing the set of data from one or more client devices 106. In certain cases, the query can be implemented using a pipelined command language or other query language. As described herein, in some cases, the query system 114 can execute parts of the query in a distributed fashion (e.g., one or more mapping phases or parts associated with identifying and gathering the set of data identified in the query) and execute other parts of the query on a single component (e.g., one or more reduction phases). However, it will be understood that in some cases multiple components can be used in the map and/or reduce functions of the query execution.

In some cases, as part of executing the query, the query system 114 can use one or more catalogs or databases to identify the set of data to be processed or its location in the storage system 116 and/or can retrieve data from the storage system 116. In addition, in some embodiments, the query system 114 can store some or all of the query results in the storage system 116.

In some cases, the storage system 116 may include one or more data stores associated with or coupled to the components of the indexing system 112 that are accessible via a system bus or local area network. In certain embodiments, the storage system 116 may be a shared storage system 116, like Amazon S3 or Google Cloud Storage, that are accessible via a wide area network.

As mentioned and as will be described in greater detail below, the storage system 116 can be made up of one or more data stores storing data that has been processed by the indexing system 112. In some cases, the storage system includes data stores of the components of the indexing system 112 and/or query system 114. In certain embodiments, the storage system 116 can be implemented as a shared storage system 116. The shared storage system 116 can be configured to provide high availability, highly resilient, low loss data storage. In some cases, to provide the high availability, highly resilient, low loss data storage, the shared storage system 116 can store multiple copies of the data in the same and different geographic locations and across different types of data stores (e.g., solid state, hard drive, tape, etc.). Further, as data is received at the shared storage system 116 it can be automatically replicated multiple times according to a replication factor to different data stores across the same and/or different geographic locations. In some embodiments, the shared storage system 116 can correspond to cloud storage, such as Amazon Simple Storage Service (S3) or Elastic Block Storage (EBS), Google Cloud Storage, Microsoft Azure Storage, etc.

In some embodiments, indexing system 112 can read to and write from the shared storage system 116. For example, the indexing system 112 can copy buckets of data from its local or shared data stores to the shared storage system 116. In certain embodiments, the query system 114 can read from, but cannot write to, the shared storage system 116. For example, the query system 114 can read the buckets of data stored in shared storage system 116 by the indexing system 112, but may not be able to copy buckets or other data to the shared storage system 116. In some embodiments, the intake system 110 does not have access to the shared storage system 116. However, in some embodiments, one or more components of the intake system 110 can write data to the shared storage system 116 that can be read by the indexing system 112.

As described herein, in some embodiments, data in the system 102 (e.g., in the data stores of the components of the indexing system 112, shared storage system 116, or search nodes of the query system 114) can be stored in one or more time series buckets. Each bucket can include raw machine data associated with a timestamp and additional information about the data or bucket, such as, but not limited to, one or more filters, indexes (e.g., TSIDX, inverted indexes, keyword indexes, etc.), bucket summaries, etc. In some embodiments, the bucket data and information about the bucket data is stored in one or more files. For example, the raw machine data, filters, indexes, bucket summaries, etc. can be stored in respective files in or associated with a bucket. In certain cases, the group of files can be associated together to form the bucket.

The system 102 can include additional components that interact with any one or any combination of the intake system 110, indexing system 112, query system 114, and/or storage system 116. Such components may include, but are not limited to an authentication system, orchestration system, one or more catalogs or databases, a gateway, etc.

An authentication system can include one or more components to authenticate users to access, use, and/or configure the system 102. Similarly, the authentication system can be used to restrict what a particular user can do on the system 102 and/or what components or data a user can access, etc.

An orchestration system can include one or more components to manage and/or monitor the various components of the system 102. In some embodiments, the orchestration system can monitor the components of the system 102 to detect when one or more components has failed or is unavailable and enable the system 102 to recover from the failure (e.g., by adding additional components, fixing the failed component, or having other components complete the tasks assigned to the failed component). In certain cases, the orchestration system can determine when to add components to or remove components from a particular system 110, 112, 114, 116 (e.g., based on usage, user/tenant requests, etc.). In embodiments where the system 102 is implemented in a shared computing resource environment, the orchestration system can facilitate the creation and/or destruction of isolated execution environments or instances of the components of the system 102, etc.

In certain embodiments, the system 102 can include various components that enable it to provide stateless services or enable it to recover from an unavailable or unresponsive component without data loss in a time efficient manner. For example, the system 102 can store contextual information about its various components in a distributed way such that if one of the components becomes unresponsive or unavailable, the system 102 can replace the unavailable component with a different component and provide the replacement component with the contextual information. In this way, the system 102 can quickly recover from an unresponsive or unavailable component while reducing or eliminating the loss of data that was being processed by the unavailable component.

In some embodiments, the system 102 can store the contextual information in a catalog, as described herein. In certain embodiments, the contextual information can correspond to information that the system 102 has determined or learned based on use. In some cases, the contextual information can be stored as annotations (manual annotations and/or system annotations), as described herein.

In certain embodiments, the system 102 can include an additional catalog that monitors the location and storage of data in the storage system 116 to facilitate efficient access of the data during search time. In certain embodiments, such a catalog may form part of the storage system 116.

In some embodiments, the system 102 can include a gateway or other mechanism to interact with external devices or to facilitate communications between components of the system 102. In some embodiments, the gateway can be implemented using an application programming interface (API). In certain embodiments, the gateway can be implemented using a representational state transfer API (REST API).

In some environments, a user of a system 102 may install and configure, on computing devices owned and operated by the user, one or more software applications that implement some or all of the components of the system 102. For example, with reference to FIG. 1, a user may install a software application on server computers owned by the user and configure each server to operate as one or more components of the intake system 110, indexing system 112, query system 114, shared storage system 116, or other components of the system 102. This arrangement generally may be referred to as an "on-premises" solution. That is, the system 102 is installed and operates on computing devices directly controlled by the user of the system 102. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 102 operate.

In certain embodiments, one or more of the components of the system 102 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide a system 102 by managing computing resources configured to implement various aspects of the system (e.g, intake system 110, indexing system 112, query system 114, shared storage system 116, other components, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the system 102 execute can be shared by multiple customers or tenants as part of the shared computing resource environment. In addition, when implemented in a shared computing resource environment as a cloud-based service, various components of the system 102 can be implemented using containerization or operating-system-level virtualization, or other virtualization technique. For example, one or more components of the intake system 110, indexing system 112, or query system 114 can be implemented as separate software containers or container instances. Each container instance can have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from memory space of other containers. Further, each container may run the same or different computer applications concurrently or separately, and may interact with each other.

Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the system 102 in a shared computing resource environment can provide a number of benefits. In some cases, implementing the system 102 in a shared computing resource environment can make it easier to install, maintain, and update the components of the system 102. For example, rather than accessing designated hardware at a particular location to install or provide a component of the system 102, a component can be remotely instantiated or updated as desired. Similarly, implementing the system 102 in a shared computing resource environment or as a cloud-based service can make it easier to meet dynamic demand. For example, if the system 102 experiences significant load at indexing or search, additional compute resources can be deployed to process the additional data or queries. In an "on-premises" environment, this type of flexibility and scalability may not be possible or feasible.

In addition, by implementing the system 102 in a shared computing resource environment or as a cloud-based service can improve compute resource utilization. For example, in an on-premises environment if the designated compute resources are not being used by, they may sit idle and unused. In a shared computing resource environment, if the compute resources for a particular component are not being used, they can be re-allocated to other tasks within the system 102 and/or to other systems unrelated to the system 102.

As mentioned, in an on-premises environment, data from one instance of a system 102 is logically and physically separated from the data of another instance of a system 102 by virtue of each instance having its own designated hardware. As such, data from different customers of the system 102 is logically and physically separated from each other. In a shared computing resource environment, components of a system 102 can be configured to process the data from one customer or tenant or from multiple customers or tenants. Even in cases where a separate component of a system 102 is used for each customer, the underlying hardware on which the components of the system 102 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the system 102 can maintain logical separation between tenant data. For example, the system 102 can include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customer's A hard drive and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the system 102 can maintain the mutual exclusivity and/or independence between tenant data even as the tenant data is being processed, stored, and searched by the same underlying hardware. In certain cases, to maintain the mutual exclusivity and/or independence between the data of different tenants, the system 102 can use tenant identifiers to uniquely identify data associated with different tenants.

In a shared computing resource environment, some components of the system 102 can be instantiated and designated for individual tenants and other components can be shared by multiple tenants. In certain embodiments, a separate intake system 110, indexing system 112, and query system 114 can be instantiated for each tenant, whereas the shared storage system 116 or other components (e.g., data store, metadata catalog, and/or acceleration data store, described below) can be shared by multiple tenants. In some such embodiments where components are shared by multiple tenants, the components can maintain separate directories for the different tenants to ensure their mutual exclusivity and/or independence from each other. Similarly, in some such embodiments, the system 102 can use different hosting computing systems or different isolated execution environments to process the data from the different tenants as part of the intake system 110, indexing system 112, and/or query system 114.

In some embodiments, individual components of the intake system 110, indexing system 112, and/or query system 114 may be instantiated for each tenant or shared by multiple tenants. For example, some individual intake system components (e.g., forwarders, output ingestion buffer) may be instantiated and designated for individual tenants, while other intake system components (e.g., a data retrieval subsystem, intake ingestion buffer, and/or streaming data processor), may be shared by multiple tenants In certain embodiments, an indexing system 112 (or certain components thereof) can be instantiated and designated for a particular tenant or shared by multiple tenants. In some embodiments where a separate indexing system 112 is instantiated and designated for each tenant, different resources can be reserved for different tenants. For example, Tenant A can be consistently allocated a minimum of four indexing nodes and Tenant B can be consistently allocated a minimum of two indexing nodes. In some such embodiments, the four indexing nodes can be reserved for Tenant A and the two indexing nodes can be reserved for Tenant B, even if Tenant A and Tenant B are not using the reserved indexing nodes.

In embodiments where an indexing system 112 is shared by multiple tenants, components of the indexing system 112 can be dynamically assigned to different tenants. For example, if Tenant A has greater indexing demands, additional indexing nodes can be instantiated or assigned to Tenant A's data. However, as the demand decreases, the indexing nodes can be reassigned to a different tenant, or terminated. Further, in some embodiments, a component of the indexing system 112 can concurrently process data from the different tenants.

In some embodiments, one instance of query system 114 may be shared by multiple tenants. In some such cases, the same search head can be used to process/execute queries for different tenants and/or the same search nodes can be used to execute query for different tenants. Further, in some such cases, different tenants can be allocated different amounts of compute resources. For example, Tenant A may be assigned more search heads or search nodes based on demand or based on a service level arrangement than another tenant. However, once a search is completed the search head and/or nodes assigned to Tenant A may be assigned to Tenant B, deactivated, or their resource may be re-allocated to other components of the system 102, etc.

In some cases, by sharing more components with different tenants, the functioning of the system 102 can be improved. For example, by sharing components across tenants, the system 102 can improve resource utilization thereby reducing the amount of resources allocated as a whole. For example, if four indexing nodes, two search heads, and four search nodes are reserved for each tenant then those compute resources are unavailable for use by other processes or tenants, even if they go unused. In contrast, by sharing the indexing nodes, search heads, and search nodes with different tenants and instantiating additional compute resources, the system 102 can use fewer resources overall while providing improved processing time for the tenants that are using the compute resources. For example, if tenant A is not using any search nodes 506 and tenant B has many searches running, the system 102 can use search nodes that would have been reserved for tenant A to service tenant B. In this way, the system 102 can decrease the number of compute resources used/reserved, while improving the search time for tenant B and improving compute resource utilization.

2.0. Data Ingestion, Indexing, and Storage

FIG. 2 is a flow diagram illustrating an embodiment of a routine implemented by the system 102 to process, index, and store data received from host devices 104. The data flow illustrated in FIG. 2 is provided for illustrative purposes only. It will be understood that one or more of the steps of the processes illustrated in FIG. 2 may be removed or that the ordering of the steps may be changed. Furthermore, for the purposes of illustrating a clear example, one or more particular system components are described in the context of performing various operations during each of the data flow stages. For example, the intake system 110 is described as receiving machine data and the indexing system 112 is described as generating events, grouping events, and storing events. However, other system arrangements and distributions of the processing steps across system components may be used. For example, in some cases, the intake system 110 may generate events.

At block 202, the intake system 110 receives data from a host device 104. The intake system 110 initially may receive the data as a raw data stream generated by the host device 104 For example, the intake system 110 may receive a data stream from a log file generated by an application server, from a stream of network data from a network device, or from any other source of data. Non-limiting examples of machine data that can be received by the intake system 110 is described herein with reference to FIG. 3A.

In some embodiments, the intake system 110 receives the raw data and may segment the data stream into messages, possibly of a uniform data size, to facilitate subsequent processing steps. The intake system 110 may thereafter process the messages in accordance with one or more rules to conduct preliminary processing of the data. In one embodiment, the processing conducted by the intake system 110 may be used to indicate one or more metadata fields applicable to each message. For example, the intake system 110 may include metadata fields within the messages, or publish the messages to topics indicative of a metadata field. These metadata fields may, for example, provide information related to a message as a whole and may apply to each event that is subsequently derived from the data in the message. For example, the metadata fields may include separate fields specifying each of a host, a source, and a sourcetype related to the message. A host field may contain a value identifying a host name or IP address of a device that generated the data. A source field may contain a value identifying a source of the data, such as a pathname of a file or a protocol and port related to received network data. A sourcetype field may contain a value specifying a particular sourcetype label for the data. Additional metadata fields may also be included, such as a character encoding of the data, if known, and possibly other values that provide information relevant to later processing steps. In certain embodiments, the intake system 110 may perform additional operations, such as, but not limited to, identifying individual events within the data, determining timestamps for the data, further enriching the data, etc At block 204, the indexing system 112 generates events from the data. In some cases, as part of generating the events, the indexing system 112 can parse the data of the message. In some embodiments, the indexing system 112 can determine a sourcetype associated with each message (e.g., by extracting a sourcetype label from the metadata fields associated with the message, etc.) and refer to a sourcetype configuration corresponding to the identified sourcetype to parse the data of the message. The sourcetype definition may include one or more properties that indicate to the indexing system 112 to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a sourcetype for the data is unknown to the indexing system 112, the indexing system 112 may infer a sourcetype for the data by examining the structure of the data. Then, the indexing system 112 can apply an inferred sourcetype definition to the data to create the events.

In addition, as part of generating events from the data, the indexing system 112 can determine a timestamp for each event. Similar to the process for parsing machine data, the indexing system 112 may again refer to a sourcetype definition associated with the data to locate one or more properties that indicate instructions for determining a timestamp for each event. The properties may, for example, instruct the indexing system 112 to extract a time value from a portion of data for the event (e.g., using a regex rule), to interpolate time values based on timestamps associated with temporally proximate events, to create a timestamp based on a time the portion of machine data was received or generated, to use the timestamp of a previous event, or use any other rules for determining timestamps, etc.

The indexing system 112 can also associate events with one or more metadata fields. In some embodiments, a timestamp may be included in the metadata fields. These metadata fields may include any number of "default fields" that are associated with all events, and may also include one more custom fields as defined by a user. In certain embodiments, the default metadata fields associated with each event may include a host, source, and sourcetype field including or in addition to a field storing the timestamp.

In certain embodiments, the indexing system 112 can also apply one or more transformations to event data that is to be included in an event. For example, such transformations can include removing a portion of the event data (e.g., a portion used to define event boundaries, extraneous characters from the event, other extraneous text, etc.), masking a portion of event data (e.g., masking a credit card number), removing redundant portions of event data, etc. The transformations applied to event data may, for example, be specified in one or more configuration files and referenced by one or more sourcetype definitions.

At block 206, the indexing system 112 can group events. In some embodiments, the indexing system 112 can group events based on time. For example, events generated within a particular time period or events that have a time stamp within a particular time period can be grouped together to form a bucket. A non-limiting example of a bucket is described herein with reference to FIG. 3B In certain embodiments, multiple components of the indexing system, such as an indexing node, can concurrently generate events and buckets. Furthermore, each indexing node that generates and groups events can concurrently generate multiple buckets. For example, multiple processors of an indexing node can concurrently process data, generate events, and generate buckets. Further, multiple indexing nodes can concurrently generate events and buckets. As such, ingested data can be processed in a highly distributed manner.

In some embodiments, as part of grouping events together, the indexing system 112 can generate one or more inverted indexes for a particular group of events. A non-limiting example of an inverted index is described herein with reference to FIG. 3C. In certain embodiments, the inverted indexes can include location information for events of a bucket. For example, the events of a bucket may be compressed into one or more files to reduce their size. The inverted index can include location information indicating the particular file and/or location within a particular file of a particular event.

In certain embodiments, the inverted indexes may include keyword entries or entries for field values or field name-value pairs found in events. In some cases, a field name-value pair can include a pair of words connected by a symbol, such as an equals sign or colon. The entries can also include location information for events that include the keyword, field value, or field value pair. In this way, relevant events can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2." In certain embodiments, the indexing system can populate entries in the inverted index with field name-value pairs by parsing events using one or more regex rules to determine a field value associated with a field defined by the regex rule. For example, the regex rule may indicate how to find a field value for a userID field in certain events. In some cases, the indexing system 112 can use the sourcetype of the event to determine which regex to use for identifying field values.

Figure 3C:
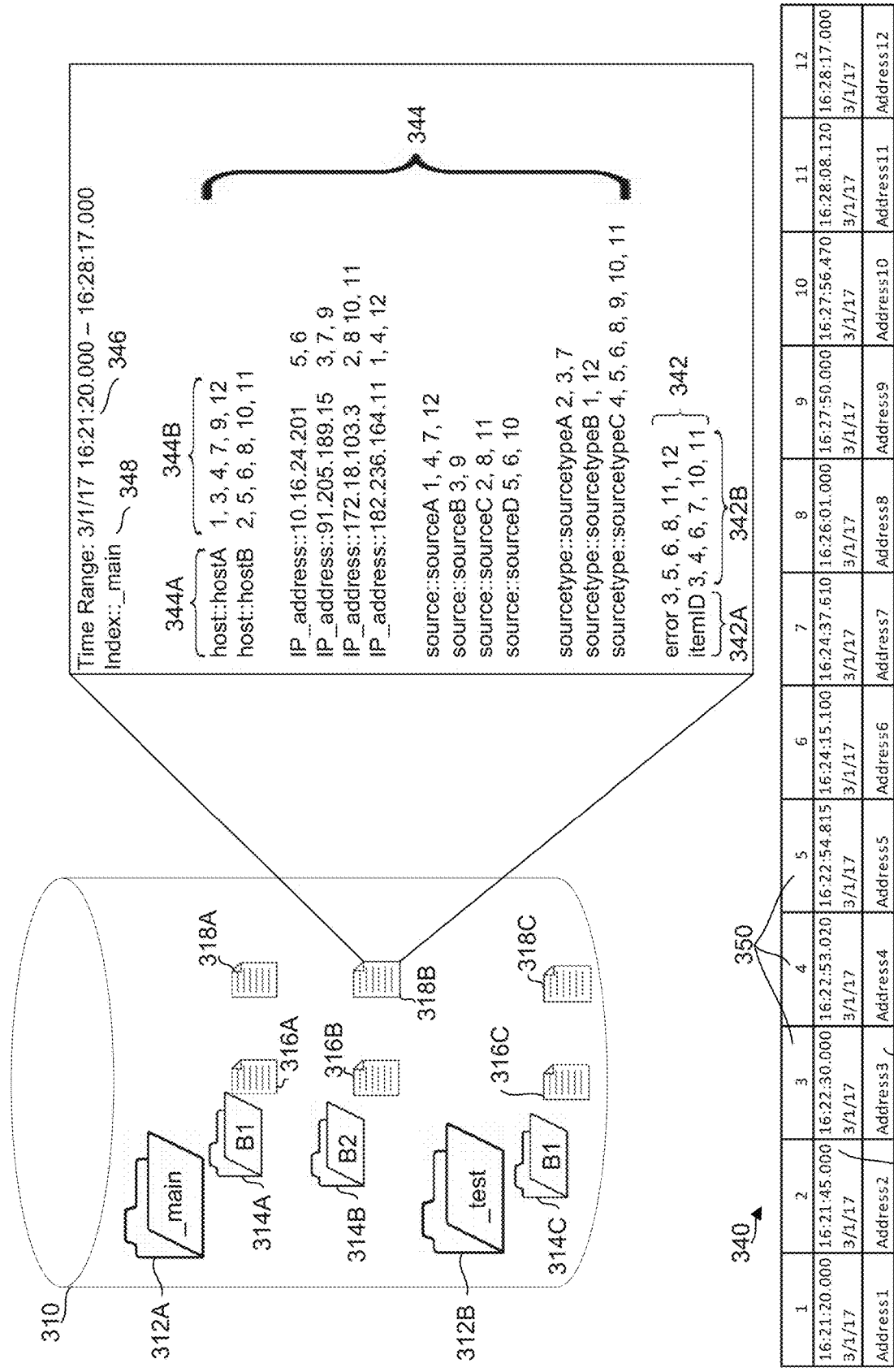

At block 208, the indexing system 112 stores the events with an associated timestamp in the storage system 116, which may be in a local data store and/or in a shared storage system. Timestamps enable a user to search for events based on a time range. In some embodiments, the stored events are organized into "buckets," where each bucket stores events associated with a specific time range based on the timestamps associated with each event. As mentioned, FIG. 3B and 3C illustrate an example of a bucket. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

The indexing system 112 may be responsible for storing the events in the storage system 116. As mentioned, the events or buckets can be stored locally on a component of the indexing system 112 or in a shared storage system 116. In certain embodiments, the component that generates the events and/or stores the events (indexing node) can also be assigned to search the events. In some embodiments separate components can be used for generating and storing events (indexing node) and for searching the events (search node).

By storing events in a distributed manner (either by storing the events at different components or in a shared storage system 116), the query system 114 can analyze events for a query in parallel. For example, using map-reduce techniques, multiple components of the query system (e.g., indexing or search nodes) can concurrently search and provide partial responses for a subset of events to another component (e.g., search head) that combines the results to produce an answer for the query. By storing events in buckets for specific time ranges, the indexing system 112 may further optimize the data retrieval process by the query system 114 to search buckets corresponding to time ranges that are relevant to a query. In some embodiments, each bucket may be associated with an identifier, a time range, and a size constraint. In certain embodiments, a bucket can correspond to a file system directory and the machine data, or events, of a bucket can be stored in one or more files of the file system directory. The file system directory can include additional files, such as one or more inverted indexes, high performance indexes, permissions files, configuration files, etc.

In embodiments where components of the indexing system 112 store buckets locally, the components can include a home directory and a cold directory. The home directory can store hot buckets and warm buckets, and the cold directory stores cold buckets. A hot bucket can refer to a bucket that is capable of receiving and storing additional events. A warm bucket can refer to a bucket that can no longer receive events for storage, but has not yet been moved to the cold directory. A cold bucket can refer to a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, components of the indexing system 112 may also have a quarantine bucket that contains events having potentially inaccurate information, such as an incorrect timestamp associated with the event or a timestamp that appears to be an unreasonable timestamp for the corresponding event. The quarantine bucket may have events from any time range; as such, the quarantine bucket may always be searched at search time. Additionally, components of the indexing system may store old, archived data in a frozen bucket that is not capable of being searched at search time. In some embodiments, a frozen bucket may be stored in slower and/or larger memory, such as a hard disk, and may be stored in offline and/or remote storage.

In some embodiments, components of the indexing system 112 may not include a cold directory and/or cold or frozen buckets. For example, in embodiments where buckets are copied to a shared storage system 116 and searched by separate components of the query system 114, buckets can be deleted from components of the indexing system as they are stored to the storage system 116. In certain embodiments, the shared storage system 116 may include a home directory that includes warm buckets copied from the indexing system 112 and a cold directory of cold or frozen buckets as described above.

FIG. 3A is a block diagram illustrating an embodiment of machine data received by the system 102. The machine data can correspond to data from one or more host devices 104 or data sources. As mentioned, the data source can correspond to a log file, data stream or other data structure that is accessible by a host device 104. In the illustrated embodiment of FIG. 3A, the machine data has different forms. For example, the machine data 302 may be log data that is unstructured or that does not have any clear structure or fields, and include different portions 302A-302E that correspond to different entries of the log and that separated by boundaries. Such data may also be referred to as raw machine data.

The machine data 304 may be referred to as structured or semi-structured machine data as it does include some data in a JSON structure defining certain field and field values (e.g., machine data 304A showing field name:field values container_name:kube-apiserver, host: ip 172 20 43 173.ec2.internal, pod_id:0a73017b-4efa-11e8-a4e1-0a2bf2ab4bba, etc.), but other parts of the machine data 304 is unstructured or raw machine data (e.g., machine data 304B). The machine data 306 may be referred to as structured data as it includes particular rows and columns of data with field names and field values.

In some embodiments, the machine data 302 can correspond to log data generated by a host device 104 configured as an Apache server, the machine data 304 can correspond to log data generated by a host device 104 in a shared computing resource environment, and the machine data 306 can correspond to metrics data. Given the differences between host devices 104 that generated the log data 302, 304, the form of the log data 302, 304 is different. In addition, as the log data 304 is from a host device 104 in a shared computing resource environment, it can include log data generated by an application being executed within an isolated execution environment (304B, excluding the field name "log:") and log data generated by an application that enables the sharing of computing resources between isolated execution environments (all other data in 304). Although shown together in FIG. 3A, it will be understood that machine data with different hosts, sources, or sourcetypes can be received separately and/or found in different data sources and/or host devices 104

As described herein, the system 102 can process the machine data based on the form in which it is received. In some cases, the intake system 110 can utilize one or more rules to process the data In certain embodiments, the intake system 110 can enrich the received data. For example, the intake system may add one or more fields to the data received from the host devices 104, such as fields denoting the host, source, sourcetype, index, or tenant associated with the incoming data. In certain embodiments, the intake system 110 can perform additional processing on the incoming data, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc.

In some cases, the data processed by the intake system 110 can be communicated or made available to the indexing system 112, the query system 114, and/or to other systems. In some embodiments, the intake system 110 communicates or makes available streams of data using one or more shards. For example, the indexing system 112 may read or receive data from one shard and another system may receive data from another shard. As another example, multiple systems may receive data from the same shard.

As used herein, a partition can refer to a logical division of data. In some cases, the logical division of data may refer to a portion of a data stream, such as a shard from the intake system 110. In certain cases, the logical division of data can refer to an index or other portion of data stored in the storage system 116, such as different directories or file structures used to store data or buckets. Accordingly, it will be understood that the logical division of data referenced by the term partition will be understood based on the context of its use.

FIGS. 3B and 3C are block diagrams illustrating embodiments of various data structures for storing data processed by the system 102. FIG. 3B includes an expanded view illustrating an example of machine data stored in a data store 310 of the data storage system 116. It will be understood that the depiction of machine data and associated metadata as rows and columns in the table 319 of FIG. 3B is merely illustrative and is not intended to limit the data format in which the machine data and metadata is stored in various embodiments described herein. In one particular embodiment, machine data can be stored in a compressed or encrypted format. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

In the illustrated embodiment of FIG. 3B the data store 310 includes a directory 312 (individually referred to as 312A, 312B) for each index (or partition) that contains a portion of data stored in the data store 310 and a sub-directory 314 (individually referred to as 314A, 314B, 314C) for one or more buckets of the index In the illustrated embodiment of FIG. 3B, each sub-directory 314 corresponds to a bucket and includes an event data file 316 (individually referred to as 316A, 316B, 316C) and an inverted index 318 (individually referred to as 318A, 318B, 318C). However, it will be understood that each bucket can be associated with fewer or more files and each sub-directory 314 can store fewer or more files.

In the illustrated embodiment, the data store 310 includes a main directory 312A associated with an index "_main" and a test directory 312B associated with an index "test." However, the data store 310 can include fewer or more directories. In some embodiments, multiple indexes can share a single directory or all indexes can share a common directory. Additionally, although illustrated as a single data store 310, it will be understood that the data store 310 can be implemented as multiple data stores storing different portions of the information shown in FIG. 3C. For example, a single index can span multiple directories or multiple data stores.

Furthermore, although not illustrated in FIG. 3B, it will be understood that, in some embodiments, the data store 310 can include directories for each tenant and sub-directories for each index of each tenant, or vice versa. Accordingly, the directories 312A and 312B can, in certain embodiments, correspond to sub-directories of a tenant or include sub-directories for different tenants.

In the illustrated embodiment of FIG. 3B, two sub-directories 314A, 314B of the main directory 312A and one sub-directory 312C of the test directory 312B are shown. The sub-directories 314A, 314B, 314C can correspond to buckets of the indexes associated with the directories 312A, 312B. For example, the sub-directories 314A and 314B can correspond to buckets "B1" and "B2," respectively, of the index "_main" and the sub-directory 314C can correspond to bucket "B1" of the index "_test." Accordingly, even though there are two "B1" buckets shown, as each "B1" bucket is associated with a different index (and corresponding directory 312), the system 102 can uniquely identify them.

Although illustrated as buckets "B1" and "B2," it will be understood that the buckets (and/or corresponding sub-directories 314) can be named in a variety of ways. In certain embodiments, the bucket (or sub-directory) names can include information about the bucket. For example, the bucket name can include the name of the index with which the bucket is associated, a time range of the bucket, etc.

As described herein, each bucket can have one or more files associated with it, including, but not limited to one or more raw machine data files, bucket summary files, filter files, inverted indexes (also referred to herein as high performance indexes or keyword indexes), permissions files, configuration files, etc. In the illustrated embodiment of FIG. 3B, the files associated with a particular bucket can be stored in the sub-directory corresponding to the particular bucket. Accordingly, the files stored in the sub-directory 314A can correspond to or be associated with bucket "B1," of index "_main," the files stored in the sub-directory 314B can correspond to or be associated with bucket "B2" of index "_main," and the files stored in the sub-directory 314C can correspond to or be associated with bucket "B1" of index "test."

FIG. 3B further illustrates an expanded event data file 316C showing an example of data that can be stored therein. In the illustrated embodiment, four events 320, 322, 324, 326 of the machine data file 316C are shown in four rows. Each event 320-326 includes machine data 330 and a timestamp 332. The machine data 330 can correspond to the machine data received by the system 102. For example, in the illustrated embodiment, the machine data 330 of events 320, 322, 324, 326 corresponds to portions 302A, 302B, 302C, 302D, respectively, of the machine data 302 after it was processed by the indexing system 112.

Metadata 334-338 associated with the events 320-326 is also shown in the table 319. In the illustrated embodiment, the metadata 334-338 includes information about a host 334, source 336, and sourcetype 338 associated with the events 320-326. Any of the metadata can be extracted from the corresponding machine data, or supplied or defined by an entity, such as a user or computer system. The metadata fields 334-338 can become part of, stored with, or otherwise associated with the events 320-326. In certain embodiments, the metadata 334-338 can be stored in a separate file of the sub-directory 314C and associated with the machine data file 316C. In some cases, while the timestamp 332 can be extracted from the raw data of each event, the values for the other metadata fields may be determined by the indexing system 112 based on information it receives pertaining to the host device 104 or data source of the data separate from the machine data.

While certain default or user-defined metadata fields can be extracted from the machine data for indexing purposes, the machine data within an event can be maintained in its original condition. As such, in embodiments in which the portion of machine data included in an event is unprocessed or otherwise unaltered, it is referred to herein as a portion of raw machine data. For example, in the illustrated embodiment, the machine data of events 320-326 is identical to the portions of the machine data 302A-302D, respectively, used to generate a particular event. Similarly, the entirety of the machine data 302 may be found across multiple events. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various fields.

In other embodiments, the portion of machine data in an event can be processed or otherwise altered relative to the machine data used to create the event. With reference to the machine data 304, the machine data of a corresponding event (or events) may be modified such that only a portion of the machine data 304 is stored as one or more events. For example, in some cases, only machine data 304B of the machine data 304 may be retained as one or more events or the machine data 304 may be altered to remove duplicate data, confidential information, etc.

In FIG. 3B, the first three rows of the table 319 present events 320, 322, and 324 and are related to a server access log that records requests from multiple clients processed by a server, as indicated by entry of "access.log" in the source column 336. In the example shown in FIG. 3B, each of the events 320-324 is associated with a discrete request made to the server by a client. The raw machine data generated by the server and extracted from a server access log can include the IP address 1140 of the client, the user id 1141 of the person requesting the document, the time 1142 the server finished processing the request, the request line 1143 from the client, the status code 1144 returned by the server to the client, the size of the object 1145 returned to the client (in this case, the gif file requested by the client) and the time spent 1146 to serve the request in microseconds. In the illustrated embodiments of FIGS. 3A, 3B, all the raw machine data retrieved from the server access log is retained and stored as part of the corresponding events 320-324 in the file 316C.

Event 326 is associated with an entry in a server error log, as indicated by "error. log" in the source column 336 that records errors that the server encountered when processing a client request. Similar to the events related to the server access log, all the raw machine data in the error log file pertaining to event 326 can be preserved and stored as part of the event 326.

Saving minimally processed or unprocessed machine data in a data store associated with metadata fields in the manner similar to that shown in FIG. 3B is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

FIG. 3C illustrates an embodiment of another file that can be included in one or more subdirectories 314 or buckets. Specifically, FIG. 3C illustrates an exploded view of an embodiments of an inverted index 318B in the sub-directory 314B, associated with bucket "B2" of the index "_main," as well as an event reference array 340 associated with the inverted index 318B.

In some embodiments, the inverted indexes 318 can correspond to distinct time-series buckets. As such, each inverted index 318 can correspond to a particular range of time for an index. In the illustrated embodiment of FIG. 3C, the inverted indexes 318A, 318B correspond to the buckets "B1" and "B2," respectively, of the index "main," and the inverted index 318C corresponds to the bucket "B1" of the index "_test." In some embodiments, an inverted index 318 can correspond to multiple time-series buckets (e.g., include information related to multiple buckets) or inverted indexes 318 can correspond to a single time-series bucket.

Each inverted index 318 can include one or more entries, such as keyword (or token) entries 342 or field-value pair entries 344. Furthermore, in certain embodiments, the inverted indexes 318 can include additional information, such as a time range 346 associated with the inverted index or an index identifier 348 identifying the index associated with the inverted index 318. It will be understood that each inverted index 318 can include less or more information than depicted. For example, in some cases, the inverted indexes 318 may omit a time range 346 and/or index identifier 348. In some such embodiments, the index associated with the inverted index 318 can be determined based on the location (e.g., directory 312) of the inverted index 318 and/or the time range of the inverted index 318 can be determined based on the name of the sub-directory 314.

Token entries, such as token entries 342 illustrated in inverted index 318B, can include a token 342A (e.g., "error," "itemID," etc.) and event references 342B indicative of events that include the token. For example, for the token "error," the corresponding token entry includes the token "error" and an event reference, or unique identifier, for each event stored in the corresponding time-series bucket that includes the token "error." In the illustrated embodiment of FIG. 3C, the error token entry includes the identifiers 3, 5, 6, 8, 11, and 12 corresponding to events located in the bucket "B2" of the index "main."

In some cases, some token entries can be default entries, automatically determined entries, or user specified entries. In some embodiments, the indexing system 112 can identify each word or string in an event as a distinct token and generate a token entry for the identified word or string. In some cases, the indexing system 112 can identify the beginning and ending of tokens based on punctuation, spaces, etc. In certain cases, the indexing system 112 can rely on user input or a configuration file to identify tokens for token entries 342, etc. It will be understood that any combination of token entries can be included as a default, automatically determined, or included based on user-specified criteria.

Similarly, field-value pair entries, such as field-value pair entries 344 shown in inverted index 318B, can include a field-value pair 344A and event references 344B indicative of events that include a field value that corresponds to the field-value pair (or the field-value pair). For example, for a field-value pair sourcetype::sendmail, a field-value pair entry 344 can include the field-value pair "sourcetype::sendmail" and a unique identifier, or event reference, for each event stored in the corresponding time-series bucket that includes a sourcetype "sendmail."

In some cases, the field-value pair entries 344 can be default entries, automatically determined entries, or user specified entries. As a non-limiting example, the field-value pair entries for the fields "host," "source," and "sourcetype" can be included in the inverted indexes 318 as a default. As such, all of the inverted indexes 318 can include field-value pair entries for the fields "host," "source," and "sourcetype." As yet another non-limiting example, the field-value pair entries for the field "IP address" can be user specified and may only appear in the inverted index 318B or the inverted indexes 318A, 318B of the index "_main" based on user-specified criteria. As another non-limiting example, as the indexing system 112 indexes the events, it can automatically identify field-value pairs and create field-value pair entries 344. For example, based on the indexing system's 212 review of events, it can identify IP address as a field in each event and add the IP address field-value pair entries to the inverted index 318B (e.g., based on punctuation, like two keywords separated by an '=' or ':' etc.). It will be understood that any combination of field-value pair entries can be included as a default, automatically determined, or included based on user-specified criteria.

With reference to the event reference array 340, each unique identifier 350, or event reference, can correspond to a unique event located in the time series bucket or machine data file 316B. The same event reference can be located in multiple entries of an inverted index 318. For example if an event has a sourcetype "splunkd," host "www1" and token "warning," then the unique identifier for the event can appear in the field-value pair entries 344 "sourcetype::splunkd" and "host::www1," as well as the token entry "warning." With reference to the illustrated embodiment of FIG. 3C and the event that corresponds to the event reference 3, the event reference 3 is found in the field-value pair entries 344 "host::hostA," "source::sourceB," "sourcetype::sourcetypeA," and "IP_address::91.205.189.15" indicating that the event corresponding to the event references is from hostA, sourceB, of sourcetypeA, and includes "91.205.189.15" in the event data.

For some fields, the unique identifier is located in only one field-value pair entry for a particular field. For example, the inverted index 318 may include four sourcetype field-value pair entries 344 corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 3C, since the event reference 7 appears in the field-value pair entry "sourcetype::sourcetypeA," then it does not appear in the other field-value pair entries for the sourcetype field, including "sourcetype::sourcetypeB," "sourcetype::sourcetypeC," and "sourcetype::sourcetypeD."

The event references 350 can be used to locate the events in the corresponding bucket or machine data file 316. For example, the inverted index 318B can include, or be associated with, an event reference array 340. The event reference array 340 can include an array entry 350 for each event reference in the inverted index 318B. Each array entry 350 can include location information 352 of the event corresponding to the unique identifier (non-limiting example: seek address of the event, physical address, slice ID, etc.), a timestamp 354 associated with the event, or additional information regarding the event associated with the event reference, etc.

For each token entry 342 or field-value pair entry 344, the event reference 342B, 344B, respectively, or unique identifiers can be listed in chronological order or the value of the event reference can be assigned based on chronological data, such as a timestamp associated with the event referenced by the event reference. For example, the event reference 1 in the illustrated embodiment of FIG. 3C can correspond to the first-in-time event for the bucket, and the event reference 12 can correspond to the last-in-time event for the bucket. However, the event references can be listed in any order, such as reverse chronological order, ascending order, descending order, or some other order (e.g., based on time received or added to the machine data file), etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 3C, the entries are sorted first by entry type and then alphabetically.

In some cases, inverted indexes 318 can decrease the search time of a query. For example, for a statistical query, by using the inverted index, the system 102 can avoid the computational overhead of parsing individual events in a machine data file 316. Instead, the system 102 can use the inverted index 318 separate from the raw record data store to generate responses to the received queries.

3.0. Query Processing and Execution

Figure 4A:
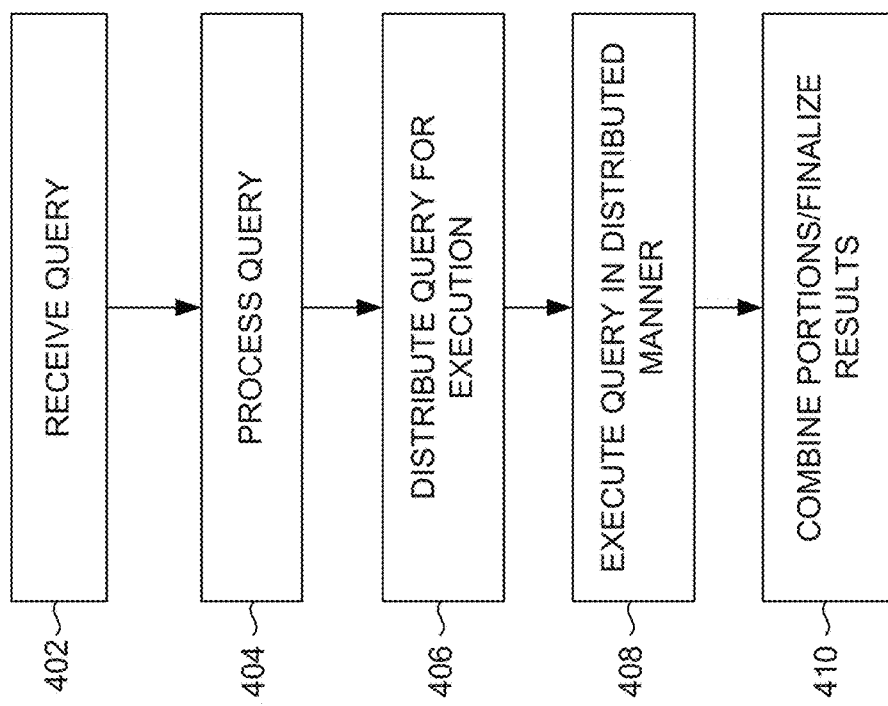
FIG. 4A is a flow diagram illustrating an embodiment of a routine implemented by the query system to execute a query.

FIG. 4A is a flow diagram illustrating an embodiment of a routine implemented by the query system 114 for executing a query. At block 402, the query system 114 receives a search query. As described herein, the query can be in the form of a pipelined command language or other query language and include filter criteria used to identify a set of data and processing criteria used to process the set of data.

At block 404, the query system 114 processes the query. As part of processing the query, the query system 114 can determine whether the query was submitted by an authenticated user and/or review the query to determine that it is in a proper format for the data intake and query system 102, has correct semantics and syntax, etc. In addition, the query system 114 can determine what, if any, configuration files or other configurations to use as part of the query.

In addition as part of processing the query, the query system 114 can determine what portion(s) of the query to execute in a distributed manner (e.g., what to delegate to search nodes) and what portions of the query to execute in a non-distributed manner (e.g., what to execute on the search head). For the parts of the query that are to be executed in a distributed manner, the query system 114 can generate specific commands, for the components that are to execute the query. This may include generating subqueries, partial queries or different phases of the query for execution by different components of the query system 114. In some cases, the query system 114 can use map-reduce techniques to determine how to map the data for the search and then reduce the data. Based on the map-reduce phases, the query system 114 can generate query commands for different components of the query system 114.

As part of processing the query, the query system 114 can determine where to obtain the data. For example, in some cases, the data may reside on one or more indexing nodes or search nodes, as part of the storage system 116 or may reside in a shared storage system or a system external to the system 102. In some cases, the query system 114 can determine what components to use to obtain and process the data For example, the query system 114 can identify search nodes that are available for the query, etc.

At block 406, the query system 1206 distributes the determined portions or phases of the query to the appropriate components (e g., search nodes). In some cases, the query system 1206 can use a catalog to determine which components to use to execute the query (e.g., which components include relevant data and/or are available, etc.).

At block 408, the components assigned to execute the query, execute the query. As mentioned, different components may execute different portions of the query. In some cases, multiple components (e.g., multiple search nodes) may execute respective portions of the query concurrently and communicate results of their portion of the query to another component (e.g., search head). As part of the identifying the set of data or applying the filter criteria, the components of the query system 114 can search for events that match the criteria specified in the query. These criteria can include matching keywords or specific values for certain fields. The searching operations at block 408 may use the late-binding schema to extract values for specified fields from events at the time the query is processed. In some embodiments, one or more rules for extracting field values may be specified as part of a sourcetype definition in a configuration file or in the query itself. In certain embodiments where search nodes are used to obtain the set of data, the search nodes can send the relevant events back to the search head, or use the events to determine a partial result, and send the partial result back to the search head.

At block 410, the query system 114 combines the partial results and/or events to produce a final result for the query. As mentioned, in some cases, combining the partial results and/or finalizing the results can include further processing the data according to the query. Such processing may entail joining different set of data, transforming the data, and/or performing one or more mathematical operations on the data, preparing the results for display, etc In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events The results generated by the query system 114 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring to the search jobs.

The query system 114 can also perform various operations to make the search more efficient. For example, before the query system 114 begins execution of a query, it can determine a time range for the query and a set of common keywords that all matching events include. The query system 114 may then use these parameters to obtain a superset of the eventual results. Then, during a filtering stage, the query system 114 can perform field-extraction operations on the superset to produce a reduced set of search results. This speeds up queries, which may be particularly helpful for queries that are performed on a periodic basis. In some cases, to make the search more efficient, the query system 114 can use information known about certain data sets that are part of the query to filter other data sets. For example, if an early part of the query includes instructions to obtain data with a particular field, but later commands of the query do not rely on the data with that particular field, the query system 114 can omit the superfluous part of the query from execution.

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can include filter criteria used to search or filter for specific data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "1." In such embodiments, a set of data, such as a set of events, can be operated on by a first SPL command in the sequence, and then a subsequent SPL command following a pipe symbol "" " after the first SPL command operates on the results produced by the first SPL command or other set of data, and so on for any additional SPL commands in the sequence. As such, a query formulated using SPL comprises a series of consecutive commands that are delimited by pipe "I" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms or filter criteria at the beginning of the pipeline. Such search terms or filter criteria can include any combination of keywords, phrases, times, dates, Boolean expressions, fieldname-field value pairs, etc. that specify which results should be obtained from different locations. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field criteria. For example, a search command can filter events based on the word "warning" or filter events based on a field value "10.0.1.2" associated with a field "clientip."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table In some implementations, an event retrieved from an index in response to a query can be considered a row with a column for each field value. Columns can contain basic information about the data and/or data that has been dynamically extracted at search time.

Figure 4B:
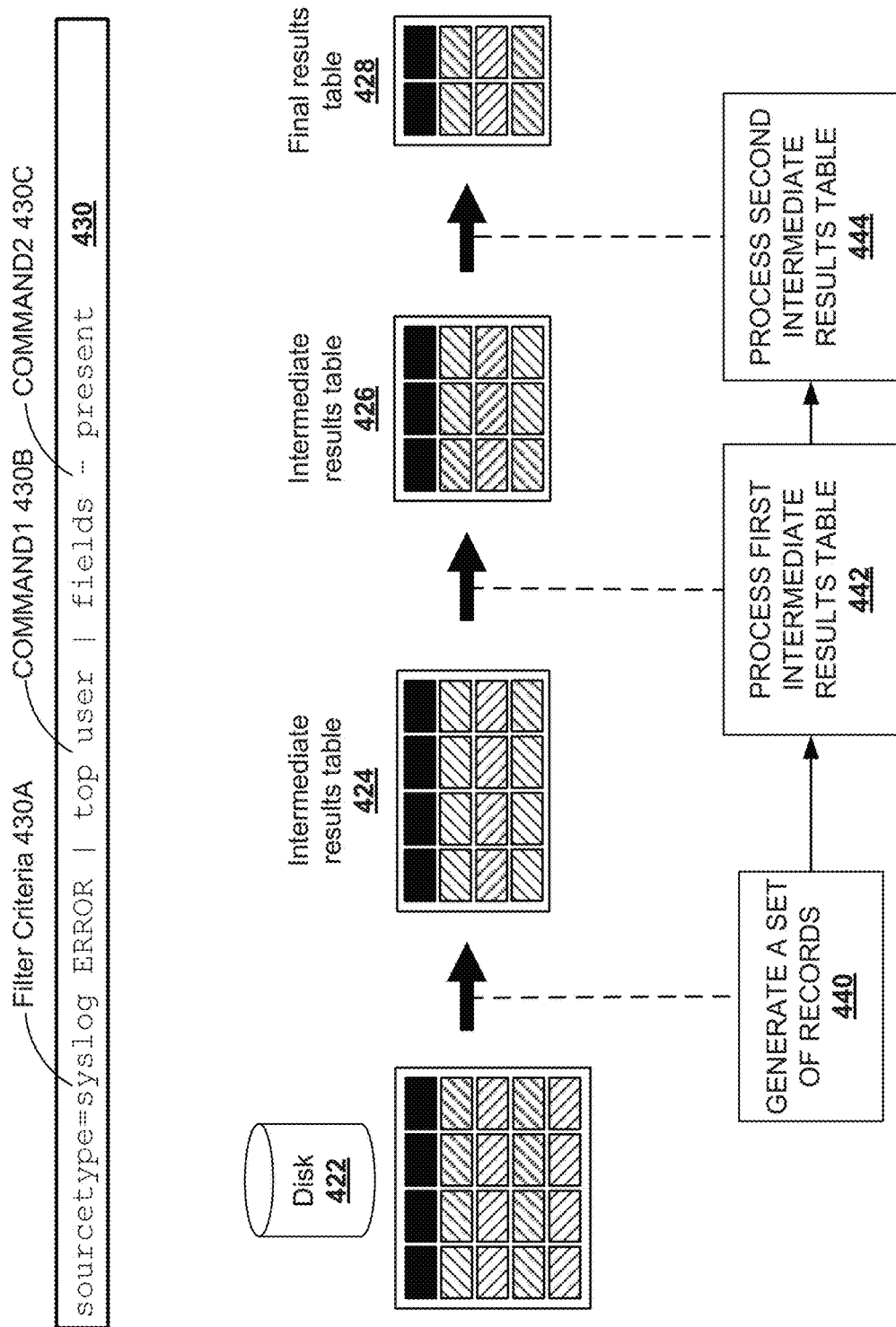
FIG. 4B provides a visual representation of the manner in which a pipelined command language or query can operate.

FIG. 4B provides a visual representation of the manner in which a pipelined command language or query can operate in accordance with the disclosed embodiments. The query 430 can be input by the user and submitted to the query system 114. In the illustrated embodiment, the query 430 comprises filter criteria 430A, followed by two commands 430B, 430C (namely, Command1 and Command2) Disk 422 represents data as it is stored in a data store to be searched. For example, disk 422 can represent a portion of the storage system 116 or some other data store that can be searched by the query system 114 Individual rows of can represent different events and columns can represent different fields for the different events. In some cases, these fields can include raw machine data, host, source, and sourcetype.

At block 440, the query system 114 uses the filter criteria 430A (e.g., "sourcetype=syslog ERROR") to filter events stored on the disk 422 to generate an intermediate results table 424. Given the semantics of the query 430 and order of the commands, the query system 114 can execute the filter criteria 430A portion of the query 430 before executing Command1 or Command2.

Rows in the table 424 may represent individual records, where each record corresponds to an event in the disk 422 that satisfied the filter criteria. Columns in the table 424 may correspond to different fields of an event or record, such as "user," "count," percentage," "timestamp," or the raw machine data of an event, etc. Notably, the fields in the intermediate results table 424 may differ from the fields of the events on the disk 422. In some cases, this may be due to the late binding schema described herein that can be used to extract field values at search time. Thus, some of the fields in table 424 may not have existed in the events on disk 422.

Illustratively, the intermediate results table 424 has fewer rows than what is shown in the disk 422 because only a subset of events retrieved from the disk 422 matched the filter criteria 430A "sourcetype=syslog ERROR." In some embodiments, instead of searching individual events or raw machine data, the set of events in the intermediate results table 424 may be generated by a call to a pre-existing inverted index.

At block 442, the query system 114 processes the events of the first intermediate results table 424 to generate the second intermediate results table 426. With reference to the query 430, the query system 114 processes the events of the first intermediate results table 424 to identify the top users according to Command1. This processing may include determining a field value for the field "user" for each record in the intermediate results table 424, counting the number of unique instances of each "user" field value (e.g., number of users with the name David, John, Julie, etc.) within the intermediate results table 424, ordering the results from largest to smallest based on the count, and then keeping only the top 10 results (e.g., keep an identification of the top 10 most common users). Accordingly, each row of table 426 can represent a record that includes a unique field value for the field "user," and each column can represent a field for that record, such as fields "user," "count," and "percentage."

At block 444, the query system 114 processes the second intermediate results table 426 to generate the final results table 428. With reference to query 430, the query system 114 applies the command "fields—present" to the second intermediate results table 426 to generate the final results table 428. As shown, the command "fields—present" of the query 430 results in one less column, which may represent that a field was removed during processing. For example, the query system 114 may have determined that the field "percentage" was unnecessary for displaying the results based on the Command2. In such a scenario, each record of the final results table 428 would include a field "user," and "count." Further, the records in the table 428 would be ordered from largest count to smallest count based on the query commands.

It will be understood that the final results table 428 can be a third intermediate results table, which can be pipelined to another stage where further filtering or processing of the data can be performed, e.g., preparing the data for display purposes, filtering the data based on a condition, performing a mathematical calculation with the data, etc. In different embodiments, other query languages, such as the Structured Query Language ("SQL"), can be used to create a query.

As described herein, extraction rules can be used to extract field-value pairs or field values from data. An extraction rule can comprise one or more regex rules that specify how to extract values for the field corresponding to the extraction rule. In addition to specifying how to extract field values, the extraction rules may also include instructions for deriving a field value by performing a function on a character string or value retrieved by the extraction rule. For example, an extraction rule may truncate a character string or convert the character string into a different data format. Extraction rules can be used to extract one or more values for a field from events by parsing the portions of machine data in the events and examining the data for one or more patterns of characters, numbers, delimiters, etc., that indicate where the field begins and, optionally, ends. In certain embodiments, extraction rules can be stored in one or more configuration files. In some cases, a query itself can specify one or more extraction rules.

In some cases, extraction rules can be applied at data ingest by the intake system 110 and/or indexing system 112. For example, the intake system 110 and indexing system 112 can apply extraction rules to ingested data and/or events generated from the ingested data and store results in an inverted index.

The system 102 advantageously allows for search time field extraction. In other words, fields can be extracted from the event data at search time using late-binding schema as opposed to at data ingestion time, which was a major limitation of the prior art systems. Accordingly, extraction rules can be applied at search time by the query system 114. The query system can apply extraction rules to events retrieved from the storage system 116 or data received from sources external to the system 102. Extraction rules can be applied to all the events in the storage system 116 or to a subset of the events that have been filtered based on some filter criteria (e.g., event timestamp values, etc.).

Figure 4C:
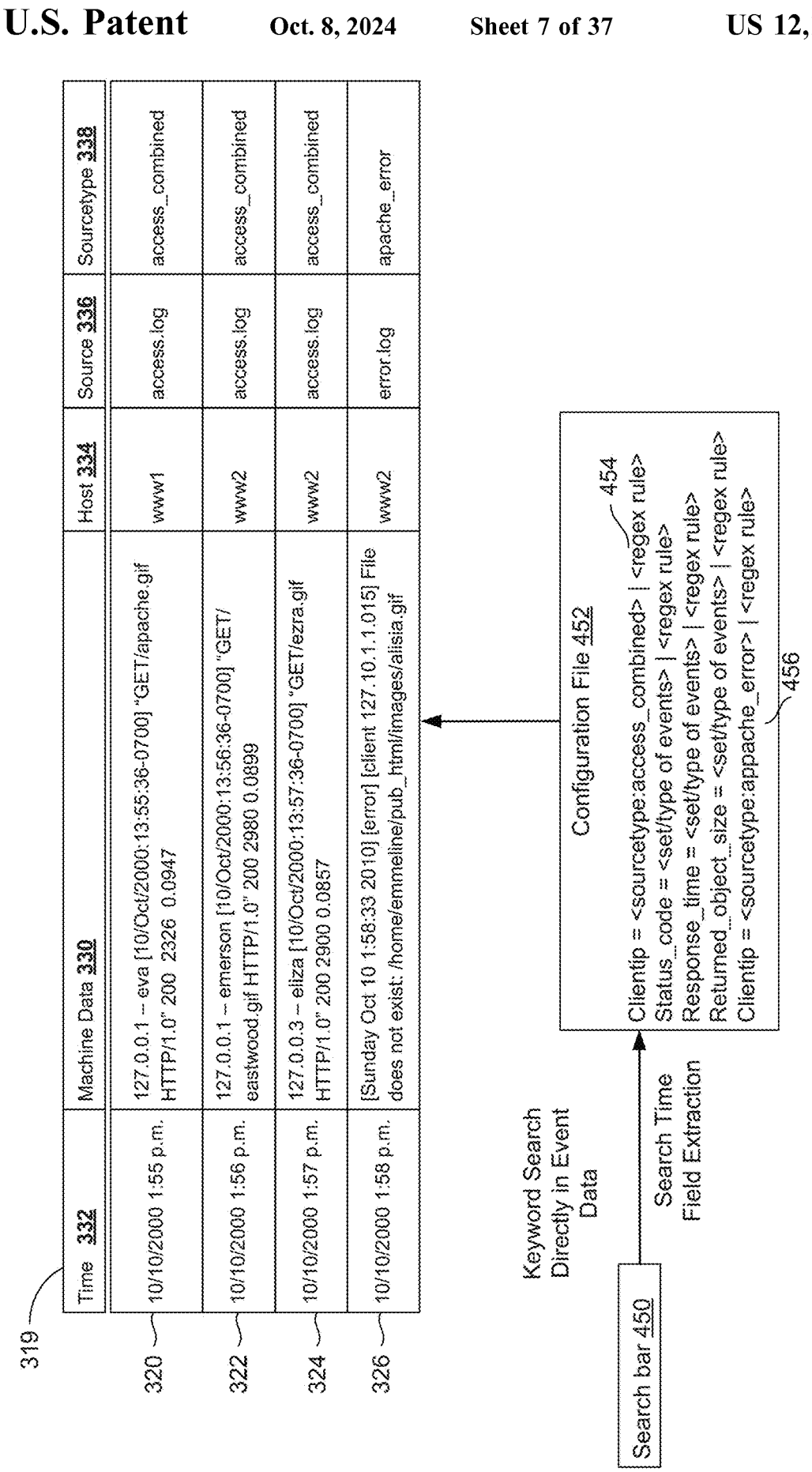
FIG. 4C is a block diagram illustrating an embodiment of a configuration file that includes various extraction rules that can be applied to events.

FIG. 4C is a block diagram illustrating an embodiment of the table 319 showing events 320-326, described previously with reference to FIG. 3B. As described herein, the table 319 is for illustrative purposes, and the events 320-326 may be stored in a variety of formats in an event data file 316 or raw record data store. Further, it will be understood that the event data file 316 or raw record data store can store millions of events. FIG. 4C also illustrates an embodiment of a search bar 450 for entering a query and a configuration file 452 that includes various extraction rules that can be applied to the events 320-326.

As a non-limiting example, if a user inputs a query into search bar 450 that includes only keywords (also known as "tokens"), e.g., the keyword "error" or "warning," the query system 114 can search for those keywords directly in the events 320-326 stored in the raw record data store.

As described herein, the indexing system 112 can optionally generate and use an inverted index with keyword entries to facilitate fast keyword searching for event data. If a user searches for a keyword that is not included in the inverted index, the query system 114 may nevertheless be able to retrieve the events by searching the event data for the keyword in the event data file 316 or raw record data store directly. For example, if a user searches for the keyword "eva," and the name "eva" has not been indexed at search time, the query system 114 can search the events 320-326 directly and return the first event 320. In the case where the keyword has been indexed, the inverted index can include a reference pointer that will allow for a more efficient retrieval of the event data from the data store. If the keyword has not been indexed, the query system 114 can search through the events in the event data file to service the search.

In many cases, a query include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the query, "status=404." This search query finds events with "status" fields that have a value of "404." When the search is run, the query system 114 does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "Nov 15 09:33:22 evaemerson."

FIG. 4C illustrates the manner in which configuration files may be used to configure custom fields at search time in accordance with the disclosed embodiments. In response to receiving a query, the query system 114 determines if the query references a "field." For example, a query may request a list of events where the "clientip" field equals "127.0.0.1." If the query itself does not specify an extraction rule and if the field is not an indexed metadata field, e.g., time, host, source, sourcetype, etc., then in order to determine an extraction rule, the query system 114 may, in one or more embodiments, locate configuration file 452 during the execution of the query.

Configuration file 452 may contain extraction rules for various fields, e.g., the "clientip" field. The extraction rules may be inserted into the configuration file 452 in a variety of ways. In some embodiments, the extraction rules can comprise regular expression rules that are manually entered in by the user.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system can then generate a regular expression that extracts those fields from similar events and store the regular expression as an extraction rule for the associated field in the configuration file 452.

In some embodiments, the indexing system 112 can automatically discover certain custom fields at index time and the regular expressions for those fields will be automatically generated at index time and stored as part of extraction rules in configuration file 452. For example, fields that appear in the event data as "key=value" pairs may be automatically extracted as part of an automatic field discovery process. Note that there may be several other ways of adding field definitions to configuration files in addition to the methods discussed herein.

Events from heterogeneous sources that are stored in the storage system 116 may contain the same fields in different locations due to discrepancies in the format of the data generated by the various sources. For example, event 326 also contains a "clientip" field, however, the "clientip" field is in a different format from events 320, 322, and 324. Furthermore, certain events may not contain a particular field at all. To address the discrepancies in the format and content of the different types of events, the configuration file 452 can specify the set of events to which an extraction rule applies. For example, extraction rule 454 specifies that it is to be used with events having a sourcetype "access_combined," and extraction rule 456 specifies that it is to be used with events having a sourcetype "apache_error." Other extraction rules shown in configuration file 452 specify a set or type of events to which they apply. In addition, the extraction rules shown in configuration file 452 include a regular expression for parsing the identified set of events to determine the corresponding field value. Accordingly, each extraction rule may pertain to only a particular type of event. Accordingly, if a particular field, e.g., "clientip" occurs in multiple types of events, each of those types of events can have its own corresponding extraction rule in the configuration file 452 and each of the extraction rules would comprise a different regular expression to parse out the associated field value. In some cases, the sets of events are grouped by sourcetype because events generated by a particular source can have the same format.

The field extraction rules stored in configuration file 452 can be used to perform search-time field extractions. For example, for a query that requests a list of events with sourcetype "access_combined" where the "clientip" field equals "127.0.0.1," the query system 114 can locate the configuration file 452 to retrieve extraction rule 454 that allows it to extract values associated with the "clientip" field from the events where the sourcetype is "access_combined" (e.g., events 320-324). After the "clientip" field has been extracted from the events 320, 322, 324, the query system 114 can then apply the field criteria by performing a compare operation to filter out events where the "clientip" field does not equal "127.0.0.1." In the example shown in FIG. 4C, the events 320 and 322 would be returned in response to the user query. In this manner, the query system 114 can service queries with filter criteria containing field criteria and/or keyword criteria.

It should also be noted that any events filtered by performing a search-time field extraction using a configuration file 452 can be further processed by directing the results of the filtering step to a processing step using a pipelined search language. Using the prior example, a user can pipeline the results of the compare step to an aggregate function by asking the query system 114 to count the number of events where the "clientip" field equals "127.0.0.1."

By providing the field definitions for the queried fields at search time, the configuration file 452 allows the event data file or raw record data store to be field searchable. In other words, the raw record data store can be searched using keywords as well as fields, wherein the fields are searchable name/value pairings that can distinguish one event from another event and can be defined in configuration file 452 using extraction rules. In comparison to a search containing field names, a keyword search may result in a search of the event data directly without the use of a configuration file.

Further, the ability to add schema to the configuration file 452 at search time results in increased efficiency and flexibility. A user can create new fields at search time and simply add field definitions to the configuration file 452. As a user learns more about the data in the events, the user can continue to refine the late-binding schema by adding new fields, deleting fields, or modifying the field extraction rules in the configuration file for use the next time the schema is used by the system 102. Because the system 102 maintains the underlying raw data and uses late-binding schema for searching the raw data, it enables a user to continue investigating and learn valuable insights about the raw data long after data ingestion time. Similarly, multiple field definitions can be added to the configuration file to capture the same field across events generated by different sources or sourcetypes. This allows the system 102 to search and correlate data across heterogeneous sources flexibly and efficiently.

The system 102 can use one or more data models to search and/or better understand data. A data model is a hierarchically structured search-time mapping of semantic knowledge about one or more datasets. It encodes the domain knowledge used to build a variety of specialized searches of those datasets. Those searches, in turn, can be used to generate reports.

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

Performing extraction and analysis operations at search time can involve a large amount of data and require a large number of computational operations, which can cause delays in processing the queries. In some embodiments, the system 102 can employ a number of unique acceleration techniques to speed up analysis operations performed at search time. These techniques include: performing search operations in parallel using multiple components of the query system 114, using an inverted index 118, and accelerating the process of generating reports.

To facilitate faster query processing, a query can be structured such that multiple components of the query system 114 (e.g., search nodes) perform the query in parallel, while aggregation of search results from the multiple components is performed at a particular component (e.g., search head). For example, consider a scenario in which a user enters the query "Search "error" | stats count BY host." The query system 114 can identify two phases for the query, including: (1) subtasks (e.g., data retrieval or simple filtering) that may be performed in parallel by multiple components, such as search nodes, and (2) a search results aggregation operation to be executed by one component, such as the search head, when the results are ultimately collected from the search nodes.

Based on this determination, the query system 114 can generate commands to be executed in parallel by the search nodes, with each search node applying the generated commands to a subset of the data to be searched. In this example, the query system 114 generates and then distributes the following commands to the individual search nodes: "Search "error" prestats count BY host." In this example, the "prestats" command can indicate that individual search nodes are processing a subset of the data and are responsible for producing partial results and sending them to the search head. After the search nodes return the results to the search head, the search head aggregates the received results to form a single search result set. By executing the query in this manner, the system effectively distributes the computational operations across the search nodes while reducing data transfers. It will be understood that the query system 114 can employ a variety of techniques to use distributed components to execute a query. In some embodiments, the query system 114 can use distributed components for only mapping functions of a query (e.g., gather data, applying filter criteria, etc.). In certain embodiments, the query system 114 can use distributed components for mapping and reducing functions (e.g., joining data, combining data, reducing data, etc.) of a query.

4.0. Example Use Cases

The system 102 provides various schemas, dashboards, and visualizations that simplify developers' tasks to create applications with additional capabilities, including but not limited to security, data center monitoring, IT service monitoring, and client/customer insights.

An embodiment of an enterprise security application is as SPLUNK® ENTERPRISE SECURITY, which performs monitoring and alerting operations and includes analytics to facilitate identifying both known and unknown security threats based on large volumes of data stored by the system 102. The enterprise security application provides the security practitioner with visibility into security-relevant threats found in the enterprise infrastructure by capturing, monitoring, and reporting on data from enterprise security devices, systems, and applications. Through the use of the system 102 searching and reporting capabilities, the enterprise security application provides a top-down and bottom-up view of an organization's security posture.

An embodiment of an IT monitoring application is SPLUNK® IT SERVICE INTELLIGENCE™, which performs monitoring and alerting operations. The IT monitoring application also includes analytics to help an analyst diagnose the root cause of performance problems based on large volumes of data stored by the system 102 as correlated to the various services an IT organization provides (a service-centric view). This differs significantly from conventional IT monitoring systems that lack the infrastructure to effectively store and analyze large volumes of service-related events Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

As described herein, the system 102 can receive heterogeneous data from disparate systems. In some cases, the data from the disparate systems may be related and correlating the data can result in insights into client or customer interactions with various systems of a vendor. To aid in the correlation of data across different systems, multiple field definitions can be added to one or more configuration files to capture the same field or data across events generated by different sources or sourcetypes. This can enable the system 102 to search and correlate data across heterogeneous sources flexibly and efficiently.

Figure 4D:
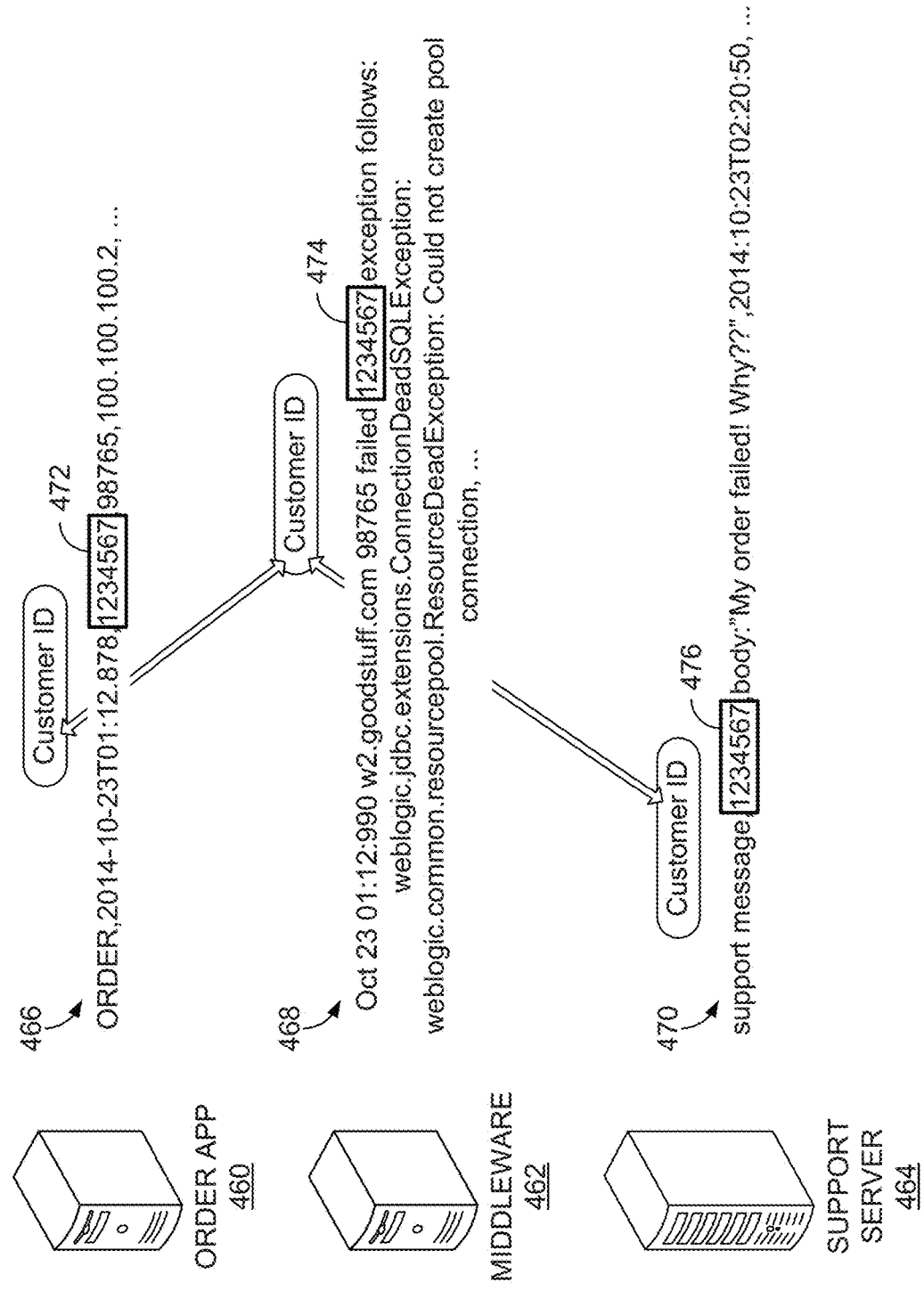
FIG. 4D is a block diagram illustrating an example scenario where a common customer identifier is found among log data received from disparate data sources.

As a non-limiting example and with reference to FIG. 4D, consider a scenario in which a common customer identifier is found among log data received from three disparate data sources. In this example, a user submits an order for merchandise using a vendor's shopping application program 460 running on the user's system. In this example, the order was not delivered to the vendor's server due to a resource exception at the destination server that is detected by the middleware code 462. The user then sends a message to the customer support server 464 to complain about the order failing to complete. The three systems 460, 462, 464 are disparate systems that do not have a common logging format. The shopping application program 460 sends log data 466 to the system 102 in one format, the middleware code 462 sends error log data 468 in a second format, and the support server 464 sends log data 470 in a third format.

Using the log data received at the system 102 from the three systems 460, 462, 464, the vendor can uniquely obtain an insight into user activity, user experience, and system behavior. The system 102 allows the vendor's administrator to search the log data from the three systems 460, 462, 464, thereby obtaining correlated information, such as the order number and corresponding customer ID number of the person placing the order. The system 102 also allows the administrator to see a visualization of related events via a user interface. The administrator can query the system 102 for customer ID field value matches across the log data from the three systems 460, 462, 464 that are stored in the storage system 116. While the customer ID field value exists in the data gathered from the three systems 460, 462, 464, it may be located in different areas of the data given differences in the architecture of the systems. The query system 114 obtains events from the storage system 116 related to the three systems 460, 462, 464. The query system 114 then applies extraction rules to the events in order to extract field values for the field "customer ID" that it can correlate. As described herein, the query system 114 may apply a different extraction rule to each set of events from each system when the event format differs among systems. In this example, a user interface can display to the administrator the events corresponding to the common customer ID field values 472, 474, and 476, thereby providing the administrator with insight into a customer's experience. The system 102 can provide additional user interfaces and reports to aid a user in analyzing the data associated with the customer

5.0. Networked Data Processing System

Figure 5:
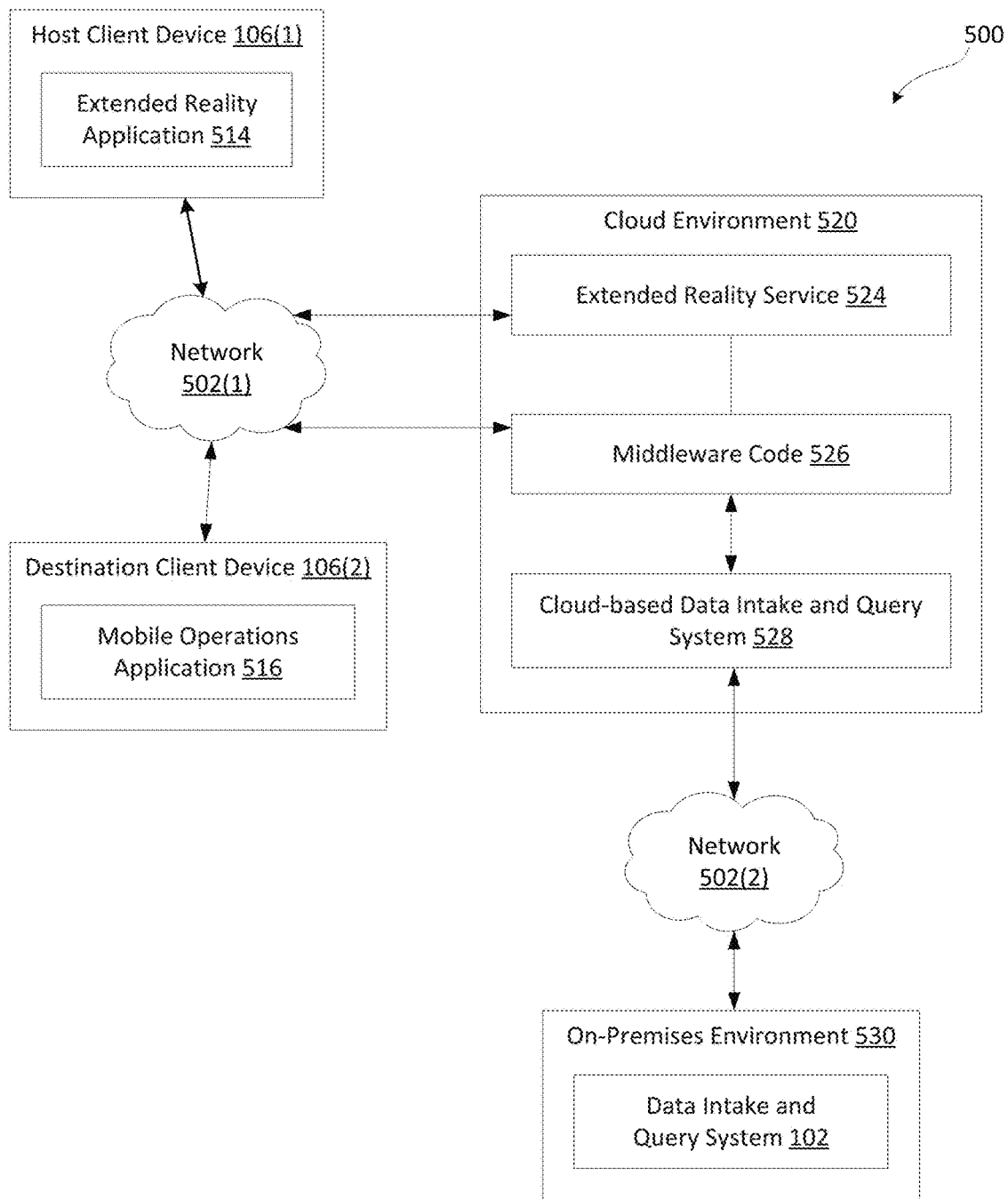
FIG. 5 illustrates a network architecture that enables secure communications via a network between client devices and an on-premises environment for the data intake and query system of FIG. 1, in accordance with example implementations.

FIG. 5 illustrates a network architecture that enables secure communications via network 502 (e.g., 502(1), 502(2)) between client devices 106 (e.g., 106(1), 106(2), etc.) and an on-premises environment 530 for the data intake and query system 102, in accordance with example implementations.

As described above, a user may install and configure, on computing devices owned and operated by the user, one or more software applications that implement some or all of the data intake and query system 102. For example, a user may install a software application on server computers owned by the user and configure each server to operate as one or more of a forwarder, an indexer, a search head, etc. This arrangement generally may be referred to as an "on-premises" solution. An on-premises solution may provide a greater level of control over the configuration of certain aspects of the system (e.g., security, privacy, standards, controls, etc.).

In various implementations, the cloud-based data intake and query system 528, executing in the cloud environment 520, may serve as a secure bridge between an on-premises environment 530 and an extended reality application 514 and/or a mobile operations application 516. In other implementations, the on-premises environment 530 may be omitted and the entire computational process may be carried out in one or more aspects or components of the cloud environment 520. In various implementations, the cloud environment 520 may include a cloud-based data intake and query system 528, which communicates with the data intake and query system 102 via a network 502(2). The cloud environment 520 may further include middleware code 526 and/or a push notification service (not shown), which communicate with the extended reality application 514, the mobile operations application 516, the sensor data device 508, and/or the hub device 504 via a network 502(1). In various implementations, the network 502(1) and the network 502(2) may be portions of the same network or may include one or more shared network components that communicate with both the network 502(1) and the network 502(2). In various implementations, the data intake and query system 102 may communicate with a network interface of a given client device 106 through use of a mobile gateway that facilitates communication between devices behind a firewall, or set of firewalls, without requiring additional port openings.

In various implementations, the client device 106 retrieves data and displays the retrieved data via the extended reality application 514 and/or the mobile operations application 516. For example, the client device 106(1) could send a query to the data intake and query system 102 in order to receive a response that includes a set of field values. These field values, extracted from events, could be associated with data included in the query. In various implementations, the client device 106 and/or the data intake and query system 102 may generate content (e.g., schemas, dashboards, cards, and/or visualizations) based on the extracted field values.

In various implementations, an object may have a tag that encodes or otherwise includes data. The data in the tag includes a textual and/or numerical string that operates as a unique identifier (UID). The tag is provided by an entity that owns or operates the environment in which the object resides. In such instances, the client device 106 may scan tags associated with the object, decode data included in the tag, determine a unique identifier from the decoded data, and use the unique identifier to receive field values, extracted from events, which are associated with the object. In various implementations, the client device 106 and/or the data intake and query system 102 may generate content (e.g., schemas, dashboards, cards, and/or visualizations) based on the extracted field values.

The extended reality application 514 executing on the client device 106(1) and/or the mobile operations application 516 executing on the client device 106(2) may establish secure, bidirectional communications with the data intake and query system 102. For example, in some implementations, a persistent, always-open, asynchronous socket for bidirectional communications (e.g., a trusted tunnel bridge) through a firewall of the on-premises environment 530 could be established between the data intake and query system 102 and the cloud-based data intake and query system 528. The cloud-based data intake and query system 528 may then communicate with the extended reality application 514 and/or the mobile operations application 516 via the middleware code 526 executing in the cloud environment 520.

Additionally, in some implementations, the cloud-based data intake and query system 528 and/or the middleware code 526 may communicate with the extended reality application 514 and/or the mobile operations application 516 via a push notification service, such as Apple Push Notification service (APNs) or Google Cloud Messaging (GCM). For example, the data intake and query system 102 could output to the one or more client devices 106, based on the unique identifier, content that includes real-time data associated with a particular object. The content could then be displayed by the client device 106. For example, the mobile operations application 516 could display the content in a window provided by the client device 106. In some implementations, the extended reality application 514 may display the content in relation to the real-world object, in conjunction with an augmented reality workspace. Additionally or alternatively, various playbooks, insights, predictions, annotations, and/or runbooks that include set of commands and/or logic trees (e.g., if-then-else) associated with an object and possible actions (e.g., "if the operating temperature is above 100 degrees Celsius, then show options for activating fans") may be implemented and/or displayed to the user.

In some implementations, in order to authenticate an instance of the extended reality application 514 and/or the mobile operations application 516 associated with a particular user and/or client device 106, the extended reality application 514 and/or the mobile operations application 516 may cause a unique identifier associated with the user and/or the client device 106 to be displayed on a display device (e.g., on a display of the client device 106). The user may then register the unique identifier with the cloud-based data intake and query system 528 and/or the data intake and query system 102, such as by entering the unique identifier into a user interface (e.g., a web portal) associated with the cloud-based data intake and query system 528 or the data intake and query system 102. In response, the extended reality application 514 and/or the mobile operations application 516 may receive credentials that can be used to access real-time data outputted by the data intake and query system 102. Additional queries transmitted by the client device 106 to the data intake and query system 102 may then implement the credentials associated with the unique identifier. In this manner, secure, bidirectional communications may be established between the client device 106 and the data intake and query system 102.

Once the communications connection is established, a user may cause the client device 106 to acquire data based on a tag provided by, or otherwise associated with, a given object. For example, the client device 106 could scan a tag and may decode the tag to retrieve a unique object identifier (UOID) from the tag that corresponds to the particular object.

Once the client device 106 obtains the UOID, the client device 106 transmits queries to the data intake and query system 102, requesting one or more values associated with the object. For example, the client device 106 could send a request for specific field values for the object. The client device 106 could include the UOID in the request that is sent to the data intake and query system 102. In response, the data intake and query system 102 may retrieve events associated with the UOID and may use extraction rules to extract values for fields in the events being searched, where the extracted values include the requested field values. The data intake and query system 102 then transmits the field values associated with the UOID to the client device 106. In various implementations, the data intake and query system 102 may transmit the raw data retrieved from the field values included in the event data. Alternatively, the data intake and query system 102 may filter, aggregate, or otherwise process the raw data prior to transmitting the field values. For example, in some implementations, the data intake and query system 102 may generate a dashboard associated with the unique object ID. The dashboard may include a filtered subset of data values, where the subset of data values is filtered based on additional criteria, such as user role (e.g., a user role identifier value), location, type of device (e.g., whether client device 106-1 is a smart phone, tablet, AR headset, etc.), and/or time.

The extended reality application 514 receives the field values from the data intake and query system 102, where the field values represent the values of one or more metrics associated with the UOID. In an implementation, the field values are extracted from fields that are defined post-ingestion (e.g., at search time), as has been previously described (e.g., with a late-binding schema). The field values transmitted by the data intake and query system 102 may be in any technically-feasible format.

In various implementations, the data intake and query system 102 may generate a dashboard that includes one or more visualizations of the underlying textual and/or numerical information based on the retrieved field values. In various implementations, the mobile operations application 516 may display one or more visualizations that are included in the dashboard received from the data intake and query system 102. Additionally or alternatively, the extended reality application 514 may generate an AR workspace that includes one or more panels, where the one or more panels include the visualizations (included in the dashboard) as a portion of an AR workspace. In some implementations, the dashboard may also include a portion of the field values as a data set. In such instances, the extended reality application 514 and/or the mobile operations application 516 may generate visualizations based on the field values included in the data set.

Figure 6:
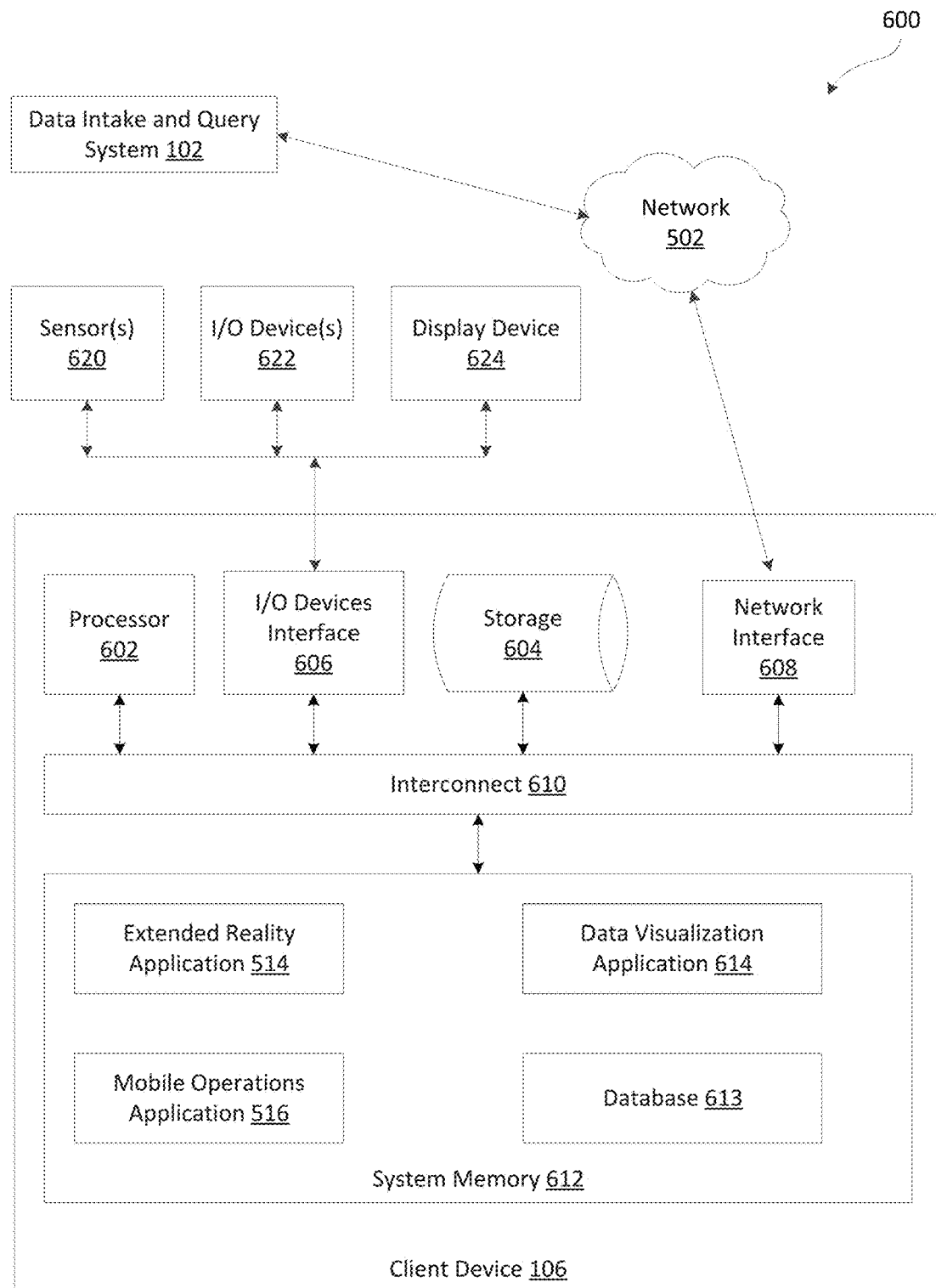
FIG. 6 illustrates a more detailed view of the example data processing environment of FIG. 1, in accordance with example implementations.

FIG. 6 illustrates a more detailed view of the example data processing environment 100 of FIG. 1, in accordance with example implementations. As shown, the data processing environment 600 may include, without limitation, the data intake and query system 102 and the client device 106 communicating with one another over the network 502. The data intake and query system 102 and the client device 106 function substantially the same as described in conjunction with FIGS. 1 and 5, except as further described herein. Examples of the client device 106 may include, without limitation, a mobile device (e.g., a smartphone, a tablet computer, a handheld computer, a wearable device, a portable media player, a virtual reality (VR) console, an augmented reality (AR) console, a laptop computer, a desktop computer, a server, a gaming device, a streaming device (e.g., an Apple TV® device, a Roku® device, etc.), and so forth. The client device 106 may include, without limitation, a processor 602, storage 604, an input/output (I/O)) device interface 606, a network interface 608, an interconnect 610, and system memory 612. The system memory 612 includes the extended reality application 514, mobile operations application 516, data visualization application 614 and database 613.

In general, the processor 602 may retrieve and execute programming instructions stored in the system memory 612. The processor 602 may be any technically-feasible form of processing device configured to process data and execute program code. The processor 602 could be, for example, a central processing unit (CPU), a graphics processing unit (GPU), an application-specific integrated circuit (ASIC), a field-programmable gate array (FPGA), and so forth. The processor 602 stores and retrieves application data residing in the system memory 612. The processor 602 is included to be representative of a single CPU, multiple CPUs, a single CPU having multiple processing cores, and the like. In operation, the processor 602 is the manager processor of the client device 106, controlling and coordinating operations of other system components.

The system memory 612 stores software application programs and data for use by the processor 602. For example, the system memory 612 could include, without limitation, the extended reality application 514, the mobile operations application 516, and/or a database 613. The processor 602 executes software application programs stored within the system memory 612 and, optionally, an operating system. In particular, the processor 602 executes software and then performs one or more of the functions and operations set forth in the present application.

The data visualization application 614 is an application that displays, computes, and/or generates data based on data received from the data intake and query system 102. In some embodiments, the data visualization application 614 may use the an identifier for an object (object ID) and/or a dashboard (dashboard ID) to retrieve field values, extracted from events, which are associated with a specific object or environment. In various embodiments, the client device 106 and/or the data intake and query system 102 may generate content (e.g., schemas, dashboards, cards, and/or visualizations) based on the extracted field values.

In various embodiments, the data visualization application 614 retrieves data by querying a field-searchable data store included in the network. For example, the data visualization application 614 could be an instance of the SPLUNK® ENTERPRISE system, an application within the cloud-based environment, such as SPLUNK CLOUD™, an application for a self-service cloud, or another deployment of an application that implements the Splunk processing language (SPL).

For example, the data visualization application 614 could implement the data intake and query system 102 in order to extract one or more fields of data from a field-searchable data store. In such instances, the data visualization application 614 could retrieve the extracted fields as portions of a text string, such as: 2018-07-28 00:07:01,781 INFO [async_client] [async_client] [async_post_request] POST headers={'Authorization':u'SplunkM4q2ROpGJCpng81 W 18JJsy VlyGIxrIhI_1UsIUxvVk3m_112q6Q83Drf7P68v8H68kv Q7 RHgA2eJz50-LSnw4d00yw EsTodODOjdWDNGhj9zFGN-RuCiBWovEyXn025X3_aNjSwyO_rE_ik7', Content-Type: app lication/json'}, uri=https://127.0.0.1:8089/servicesNS/ nobody/spacebridge-app/storage/collections/data/ alert_recipient_devices, params-None, data={"py/object": "spacebridge app.data.alert_data. RecipientDevice", "timestamp": "1532736421.201776", "alert_id": "5b5bb3 a580db6133e603d33f", "device_id": "y+DJALQwOXERwVDBzUe340yalMINAId0IPzRB dtt91U="} host=ip-10-0-240-141 source=/opt/splunk/var/ log/splunk/spacebridge-app.log sourcetype=spacebridge-app-too_small.

In some embodiments, the data intake and query system 102 may send messages to the data visualization application 614 in accordance with a push notification service (not shown), such as the APPLE® Push Notification service (APN), or GOOGLE® Cloud Messaging (GCM). For example, the data visualization application 614 could receive various schemas, dashboards, playbooks, runbooks, cards, and/or visualizations that include real-time data associated with a particular machine and/or set of field-searchable events.

The storage 604 may be a disk drive storage device. Although shown as a single unit, the storage 604 may be a combination of fixed and/or removable storage devices, such as fixed disc drives, floppy disc drives, tape drives, removable memory cards, or optical storage, network attached storage (NAS), or a storage area-network (SAN). The processor 602 communicates to other computing devices and systems via the network interface 608, where the network interface 608 is configured to transmit and receive data via one or more communications networks 502.

The interconnect 610 facilitates transmission, such as of programming instructions and application data, between the processor 602, the input/output (I/O) device interface 606, the storage 604, the network interface 608, and the system memory 612. The I/O device interface 606 is configured to receive input data from user I/O devices. These I/O devices include, without limitation, sensor(s) 620 (e.g., one or more cameras, location sensor(s), etc.), input device(s) 622 (e.g., a keyboard, stylus, microphone, etc.), and/or a display device 624. The display device 624 generally represents any technically-feasible means for generating an image for display. For example, the display device 1924 could be a liquid crystal display (LCD) display, an organic light-emitting diode (OLED) display, or a digital light processing (DLP) display. The sensor 620, such as camera, acquires images via a lens and converts the images into digital form. The images acquired by the camera may be stored in the storage 604 and/or the system memory 612. An acquired image may be displayed on the display device 624, either alone or in conjunction with one or more other acquired images, graphical overlays, and/or other data.

The sensor(s) 620 may include location sensors enable the client device 106 to determine the physical location and/or orientation of the client device 106. In some implementations, the location sensor(s) may include a network-based sensor that communicates with the data intake and query system 102 via the network 502, which may be part of a production-monitoring network. In some implementations, the location sensor(s) may include a network-based sensor that communicates with one or more data intake and query systems 102 via a local area network (LAN) and/or a wide area network (WAN) In various implementations, the production-monitoring environment may include multiple objects (e.g., sensor data devices 508) and/or multiple client devices 106. Each of the client devices 106 may communicate with a data intake and query system 102, and each of the client devices 106 is capable of identifying one or more objects based on identifier tags, geofences, and/or any other object-identification technique disclosed herein.

The I/O devices 622 may include a microphone that acquires audio signals for storage and analysis. Additional examples of user I/O devices 622 (not explicitly shown) may include one or more buttons, a keyboard, and a mouse or other pointing device. The I/O device interface 606 may also include an audio output unit configured to generate an electrical audio output signal, and the additional user I/O devices 622 may further include a speaker configured to generate an acoustic output in response to the electrical audio output signal.

6.0. Secure Update of Dashboard Properties

Accordingly, in various implementations disclosed herein, a data processing environment includes a host device and one or more destination devices that are connected via a tunnel bridge. In particular, the host device changes one or more properties of a host dashboard, where the host dashboard provides insights to various operations via retrieved data values. For example, the host device provides dashboard property modifications through the tunnel bridge to the one or more destination devices. A given destination device includes a destination dashboard that corresponds to the dashboard included in the host device. Upon receipt of the modifications, the destination device applies the modifications to the destination dashboard.

In another example, host device may transmit the dashboard property modification to a device simulator, where a given device simulator models the operation of software operating on a specific type of device. A given device simulator modifies a property of a dashboard that is included in the given device simulator. The given device simulator then provides the modified simulated dashboard to at least one of the host device or the destination device, where the receiving device displays the modified simulated dashboard. Further, the given device simulator generates a dashboard screenshot of the generated dashboard. In such instances, the given device simulator transmits the screenshot to remote storage, where the host device or the destination devices retrieves the dashboard screenshot for display.

7.0 Networked Remote Collaboration System

Figure 7:
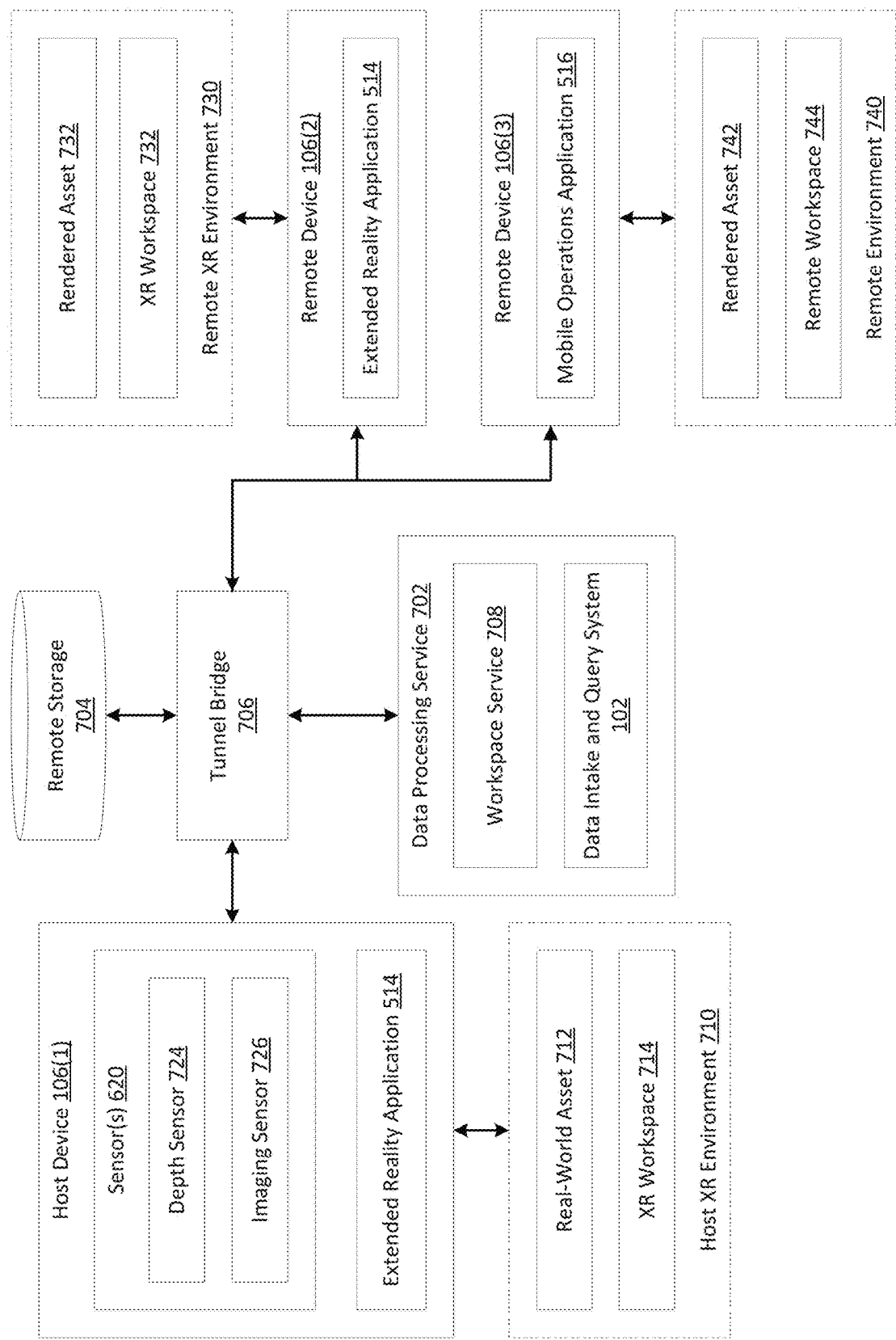
FIG. 7 illustrates a block diagram of an example networked computer environment, in accordance with example implementations.

FIG. 7 illustrates a block diagram of an example networked computer environment 700, in accordance with example implementations. As shown, a networked computer environment 700 may include, without limitation, host device 106(1), one or more remote devices 106, data processing service 702, remote storage 704, tunnel bridge 706, host extended reality (XR) environment 710, remote XR environment 730, coupled to remote device 106(2) and remote environment 740 coupled to remote device 106(3). Host device 106(1) includes depth sensor 724, imaging sensor 726, and XR application 514. Host XR environment 710 includes real-world asset 712 and XR workspace 714. Remote XR environment 730 includes rendered asset 732 and XR workspace 734. Remote environment 740 includes rendered asset 742 and remote workspace 744. Data processing service 702 includes workspace service 708 and data intake and query system 102.

In various embodiments, host device 106(1) functions substantially the same as client device 106, except as further described herein. Examples of host device 106(1) may include, without limitation, a smartphone, a tablet computer, a handheld computer, a wearable device, an XR console, a laptop computer, a desktop computer, a server, a portable media player, a gaming device, and so forth. In some embodiments, host device 106(1) executes one or more applications that present, compute, or generate data based on data received from data processing service 702. In some embodiments, host device 106(1) may include, without limitation, smartphones, tablet computers, handheld computers, wearable devices, laptop computers, desktop computers, servers, portable media players, gaming devices, an Apple TV® devices, and so forth.

For example, host device 106(1) may execute an extended reality (e.g., augmented reality (AR), mixed reality (MR), and/or virtual reality (VR)) application, which presents a portion of a real-world environment, performance metrics associated with assets in the real-world environment, and/or other data as provided by data intake and query system 102 and/or data processing service 702. In various embodiments, XR application 514 included in host device 106(1) may generate host XR environment 710 based on sensor data acquired from sensor(s) 620. For example, XR application 514 may include imaging data acquired by imaging sensor 726 when generating host XR environment 710.

Sensor(s) 620 includes various sensors that acquire data about the real-world environment. In various embodiments, host device 106(1) may include sensor(s) 620. For example, host device 106(1) that includes depth sensor 724 and imaging sensor 726 Additionally or alternatively, host device 106(1) may control one or more sensor(s) 620 that are communicatively coupled to host device 106(1). For example, host device 106(1) may be a desktop computer that controls the movement and operation of one or more wireless cameras. In various embodiments, sensor(s) 620 may include additional sensors, such as audio sensors, position sensors (e.g., an accelerometer and/or an inertial measurement unit (IMU)), motion sensors, and so forth.

Depth sensor 724 includes one or more sensors that acquire sensor data relating to the depth of objects within an environment. For example, depth sensor 724 may be one or more (e.g., camera array) light detection and ranging (LiDAR) cameras that generate depth information based on reflected light. In various embodiments, depth sensor 724 generates depth sensor data using on or more depth imaging techniques, such as triangulation, structured light imaging, time-of-flight imaging, stereo imaging, laser scan, and so forth. In some embodiments, host device 106(1) may compute various depth properties of the environment using the sensor data and generate 3D depth data that includes the computed depth properties. Additionally or alternatively, host device 106(1) may transmit the 3D depth data to remote device(s) 106 for further processing. In some embodiments, depth sensor 724 may include one or more infrared sensors, time-of-flight depth sensors, stereo depth sensors, audio depth sensors (e.g., RADA®sensors, sonograms, etc.), and so forth.

Imaging sensor 726 includes one or more optical sensors, such as RGB cameras, infrared cameras, and/or camera arrays, which includes two or more of such cameras. Other imaging sensors may include imagers and/or lasers sensors. In various embodiments, host device 106(1) may generate 2D surface data from the image sensor data acquired by imaging sensor 726.

In various embodiments, host device 106(1) may provide updates to the imaging data (e.g., depth sensor data and image sensor data) associated with real-world environments. For example, host device 106(1) may update the 2D surface data and the 3D depth data associated with a real-world environment by re-scanning the real-world environments (e.g., re-scanning every 10 seconds) using imaging sensor 726 and depth sensor 724. Such re-scanning may be triggered in multiple ways. For example, host device 106(1)

may be triggered to attempt a rescan at periodic intervals (e.g., a setting to attempt a rescan every 20 seconds, every 5 minutes. etc.), in response to a change in the location of host device 106(1), and/or in response to actions taken by remote device 106(2) or 106(3) (e.g., receiving a message requesting a re-scan). Additionally or alternatively, host device 106(1) may receive a user input to rescan a portion of the environment. In such instances, host device 106(1) may acquire new depth sensor data from depth sensor 724 and image sensor data from imaging sensor 726 in response to the user input.

XR application 514 included in host device 106(1) acquires environmental data for the real-world environment for use in a remote collaboration session. In various embodiments, XR application 514 may receive the depth sensor data and image sensor data and generate respective 3D depth data and 2D surface data. In such instances, XR application 514 may combine correlated 3D depth data and 2D surface data to generate an XR stream and transmit the XR stream to one or more recipients (e.g., remote devices 106, remote storage 704, etc.). In some embodiments, XR application 514 may generate an adaptable 3D representation of the real-world environment (e.g., determining coordinates corresponding to the 3D depth data and/or 2D surface data and storing the set of coordinates as a scene) corresponding to a scene of the physical space and transmit the adaptable 3D representation to one or more recipients.

In some embodiments, host device 106(1) may convert the adaptable 3D representation of the real-world environments, included in the XR stream, into geometry data that represents the scene being shared by host device 106(1). In such embodiments, host device 106(1) may convert correlated 3D depth data and 2D depth data into coordinate-based sets of vertices, edges, and textures. Host device 106(1) may then group the sets of vertices, edges, and textures into geometry data for other devices to reconstruct. In some embodiments, host device 106(1) may set an anchor point as the origin of a scene and may determine coordinate data (e.g., x-axis, y-axis, and z-axis coordinates) from the anchor point for portions of the 3D depth data and/or 2D surface data. Based on the determined coordinates, host device 106(1) may convert the 2D surface data and/or the 3D depth data into a set of vertices at specific coordinates, a set of faces comprising edges between pairs of vertices, and texture data for specific coordinates.

For example, host device 106(1) may convert determined coordinates for portions of 3D depth data included in the XR stream. Host device 106(1) may then use the coordinates to determine sets of triangles that form faces of a combined mesh. A given triangle may have vertices defined as coordinates that have the anchor point as an origin Host device 106(1) may also convert the 2D surface data into one or more sets of textures, where a given texture corresponds to a specific face, by correlating the image data from the image sensor to the depth data. In various embodiments, remote device 106 may render the scene by generating meshes that have faces formed by the triangles included in the geometry data. Remote device 106 may then apply textures to the corresponding faces (e.g., fill a triangle with the texture that has the corresponding coordinates). Various techniques of generating the portions of a scene from geometry data is described in further detail in pending U.S. Patent Application entitled "MESH UPDATES IN AN EXTENDED REALITY ENVIRONMENT" (U.S. Ser. No. Ser. No. 17/086,297) filed on 30 Oct. 2020, and which is hereby incorporated by reference in its entirety for all purposes.

In some embodiments, XR application 514 may generate the XR stream for a real-time remote collaboration session. In such instances, XR application 514 may first determine a correlation between the 3D depth data and the 2D surface data. In some implementations, the 2D surface data is clipped to match the 3D depth data, and the relative locations of the 2D surface data and the 3D depth data are correlated such that the 2D surface data may be made into texture data that can be applied to the 3D depth data. For example, XR application 514 may determine that a section of the 2D surface data shares common coordinates with a section of the 3D depth data. Based on the correlation between the 3D depth data and the 2D surface data, XR application 514 may combine the 3D depth data and the 2D surface data to generate the XR stream. Host device 106(1) may then transmit the XR stream via tunnel bridge 706 to remote devices 106 for reproduction. In some embodiments, the XR stream includes rendered assets 732, 742, which are digital reproductions of real-world asset 712 included in the real-world environment. Alternatively, remote device 106(2) may use data included in the XR stream to generate rendered asset 732 (e.g., a 3D model of real-world asset 712) in remote XR environment 730, while remote device 106(3) may use data included in the XR stream to generate rendered asset 742 (e.g., a 2D model of real-world asset 712) in remote environment 740.

Host XR environment 710 includes real-world asset 712 and XR workspace 714. In various embodiments, XR application 514 produces host XR environment 710 for presentation via a display device associated with host device 106(1). For example, XR application 514 may generate host XR environment 710 and present a portion of host XR environment 710 via a display device. In such instances, host device 106(1) may present at least a portion of real-world asset 712.

In some embodiments, XR application 514 may generate an XR workspace 714 that includes one or more augmented reality (AR) elements. Such AR elements may include one or more display panels that are associated with portions of the environment. For example, real-world asset 712 may be registered with data processing service 702 and may stream data to data processing service 702, where data processing service 702 ingests and stores the data via data intake and query system 102. When generating XR workspace 714, XR application 514 may send one or more queries to receive data values, dashboards, playbooks, and so forth, to present within XR workspace 714. Any AR elements may be included, such as panels that display the content (e.g., schemas, dashboards, cards, and/or visualizations generated from the extracted field values), directional indicators (e.g., pointers at the edge of the display device indicating the position of portions of the AR workspace relative to the position and/or orientation of imaging sensor 726). Other example AR elements include a full graphics overlay, a partial graphics overlay, text data (e.g., alerts, runbooks, playbooks, etc.), numerical data, color information, and/or icon data (e.g., a skull-and-crossbones symbol indicating that a machine that has failed), and/or one or more virtual objects.

In various embodiments, XR workspace 714 may include various collaboration tools that enable the user to interact with portions of the host XR environment 710. For example, XR workspace 714 may include graphical pointers that highlight a small portion of the host XR environment 710. Other collaboration tools may include, for example, a color palette, a map of host XR environment 710, a set of highlight pins, and so forth. In some embodiments, XR application 514 may provide a specific set of AR elements based on the user of host device 106(1). For example, a user may be associated with a user identifier, role identifier and/or other criteria that correspond to a specific XR workspace 714. In such instances, XR application 514 may generate XR workspace 714 based on the specific criteria associated with the host user.

Remote device(s) 106 (e.g., 106(2), 106(3), etc.) functions substantially the same as client device 106, except as further described herein. Examples of remote device 106 may include, without limitation, a smartphone, a tablet computer, a handheld computer, a wearable device, an XR console, a laptop computer, a desktop computer, a server, a portable media player, a gaming device, and so forth. In some embodiments, host device 106(1) executes one or more applications that present, compute, or generate data based on data received from data processing service 702. In some embodiments, host device 106(1) may include, without limitation, smartphones, tablet computers, handheld computers, wearable devices, laptop computers, desktop computers, servers, portable media players, gaming devices, an Apple TV® devices, and so forth. It is noted that "remote" in this context means located at a different location, relative to host device 106(1). In various embodiments, what constitutes "remote" may differ based on the use case, but no minimum or maximum distance is specified here or required. There may be implementations in which remote device 106 is in the next room from the host device, or implementations where the remote device is thousands of miles away.

In various embodiments, remote device 106 may generate a digital reproduction of a portion of the real-world environment based on data included in the XR stream provided by host device 106(1). In some embodiments, remote device 106 may receive the XR stream as a set of serialized chunks that are below a specific data size (e.g., below 1 MB). In such instances, remote device 106 may combine the set of serialized chunks into the XR stream and retrieve data from the XR stream.

Remote device 106(2) executes an instance of XR application 514 to generate remote XR environment 730. In various embodiments, XR application 514 may extract the 3D depth data and the 2D surface data included in the XR stream and may generate an adaptable 3D representation of the real-world environment. The adaptable 3D representation corresponds to the scene of the physical space and may include rendered asset 732, which is a digital representation of real-world assets 712 that is included in the real-world environment. XR application 514 may also generate an XR workspace 734 within remote XR environment 730. In some embodiments, remote device 106(2) may also render one or more portions of a background that correspond to areas proximate to real-world asset 712 (e.g, the texture of the floor surrounding real-world asset 712)

While in some embodiments, XR workspace 734 may be the same as XR workspace 714, in other embodiments, XR workspace 734 may be different. For example, in some embodiments, XR workspace 734 may include different AR elements than AR elements included in the XR workspace 714 included in the host XR environment 710. For example, a technician may operate host device 106(1), where XR workspace 714 includes a first set of display panels, while an expert may operate remote device 106(2), where XR workspace 734 includes a second set of display panels. XR workspaces 714, 734 may differ based on a number of different factors, for example, XR workspaces 714, 734 may be adjusted based on a type of remote device 106(2), or based on a user or a profile of a user that operates the various devices 106(1) and 106. For example, a local technician operating host device 106(1) may not have sufficient access to see certain XR environment information, so those informational elements may be blocked or otherwise not shown in XR workspace 714, but may be visible to a higher-privileged user or user role of a user working in XR workspace 734 in remote device 106.

In other implementations, the system may be designed to simplify the information displayed in XR workspace 714 to more clearly illustrate the instructions and information given to the user of host device 106(1). In some embodiments, such access control and XR environment decisions may be made by data processing service 702. In other embodiments, data processing service 702 may send the same environments to host devices 106(1) and 106, and the respective XR applications 514 of host device 106(1) and 106 may perform some processing to determine what elements to display in XR workspaces 714 and 734, respectively. In still other embodiments, it may be a combination of data processing serviced 702 and XR applications 514, working in concert at various times, to determine the specific layouts and elements of XR workspaces 714 and 734. In various embodiments, remote device 106(2) may generate remote XR environment 730 in real time.

In various embodiments, XR application 514 may provide controls that enable the remote user to navigate remote XR environment 730 independent of the position of host device 106(1). In various embodiments, host device 106(1) may initially scan a portion of the real-world environment that includes real-world asset 712. Host device 106(1) may provide the 3D depth data and 2D surface data in the XR stream, where XR application 514 generates a scene that is a digital reproduction of the scanned portion Upon generating the scene, XR application 514 may respond to navigation inputs (e.g., physically moving remote device 106(2), applying navigation inputs) by changing the viewing position of remote device 106(2) within the remote XR environment 730 and presenting a different portion of the scene.

In various embodiments, XR application 514 in remote device 106 may receive data from the XR stream based on host device 106(1) rescanning at least a portion of the real-world environment. In such instances, XR application 514 may update the remote XR environment 730 by re-generating the corresponding portion of the digital representation of the updated portion while maintaining the digital representation of the non-updated portions. In some embodiments, XR application 514 may first compare the differences between the existing scene and the updated 2D surface data and 3D depth data and may only regenerate the scene upon the determining that the changes are above a threshold level.

In some embodiments, XR application 514 may generate rendered asset 732 by combining portions of the 3D depth data and 2D surface data included in the XR stream. For example, XR application 514 may apply a portion of the 2D surface data as a texture to a corresponding portion of the 3D depth data. In some embodiments, XR application 730 may separate rendered asset 732 from other portions of the scene. Alternatively, remote device 106(2) may combine the 3D depth data and 2D surface data included in the XR stream. In such instances, XR application 514 may generate the scene without specifically identifying rendered asset 732.

XR workspace 734 includes one or more augmented reality elements, such as dashboards and other interaction and/or collaboration tools. In various embodiments, when generating XR workspace 734, XR application 514 included in remote device 106(2) may send one or more queries (via tunnel bridge 706) to receive data values, dashboards, playbooks, and so forth, to present within XR workspace 734. Additionally or alternatively, XR workspace 734 may include various collaboration tools that enable the remote user to interact with portions of the remote XR environment 730. In such instances, XR application 514 may transmit data to data processing service 702 and/or host device 106(1) based on the identified interaction.

In one example, the remote user may use the color palette interaction tool to change the color of a specific portion of rendered asset 732 (e.g., changing the color of a non-functioning fan). XR application 514 may send data to host device 106(1) that causes the host XR workspace 714 to add a highlighted region over the corresponding portion of real-world asset 712. In another example, XR application 514 may receive an input that requests updated data for a display panel included in XR workspace 734. XR application 514 may then respond to the data request by sending a query to data processing service 702 that processes the data query via data intake and query service 108.

In some embodiments, remote device 106 may generate an environment for remote collaboration other than an extended reality environment. For example, a remote user may use a web browser to view a two-dimensional reproduction of the real-world environment. In such instances, remote device 106(3) may execute a different application (e.g., mobile operations application, a web browser, a VR application, etc.) to view a non-XR environment. In some embodiments, remote device 106(3) may generate a non-XR remote environment 740 while remote device 106(2) generates remote XR environment 730. In some such environments, in which remote device 106(3) is a non-XR environment, the XR environment that would have been displayed may be translated into a non-XR environment to the extent possible, e.g., multimedia files may be displayed as popups, text may be displayed as tooltips, runbooks may be executed on mouse button click, or any combination thereof.

In various embodiments, mobile operations application 516 may enable a different remote user to navigate and interact with remote environment 740 independent of host device 106(1) and/or remote device 106(2). For example, after mobile operations application 516 generates remote environment 740, mobile operations application 516 may provide navigational controls that enable the remote user to change the position of remote device 106(3) within remote environment 740 independent of the position of host device 106(1).

Mobile operations application 516 generates remote environment 740, where remote environment 740 includes rendered asset 742 and remote workspace 744. In some embodiments, rendered asset 742 may have a different format than rendered asset 732. For example, rendered asset 732 may be a 3D mesh representation of real-world asset 712, while rendered asset 742 may be a 2D photograph or icon of real-world asset 712, or a flattened version of the 3D mesh representation of real-world asset 712. Mobile operations application 516 also generates remote workspace 744. In some embodiments, remote workspace 744 includes display panels and/or interaction tools within an adaptable 3D representation of the real-world environment. Alternatively, remote workspace may include display panels and/or interaction tools that are positioned outside the adaptable representation. For example, remote environment 740 may present the adaptable representation of the real-world environment in a first window, and present one or more display panels, displaying data associated with the real-world asset, in a second window.

Data processing service 702 processes data associated with a remote collaboration session. In various embodiments, data processing asset 802 includes a workspace service 708 that manages actions performed by host device 106(1) and/or remote device(s) 106 in relation to the remote collaboration session. Data intake and query system 102 manages the retrieval and transmission of data values associated with one or more real-world assets 712 included in the real-world environment.

In various embodiments, data processing service 702 receives data from one or more real-world assets 712. In some embodiments, data processing service 702 may be a data ingestion application, such as a data stream processor (DSP) that ingests sensor data transmitted by one or more real-world assets 712 in real time. In such instances, data processing service 702 may generate a processed data set and transmit the processed data set to data intake and query system 102 for storage in one or more data stores. Additionally or alternatively, data processing service 702 responds to data requests by retrieving field values via the data intake and query system 102, where the field values represent the values of one or more metrics associated with a particular real-world asset 712. In an implementation, the field values are extracted from fields that are defined post-ingestion (e.g., at search time), as has been previously described (e.g., with a late-binding schema). The field values transmitted by data intake and query system 102 may be in any technically-feasible format.

In various embodiments, data intake and query system 102 generates a dashboard that includes one or more visualizations of the underlying textual and/or numerical information based on the retrieved field values. In various embodiments, the dashboard may present in one or more visualizations included in the dashboard received from data intake and query system 102. One or more workspaces 714, 734, 744 include one or more display panels that present the visualizations included in the dashboard. In some embodiments, the dashboard may also include a portion of the field values as a data set. In such instances, XR application 514 and/or mobile operations application 516 may generate visualizations based on the field values included in the data set.

Workspace service 708 manages actions performed by host device 106(1) and/or remote device(s) 106 in relation to the remote collaboration session. In various embodiments, one or more remote devices 106 may register or subscribe to receive the XR stream generated by host device 106(1) for a given remote collaboration session. In such instances, workspace service 708 may cause data chunks corresponding to the XR stream to be transmitted to subscribed recipients. Additionally or alternatively, workspace service 708 may cause the XR stream and/or other interaction data (e.g., recorded audio, actions performed by host device 106(1) and/or remote device(s) 106) to be stored in remote storage 704. In some embodiments, workspace service 708 may send notifications to a target recipient (e.g. remote device 106(2)) to join a remote collaboration session.

Remote storage 704 includes one or more data stores that store information associated with a remote collaboration session. In various embodiments, host device 106(1) may transmit the XR stream to remote storage 704, where remote storage stores the XR stream as a combination of 2D surface data and 3D depth data. In such instances, the stored 2D surface data and 3D depth data is much smaller in data size than an equivalent high-definition video clip. Remote storage 704 may also store other data associated with the XR stream. For example, remote storage 704 may receive and store one or more activity logs from host device 106(1) and/or remote devices 106. In some embodiments, remote storage 704 may store an initial set of data chunks and subsequent sets of update chunks. In such instances, subsequent update data chunks may overwrite previous update chunks.

In some embodiments, a device may subsequently download data from remote storage 704 and may replay the remote collaboration session. In such instances, the device may navigate the adaptable 3D representation of the real-world environment, as well as view actions performed by participants, e.g., as recorded in the activity log. For example, a quality assurance technician may replay the remote collaboration session to determine how experts explained an issue during a recorded remote collaboration session by viewing how an expert, e.g., a user operating remote device 106(2), identified an issue and used the interaction tools to notify other participants during the recorded remote collaboration session.

In some embodiments, the XR workspace 734 may be stored as part of the remote collaboration session. In other embodiments, when the remote collaboration session is played back, the system may contact data processing service 702 and re-generate the XR workspace 734 as part of the playback. In such implementations, XR workspace 734 may show the data, e.g., data from dashboards, as it appeared when the remote collaboration session was created. In other implementations, XR workspace 734 may show a same or similar XR workspace 734 as when the remote collaboration session was created, but updated with all or partial new data from the time that the remote collaboration session is played back. These features can be toggled or changed when the remote collaboration session is played back, depending on the use case, for example, some use cases may want to see the XR workspace 734 data the same as when the session was created, e.g., for security incidents or other instances where the session is to be replayed exactly or stored for audit purposes. In other use cases, the remote collaboration session may show updated data, such as when an unskilled technician wants to view the session with updated data, e.g., to check on the status of an industrial IoT (Internet of Things) environment, such as a factory floor, assembly line, or any other connected workspace, e.g., an airport security area.

Tunnel bridge 706 is a device that establishes communications with one or more devices included in the networked computer environment 700. For example, tunnel bridge 706 may establish one or more WebSocket connections with host device 106(1), remote devices 106, data processing service 702, and/or remote storage 704. In some embodiments, tunnel bridge 706 may be a trusted service that establishes trust with one or more devices in order to establish secure WebSocket connections with such devices. In some embodiments, tunnel bridge 706 may perform authentication operations with other devices in order to establish trust, and may then establish secure communications channels with the other devices, where tunnel bridge 706 and/or other devices and transmit secure communications using the secure communications channels.

In some embodiments, tunnel bridge 706 enables E2EE communications between two separate devices by forwarding one or more encrypted data packets without fully decrypting the encrypted data packet. For example, tunnel bridge 706 may receive an encrypted data packet that was encrypted and signed using multiple encryption keys. The trusted tunnel bridge 706 may determine whether the encrypted data packet was validly signed with one of the encryption keys without decrypting the encrypted data packet.

Figure 8:
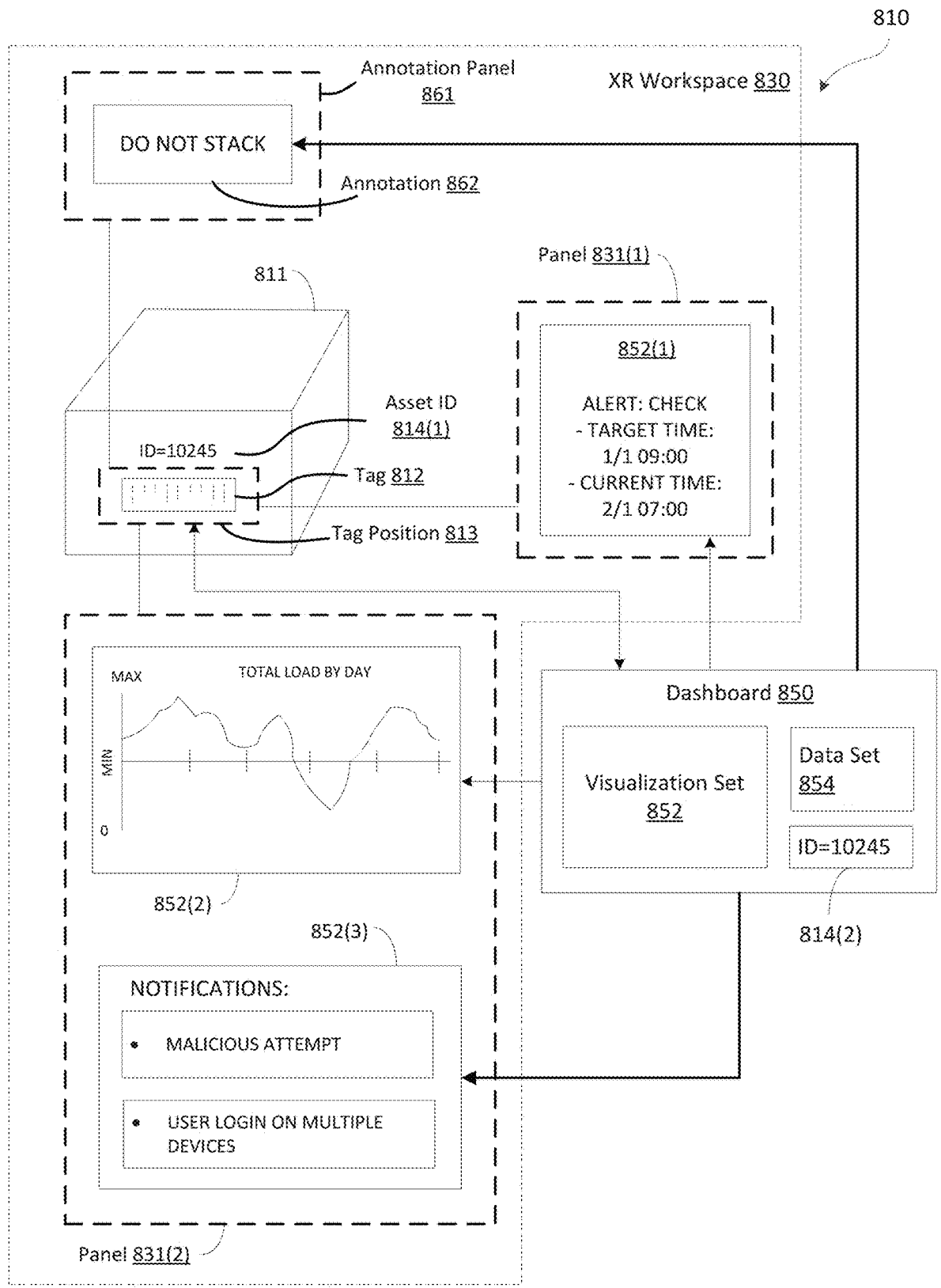
FIG. 8 illustrates an example extended reality environment that presents information using the networked computer environment, in accordance with example implementations.

FIG. 8 illustrates an example extended reality environment that presents information using the networked computer environment, in accordance with example implementations. As shown, remote collaboration system 810 includes asset 811, XR workspace 830, and dashboard 850. Asset 811 includes tag 812 that includes unique asset ID 814 at tag position 813. XR workspace 830 includes a plurality of panels 831 (e.g., 831-1, 831-2) and/or annotation panel(s) 861. Dashboard 850 includes visualization set 852, data set 854, and a copy of unique asset ID 814-2.

In various embodiments, XR application 514 may identify a given asset 811 that has been registered with data processing service 702, where data intake and query service 108 ingests and stores sets of data values associated with the asset (e.g., performance metrics associated with the operation of asset 811). In some embodiments, XR application 514 generates XR workspace 830 within a given environment (e.g., host XR environment 710, remote XR environment 730, etc.) and presents various images in one or more panels 831 within XR workspace 830 on a display device of host device 106(1) and/or remote device 106.

Each of the panels 831, 861 is positioned within XR workspace 830 relative to tag position 813. In some embodiments, XR application 514 may scan tag 812 in order to receive XR workspace 830 and/or dashboard 850 from data intake and query system 102. In other implementations, XR application 514 may respond to scanning tag 812 by requesting one or more field values associated with unique asset ID 814 encoded in the tag 812 from data intake and query system 102. In such instances, XR application 514 responds to receiving the field values by generating XR workspace 830 and/or dashboard 850 from the one or more received field values. Dashboard 850 includes visualization set 852 (e.g., 852-1, 852-2, etc.) and/or data set 854. Dashboard 850 provides one or more visualizations included in visualization set 852 to present within one or more panels 831 of XR workspace 830

Extended reality (XR) workspace 830 includes one or more portions of graphics overlays (e.g., panels 831 and/or annotation panel 861) and/or indicators within the extended reality environment. In various embodiments, XR workspace 830 may include a full graphics overlay, or a partial graphics overlay. Additionally or alternatively, portions of XR workspace 830 may include text data, numerical data, color information, and/or icon data (e.g., a skull-and-crossbones symbol indicating that a machine has failed). For example, a portion of an overlay within XR workspace 830 may include a highlighted portion, signifying information of particular interest to the user.

In some embodiments, the field values provided by data intake and query system 102 may include only the underlying textual and/or numerical information. In such instances, XR application 514 may generate graphical overlays locally based on the underlying textual and/or numerical information. In various embodiments, the one or more overlays within XR workspace 830 may be static, or may be dynamically updated. For example, panel 831-1 may include visualization 852-2 that illustrates a total data load in relation to the operation of asset 811. In this instance, XR application 514 may send multiple requests to data intake and query system 102 while viewing XR workspace 830 in order to receive updated field values. XR application 514 may dynamically update visualization 852-2 based on the updated field values received from data intake and query system 102. In some implementations, one or more overlays may include interactive hooks to allow an operator of the system to interact with the one or more overlays.

Although various embodiments disclosed herein are described in conjunction with extended-reality techniques (e.g., generating XR overlays), each extended-reality technique also may be implemented in a non-XR environment. Further, specific XR techniques (e.g., virtual-reality techniques, augmented-reality techniques, etc.) disclosed herein also may be implemented in other environments. For example, for clarity of explanation, various embodiments disclosed herein are described in conjunction with AR overlays (e.g., field values, images, dashboards, cards, etc.). However, each of these embodiments may also be implemented by generating such overlays in a VR environment. Accordingly, the term extended reality (XR) may be used to refer to techniques that can be performed in an AR environment, a VR environment, and/or any combination thereof.

In various embodiments, XR application 514 superimposes XR workspace 830 onto the image(s) acquired via image sensor 726. For example, one or more panels 831-1, 831-2 and/or annotation panel 861 may be overlaid at positions relative to tag position 813 corresponding to tag 812, such as next to tag position 813 and/or in front of tag position 813. XR application 514 causes the images superimposed with XR workspace 830 to be presented on a display device.

In some embodiments, XR application 514 may cause XR workspace 830 to be presented on a display device without presenting the acquired image. In general, XR application 514 superimposes portions of XR workspace 830 based on any of one or more determined dimensions and/or positions of asset 811, the known size of tag 812, the three-dimensional location and/or orientation of tag position 813, and the detected plane of tag position 813. In some embodiments, XR application 514 places portions of XR workspace 830 over portions of the adaptable 3D environment. For example, XR application 514 may superimpose portions of XR workspace 830 over portions of rendered asset 732.

In some embodiments, XR application 514 may receive additional information from data intake and query system 102 and may present the additional information on a display device. This additional information may be in any technically-feasible format. For example, data intake and query system 102 may transmit content (e.g., various schemas, dashboards, cards, playbooks, runbooks, and/or visualizations) to XR application 514. The contents include data, including real-time data (e.g., near real-time data) associated with asset 811 retrieved by data intake and query system 102 based on unique asset ID 814. XR application 514 may then display the content in conjunction with the real-world asset 811 using XR workspace 830.

For example, XR application 514 may request data relating to asset 811 by generating a data request that includes unique asset ID 814-1 and sending the data request to data intake and query system 102. XR application 514 may then receive dashboard 850 from data intake and query system 102 that includes data set 854, which includes one or more field values retrieved by data intake and query system 102 in response to the data request. In some embodiments, dashboard 850 may include various insights, predictions, and/or annotations associated with asset 811. For example, data intake and query system 102 may employ various machine-learning (ML) algorithms to generate one or more predictions associated with field values included in data set 854.

Additionally or alternatively, dashboard 850 may include one or more annotations 862 provided by one or more users in relation to asset 811. Data intake and query system 102 may associate the one or more annotations 862 to asset 811 and store the one or more annotations 862. Data intake and query system 102 may then include the one or more annotations 862 as a portion of data set 854.

In various embodiments, dashboard 850 also includes visualization set 852 that includes one or more visualizations relating to portions of data set 854. In some embodiments, dashboard 850 may include visualizations associated with asset ID 814-2 that are presented when the asset ID 814-2 is provided as an input into the dashboard 850. In such instances, dashboard 850 may automatically use asset ID 814-2 as an input (e.g., a form input into a schema) to generate one or more visualizations included in visualization set 852. In various embodiments, each visualization corresponds to applicable portions of data set 854. For example, a portion of data set 854 that corresponds to field values for a specified time range may have a corresponding timeline graph visualization. Similarly, a set of notification messages included in data set 854 may have a corresponding set of notification visualizations.

In some embodiments, visualization set 852 includes one or more annotations 862 previously generated by one or more users. For example, by pointing image sensor 726 at tag 812, XR application 514 obtains unique asset ID 814-1 of "10245" from tag 812, and sends a request to data intake and query system 102 that includes unique asset ID 814-1. Host device 106(1) and/or remote device 106 may receive dashboard 850 that includes visualizations 852-1, 852-2, 852-3 based on field values associated with asset 811 for a specific time period. Host device 106(1) and/or remote device 106 may also receive the corresponding XR workspace 830. XR workspace 830 associated with asset 811 may include multiple panels 831-1, 831-2 and/or annotation panel(s) 861 positioned relative to tag position 813. XR application 514 then presents XR workspace 830 via a display device, where panels 831, 861 of XR workspace 830 include the visualizations included in visualization set 852.

In various embodiments, after generating XR workspace 830, along with any visualizations 852 and/or annotations 862 included in panels 831, 861, onto the image(s) acquired via image sensor 726, XR application 514 may store the enhanced image in an enhanced image data store included in a storage and/or in system memory. In some embodiments, the enhanced image data store may be stored within a database. In some embodiments, XR application 514 generates and populates XR workspace 830 onto a VR scene rather than onto an image acquired from image sensor 726. In such instances, the images stored in the enhanced image data store represent VR images augmented with AR overlays, rather than acquired images augmented with AR overlays.

FIGS. 9A-F are example user interfaces for a host user initiating a remote collaboration session via host device 106(1), in accordance with example implementations. In general, host device 106(1) scans a physical space within a real-world environment. XR application 514 receives 2D surface data and 3D depth data of the physical space and generates an XR stream that host device 106(1) transmits to one or more recipients. In various embodiments, host device 106(1) may receive a selection of one or more recipients that are to participate with host device 106(1) in a remote collaboration session. In such instances, the selected recipients each receive the XR stream produced by host device 106(1). During setup of the remote collaboration session, XR application 514 generates various views 900, 910, 920, 930, 940, 950 on host device 106(1).

Figure 9B:
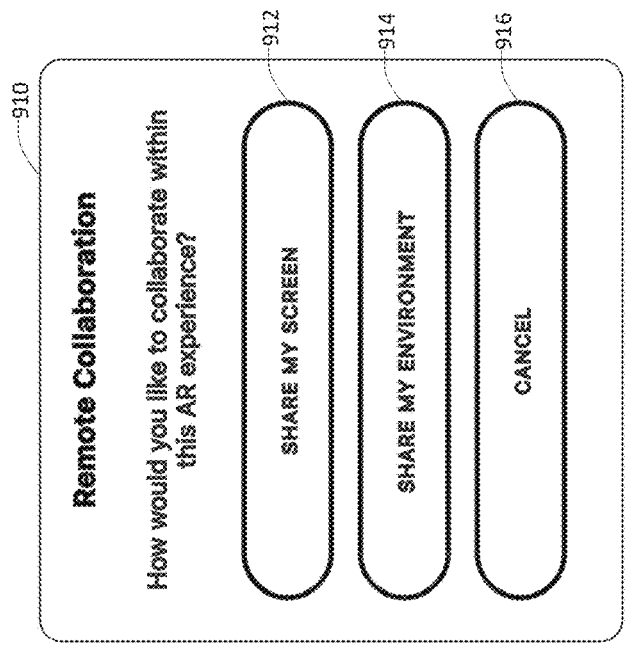
FIG. 9B illustrates a menu with selectable icons to initiate a remote collaboration, in accordance with example implementations.
Figure 9A:
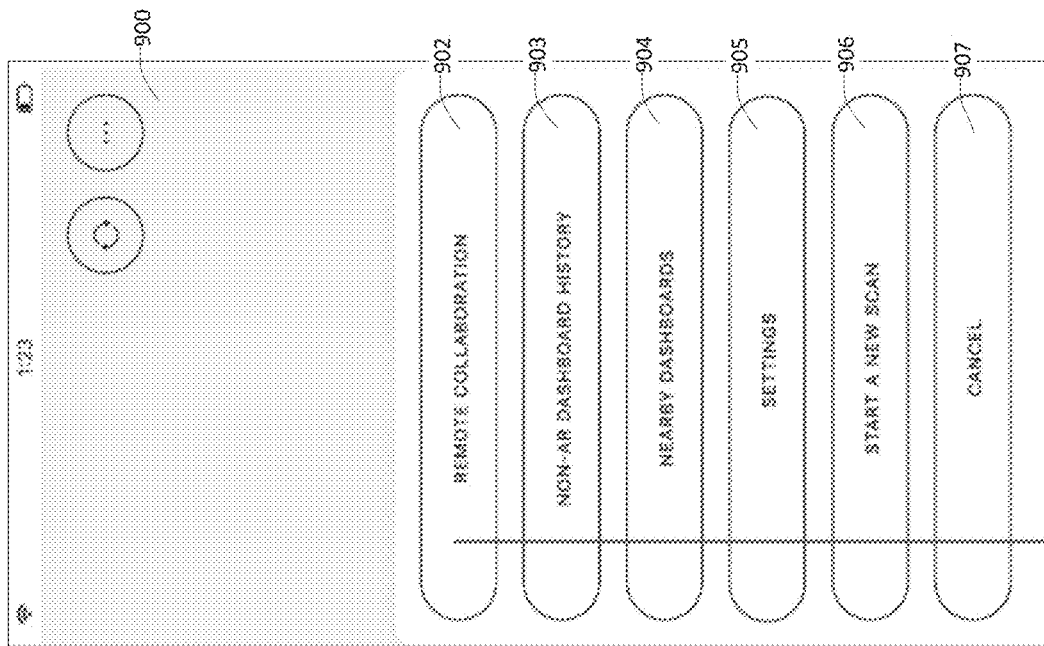
FIG. 9A illustrates a menu with selectable icons to conduct various operations associated with the real-world environment and/or data processing service, in accordance with example implementations.

As shown in FIG. 9A, view 900 presents a menu with selectable icons to conduct various operations associated with the real-world environment and/or data processing service 702. Such icons include remote collaboration icon 902, non-AR dashboard history icon 903, nearby dashboards icon 904, settings icon 905, start a new scan icon 906, and cancel icon 907. In various embodiments, XR application 514 may present view 900 to provide a host user with options to scan a physical space within the real-world environment (e.g., selecting remote collaboration icon 902, settings icon 905, or start a new scan icon 906) and/or perform various operations associated with dashboards provided by data processing service 702 (e.g., selecting non-AR dashboard history icon 903 or nearby dashboards icon 904).

In various embodiments, upon receiving a user input corresponding to a user selection of remote collaboration icon 902, XR application 514 may respond by presenting view 910. As shown in FIG. 9B, view 910 illustrates a menu with selectable icons to initiate a remote collaboration. Such icons include a share my screen icon 912, share my environment icon 914, and cancel icon 916. In some embodiments, host device 106(1) may respond to a selection of share my screen icon 912 by initiating a remote collaboration session by sharing the screen of host device 106(1)

In various embodiments, host device 106(1) may respond to a selection of share my environment icon 914 by determining whether host device 106(1) has recently scanned a physical space (e.g., performed a scan in response to a selection of the start a new scan icon 906). In such instances, host device 106(1) may prepare the recent scan for sharing by generating an XR stream that includes 2D surface data and 3D depth data from the recent scan. Alternatively, when host device 106(1) determines that host device 106(1) has not performed a recent scan, XR application 514 proceeds by presenting view 920.

Although not required in order to enable remote collaboration, in some embodiments, the host device 106(1) may provide prompts to the user to scan more of the physical space, to enable the remote device to view different areas of the physical space at the remote location. For example, as shown in FIG. 9C, XR application 514 presents view 920 to scan a physical space within a real-world environment. View 920 includes prompt 922, scanning region 924, and scanned region(s) 926 (e.g., 926-1, 926-2, etc.). In some embodiments, XR application 514 may provide prompt 922 that instructs a host user to scan a particular asset or collection of assets within the physical space (e.g., scanning a particular server device). Alternatively, XR application 514 may provide prompt 922 that instructs the host user to scan a region of the real-world environment (e.g., one or more portions of an open space, building, room, etc.).

In various embodiments, XR application 514 may present view 920 while host device 106(1) scans a physical space. For example, XR application 514 may present scanning region 924 that corresponds to a specific region or a specific object within the physical space. When XR application 514 determines that a portion of the physical space has been successfully scanned, XR application 514 presents one or more scanned regions 926. In some embodiments, XR application 514 may lock the scanned region and store 3D texture data and/or 2D surface data for the scanned region while host device 106(1) scans other portions of the physical space. In some embodiments, the host user may change the position of host device 106(1) in order to scan other regions of the physical space. Alternatively, XR application 514 may expand a given scanned region as host device 106(1) changes position (e.g., the host user moves and/or rotates host device 106(1)).

Figure 9D:
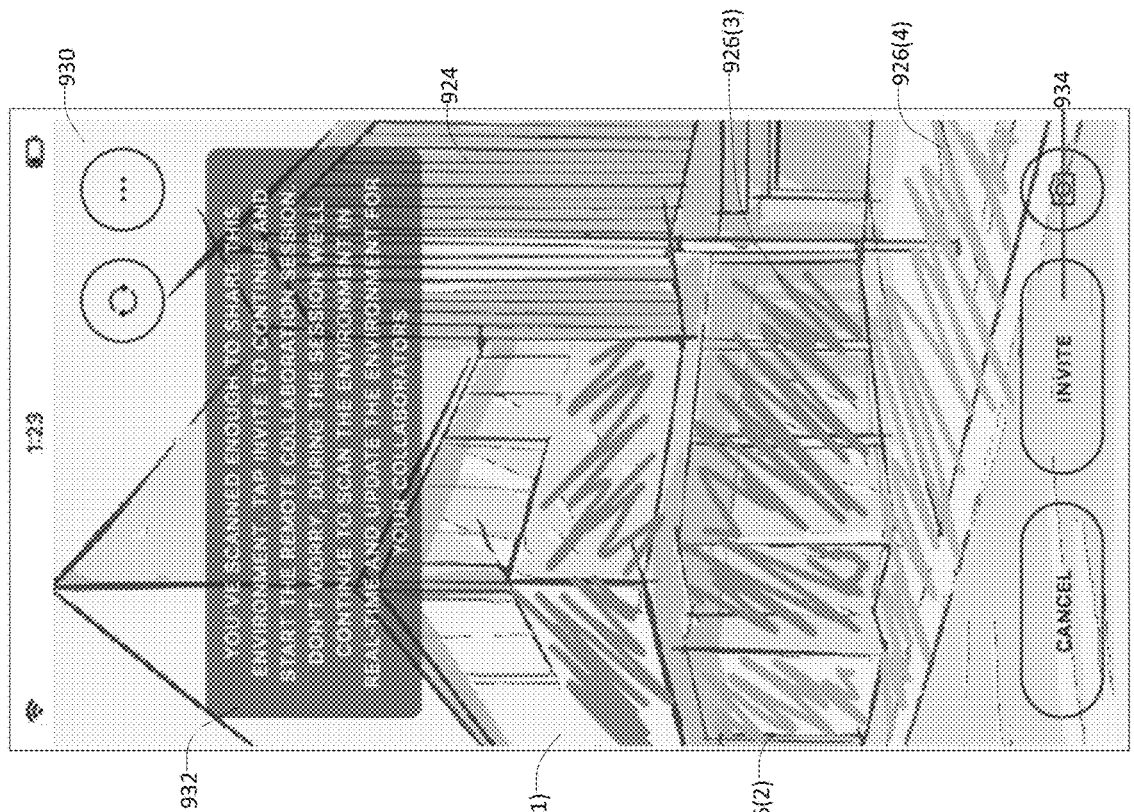
FIG. 9D illustrates the extendable application completing a scan of a physical space, in accordance with example implementations.
Figure 9C:
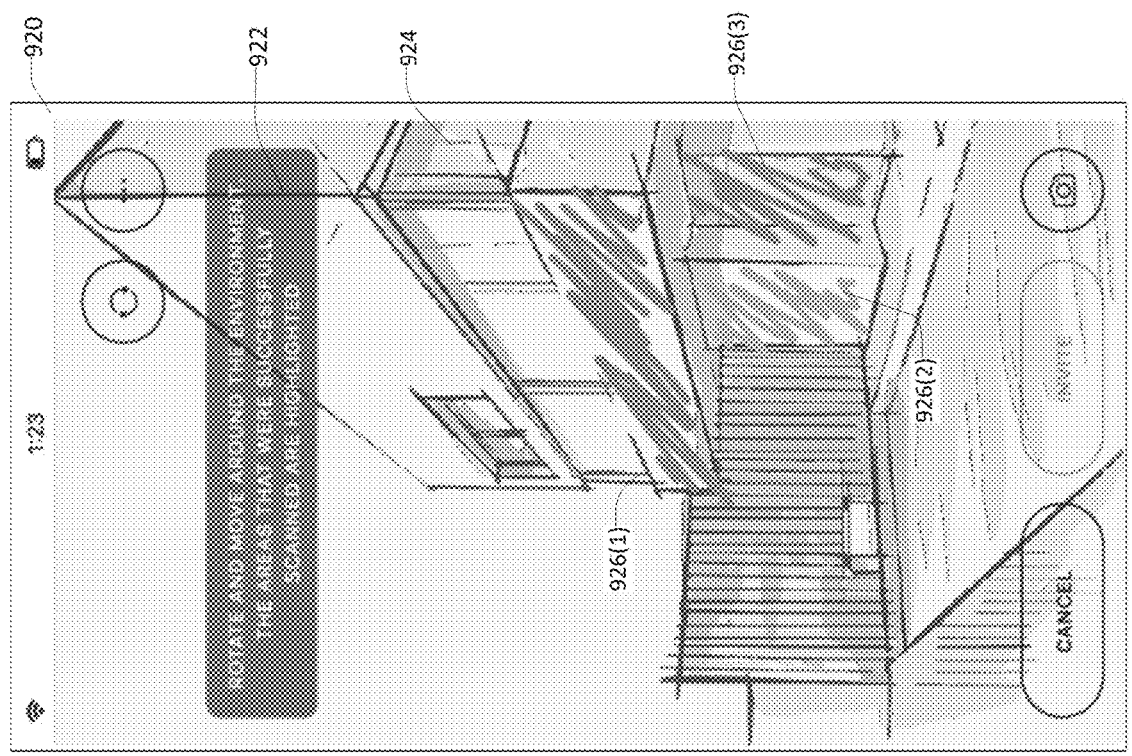
FIG. 9C, illustrates the extendable application scanning a physical space within a real-world environment, in accordance with example implementations.

As shown in FIG. 9D, view 930 includes prompt 932, scanning region 924, scanned regions 926, and invitation icon 934. As XR application 514 determines that a set of scanned regions 926 have been successfully scanned, XR application 514 may update prompt to specify that a sufficient amount of the physical space has been scanned to share in a remote collaboration session. In some embodiments, prompt 932 may also specify that the scanned region may be updated during the remote collaboration session. When XR application determines that enough of the physical space has been successfully scanned, XR application 514 may provide invitation icon 934 to invite others to the remote collaboration session.

Figure 9F:
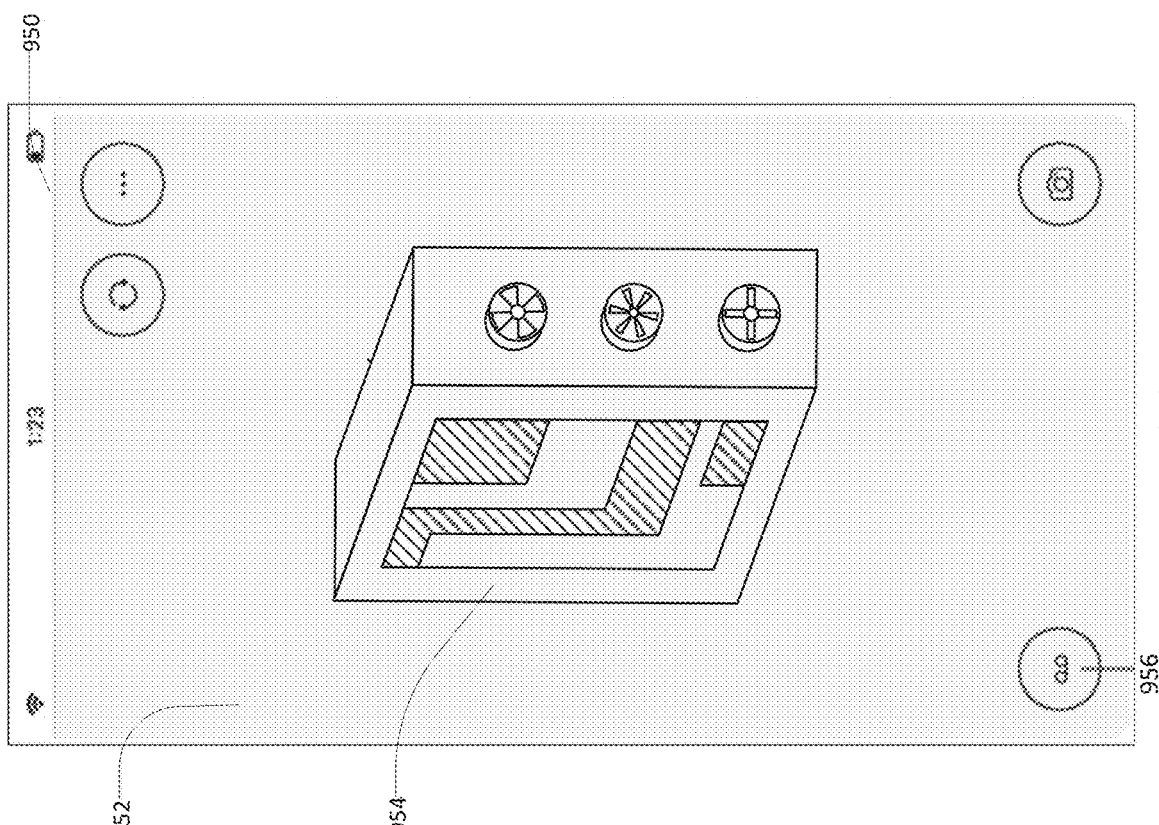
FIG. 9F illustrates a portion of a remote environment during a remote collaboration session, in accordance with example implementations.
Figure 9E:
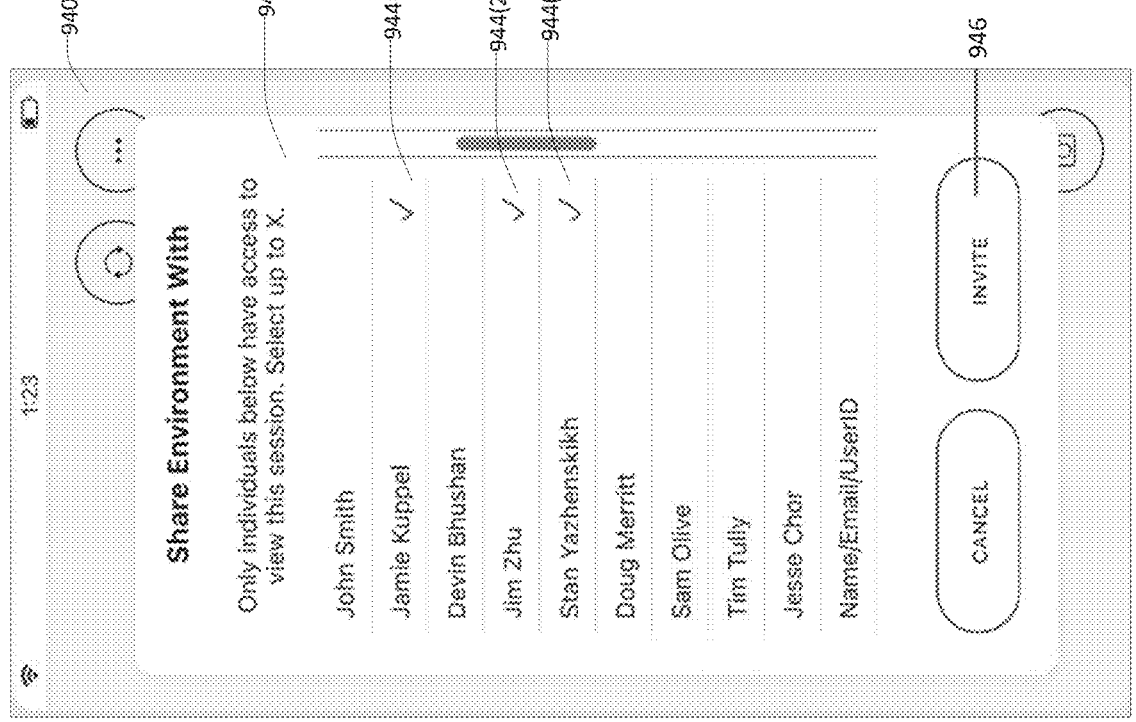
FIG. 9E illustrates an invitation menu for a potential participant in a remote collaboration session, in accordance with example implementations.

As shown in FIG. 9E, view 940 displays an invitation menu for potential participants in the remote collaboration session. View 940 includes invitation menu 942, selected participants 944 (e.g., 944-1, 944-2, etc.), and invitation icon 946. Once the host user selects one or more participants for the remote collaboration session, the host user selects invitation icon 946. XR application 514 responds to the selection of the invitation icon by retrieving address information for each of the selected participants 944 and sending invitations to each of the selected participants.

As each selected participant accepts the invitation, host device 106(1) may receive an indication of a remote device 106 used by the selected participant. In some embodiments, XR application 514 may identify each remote device 106 as an intended recipient of the XR stream and may send separate messages to each respective recipient. Additionally or alternatively, each selected participant may register with workspace service 708 included in data processing service 702. In such instances, data processing service 702 may direct the XR stream to each intended recipient during the remote collaboration session.

As shown in FIG. 9F, view 950 includes host XR environment portion 952, asset 954, and record icon 956. In various embodiments, XR application 514 included in host device 106(1) presents view 950 during a remote collaboration with one or more remote devices 106.

Host XR environment portion 952 corresponds to a view of host XR environment 710 based on a position of host device 106(1) relative to the physical space. In some embodiments, host XR environment portion 952 includes one or more assets 954. In such instances, XR application 514 may highlight asset 954 within host XR environment portion 952 may identify asset 954. Additionally or alternatively, XR application 514 may display one or more display panels, including various dashboards, playbooks, and so forth, within host XR environment portion 952.

In various embodiments, host device 106(1) may change position within the real-world environment. In such instances, XR application 514 may update host XR environment portion 952 to reflect the position change of host device 106(1). Additionally or alternatively, the position change of host device 106(1) does not modify the view seen by the remote participants via the one or more remote devices 106.

In some embodiments, XR application 514 may present record icon 956. In such instances, XR application 514 may respond to a selection of record icon 956 by recording the remote collaboration session. Recording the remote collaboration session may include storing the XR stream, an activity log of actions performed by host device 106(1) and/or the one or more remote devices 106, and/or AR elements displayed by host device 106(1) and/or the one or more remote devices 106 within the respective host XR environment 710, or remote XR environment 730, and/or remote environment 740. In some embodiments, XR application 514 may also store an audio recording from each respective device included in the remote collaboration session, or other additional annotation or information, as is relevant to the particular use case.

FIGS. 10A-D are example user interfaces for a remote user joining a remote collaboration session via remote device 106, in accordance with example implementations. In general, remote device 106 joins a remote collaboration session, where host device 106(1) shares a screen or an environment with remote device 106. Remote device 106 presents views 1000, 1010, 1020, 1030 to enable the remote user to join the remote session as a participant and view portions of a physical space scanned by host device 106(1). In various embodiments, remote device 106 may navigate a representation of the physical space independent of the host device 106(1).

Figure 10B:
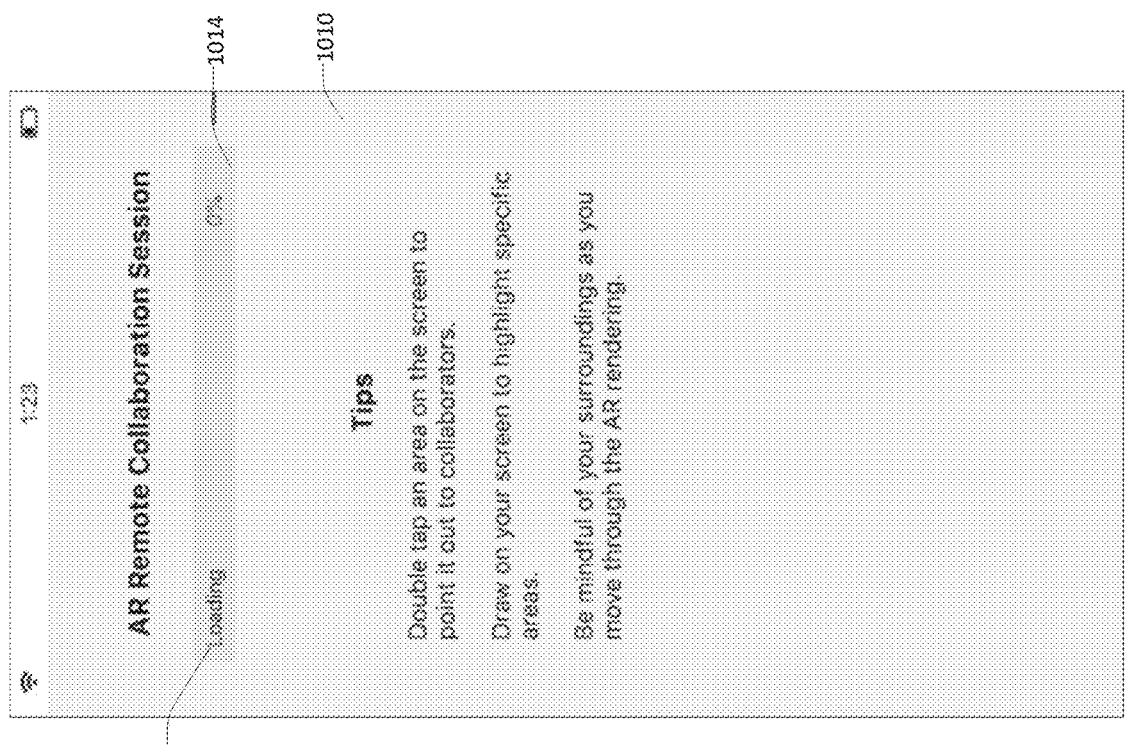
FIG. 10B illustrates a splash page describing the remote collaboration session, in accordance with example implementations.
Figure 10A:
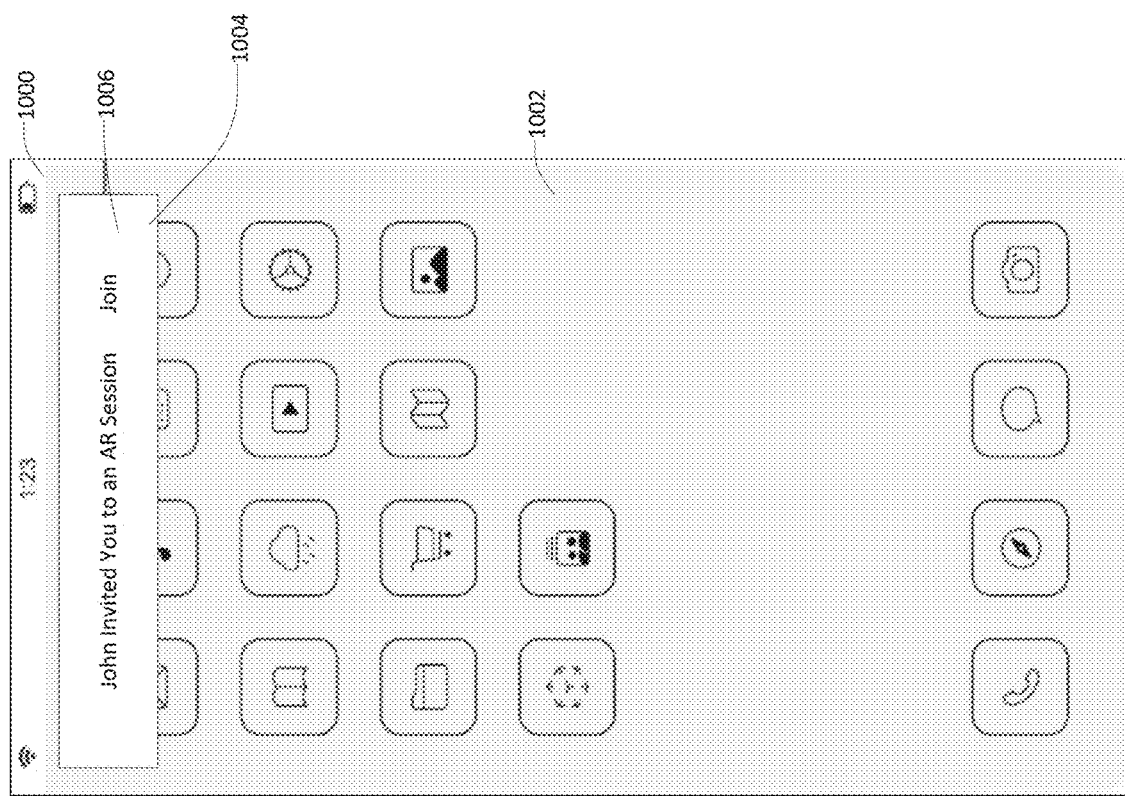
FIG. 10A illustrates a menu with selectable icons to initiate a remote collaboration, in accordance with example implementations.

As shown in FIG. 10A, view 1000 presents a prompt to join a remote session. View 1000 includes home screen 1002, prompt 1004, and link 1006. In various embodiments, remote device 106 may receive an invitation to join a remote collaboration session. In such instances, remote device 106 may present prompt 1004 indicating that the remote user has been invited to join a remote collaboration session as a participant. In such instances, prompt 1004 may include link 1006 to join the remote collaboration session. In some embodiments, link 1006 may cause remote device 106 to register with workspace service 708 as a participant for the specific remote collaboration session. Upon registration, workspace service 708 may direct the XR stream for the remote collaboration session, as generated by host device 106(1), to remote device 106.

As shown in FIG. 10B, view 1010 presents a splash page describing the remote collaboration session. View 1010 includes loading progress bar 1012 and instructional panel 1014. In operation, XR application 514 included in remote device 106(2) receives the XR stream and generates remote XR environment 730 that includes an adaptable 3D representation of the physical space. In some embodiments, XR application 514 may present view 1010 while initially generating the remote XR environment 730 by rendering the adaptable 3D representation.

View 1010 presents a progress bar based on XR application generating remote XR environment 730. In some embodiments, generating remote XR environment 730 includes rendering the adaptable 3D representation of the physical space and separately transmitting requests for data associated with one or more assets included in the adaptable 3D representation (e.g., asset 954). Additionally or alternatively, view 1010 may include instructional panel 1014. Instructional panel 1014 provides information about the remote collaboration session. For example, instructional panel 1014 may instruct the remote user to be mindful of the surroundings of at the remote location when moving remote device 106(2). Instructional panel 1014 may also include instructions about using one or more collaboration tools (e.g., graphical pointers, pins, highlighters, etc.) that the remote user can implement to navigate within remote XR environment 730 and/or interact with the rendered asset within remote XR environment 730.

Figure 10D:
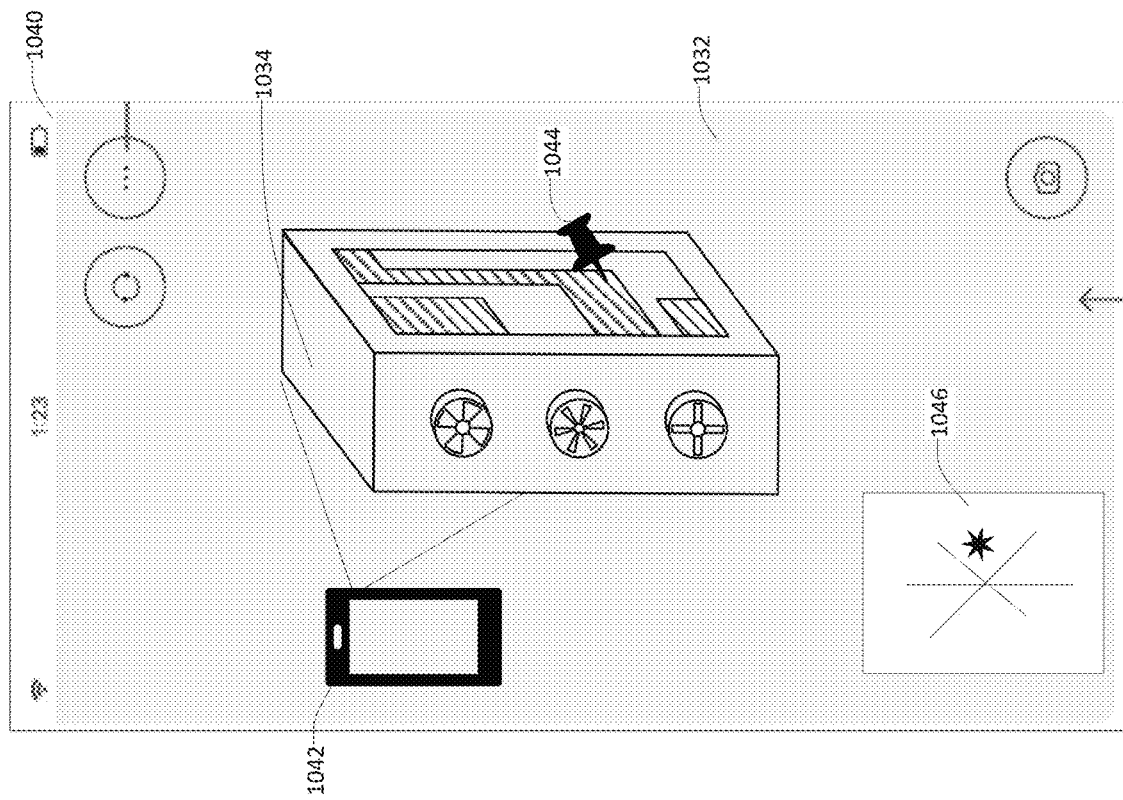
FIG. 10D illustrates a portion of remote XR environment portion at a later time during the remote collaboration session, in accordance with example implementations.
Figure 10C:
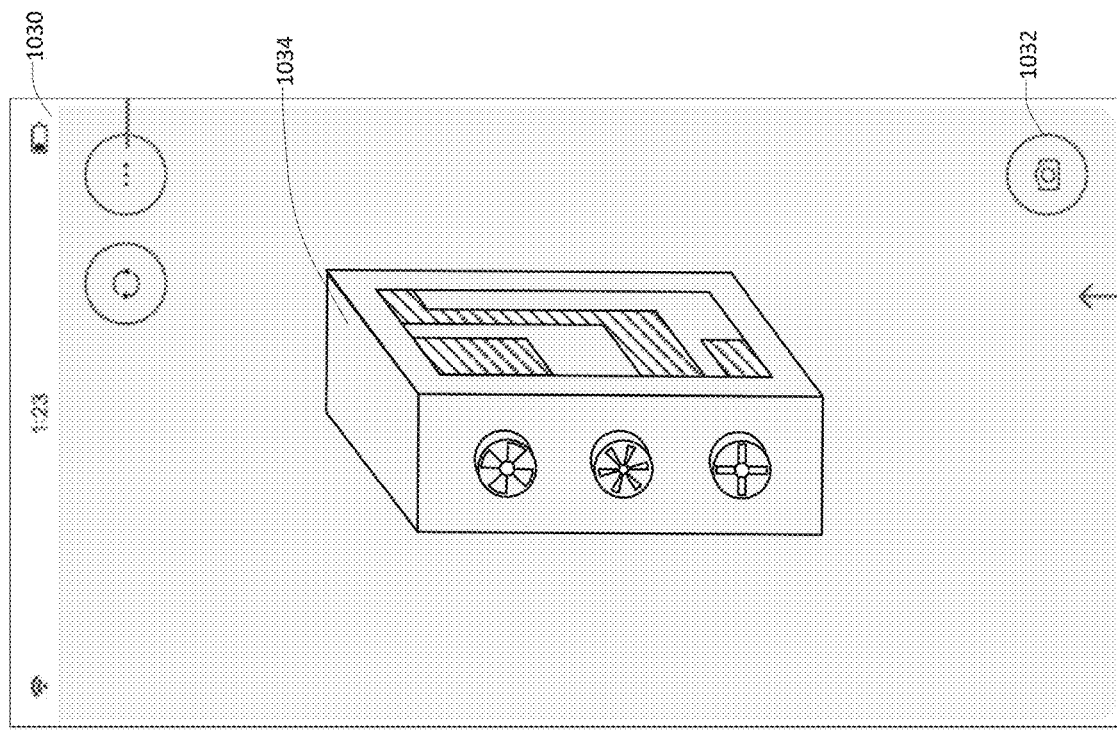
FIG. 10C illustrates a portion of the remote XR environment portion, in accordance with example implementations.

As shown in FIG. 10C, view 1020 presents remote XR environment portion 1032. View 1020 includes remote XR environment portion 952 and rendered asset 1034. Remote XR. environment portion 1032 corresponds to a view of remote XR environment 730 based on a position of remote device 106(2). Remote XR environment 730 renders the XR stream, corresponding to the scene scanned by host device 106(1), as an adaptable 3D representation of the physical space.

In some embodiments, remote device 106(2) may determine an anchor position for the scene and may render portions of the scene relative to the anchor position. In such instances, XR application 514 included in remote device 106(2) may determine the position of remote device 106(2) relative to the anchor position in order to determine the position of remote device 106(2) relative to portions of the scene. Upon determining the position of remote device 106(2) relative to the portions of the scene, XR application 514 may present remote XR environment portion 1032 to reflect the position of remote device 106(2). In some embodiments, an XR representation of remote device 106(2) may appear in the host XR environment 710 of the host device 106(1). For example, if remote device 106 is a cellular phone of a particular brand, a 3D model representing that cellular phone brand may be rendered in host XR environment 710 according to the position of remote device 106 relative to rendered asset 732. In other implementations, remote device 106 may be represented by a symbol or simple object, such as a cube or sphere. In still other implementations, remote device 106 may be represented as a line or ray, with the line or ray pointing in the direction representing the orientation of the remote device 106 relative to the rendered asset 732.

For example, XR application 514 may determine that, based on the anchor position for the scene, remote device 106(2) is at a position and orientation that is to the right of rendered asset 1034. XR application may then respond by generating remote XR environment portion 1032 to reflect that position of remote device 106(2) relative to rendered asset 1034.

In various embodiments, remote device 106(2) may change position within the real-world location of remote device 106(2). In such instances, XR application 514 may update remote XR environment portion 1032 to reflect the position change of remote device 106(2). Additionally or alternatively, the position change of remote device 106(2) does not modify the view of the scene as seen by other remote participants or by the host user.

As shown by FIG. 10D, view 1040 displays remote XR environment portion 1032 at a later time during the remote collaboration session. View 1040 includes remote XR environment portion 1032, asset 1034, host device avatar 1042, pin 1044, and map 1046. During the remote collaboration session, the remote user may implement one or more collaboration tools in order to navigate through remote XR environment 730 and/or interact with portions of the adaptable 3D representation of the physical space.

For example, the remote user may toggle avatars of other participants in the remote collaboration session to determine the position of each participant's device relative to the physical space. In one example, the remote user may turn on host avatar 1042 in order to see the position of host device 106(1) and determine what portion of real-world asset 954 (corresponding to rendered asset 1034) that the host user is viewing. The remote user may then tell the user to move to a different position in order to view a different portion of the real-world asset 954.

In some embodiments, the remote user may implement collaboration tools that are displayed in the environments of other participants. For example, the remote user may add a pin 1044 to flag a particular portion of rendered asset 1034 throughout the remote collaboration session. In such instances, other participants may see pin 1044 within the respective environments. For example, when host device 106(1) changes position to be located to the right side of real-world asset 954, host device 106(1) may present pin 1044 for display within host XR application portion 952.

In various embodiments, XR application 514 may generate a map 1046 of the scene within view 1040. In such instances, the remote user may move remote device 106(2) to change the position of remote device 106(2) within the map of the scene. In some embodiments, the remote device may be presented with navigation controls. For example, when mobile operations application 516 generates a non-XR remote environment 740 for a remote collaboration session, mobile operations application 516 may present navigation controls to change the position of remote device 106(3) within the scene.

Figure 11:
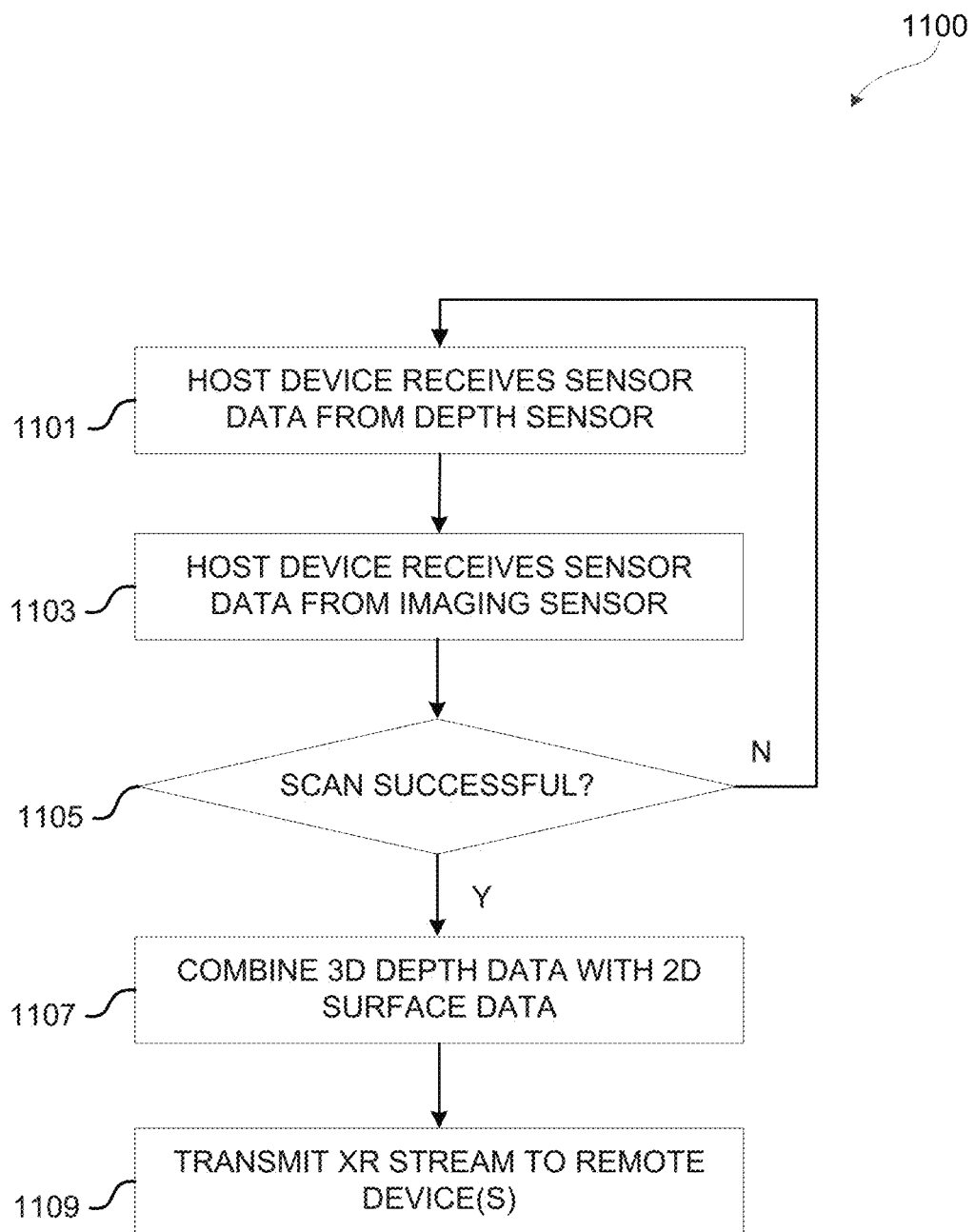
FIG. 11 sets forth a flow diagram of method steps for providing an extended reality stream for a remote collaboration session, in accordance with example implementations.

FIG. 11 sets forth a flow diagram 1100 of method steps for providing an extended reality stream for a remote collaboration session, in accordance with example implementations. Although the method steps are described in conjunction with FIGS. 1-22, persons of ordinary skill in the art will understand that any system configured to perform this method and/or other methods described herein, in any order, and in any combination not logically contradicted, is within the scope of the present invention.

As shown in by method 1100, at step 1101, host device 106(1) receives sensor data from a depth sensor 724. In various embodiments, host device 106(1) may receive depth sensor data that was acquired by a depth sensor 724 (e.g., one or more LiDA® sensors) that are associated with host device 106(1). For example, a LiDA® sensor included in host device 106(1) may scan a physical space and acquire depth sensor data for the physical space. XR application 514 included in host device 106(1) may receive the depth sensor data and generate 3D depth data that is based on the depth sensor data.

At step 1103, host device 106(1) receives sensor data from an imaging sensor 726. In various embodiments, host device 106(1) may receive image sensor data that was acquired by an imaging sensor 726 (e.g., one or more RGB cameras) that are associated with host device 106(1). For example, an RGB camera included in host device 106(1) may scan the physical space and acquire image sensor data for the physical space. XR application 514 included in host device 106(1) may receive the image sensor data and generate 2D surface data that is based on the image sensor data.

At step 1105, host device 106(1) determines whether a scan of the physical space was successful. In some embodiments, XR application 514 may determine whether host device 106(1) successfully acquired both image sensor data and depth sensor data for the physical space. In some embodiments, XR application 514 may perform a series of successive checks to determine whether host device 106(1) successfully acquired both image sensor data and depth sensor data for specific regions of the physical space. When host device 106(1) determines that host device 106(1) did not successfully complete the scan of the physical space, host device returns to step 1101, where XR application 514 prompts the host user to rescan at least a portion of the physical space. Otherwise, XR application determines that host device 106(1) successfully scanned the physical space and proceeds to step 1107.

At step 1107, host device 106(1) combines the 3D depth data and 2D surface data to generate an XR stream. In some embodiments, host device 106(1) may generate the 3D depth data and 2D surface data as a discrete scene that can be produced in a non-XR environment. In various embodiments, XR application 514 may combine correlated portions of the 3D depth data and the 2D surface data to generate the XR stream. In some embodiments, XR application 514 may determine a correlation between portions of 2D surface data and 3D depth data (e.g., determining related sets of coordinate data between a portion of 2D surface data and a portion of 3D depth data).

At step 1109, host device 106(1) transmits the XR stream to one or more remote devices 106. In various embodiments, XR application 514 may transmit the XR stream to one or more recipients (e.g., remote devices 106, remote storage 704, etc.) for use in a remote collaboration session. In some embodiments, XR application 514 may transmit the XR stream as a stream of the combined 2D surface data and 3D depth data. In such instances, the recipient (e.g., remote device 106(2)) may extract the 2D surface data and 3D depth data to generate an adaptable 3D representation of the physical space corresponding to a scene of the physical space. Alternatively, host device 106(1) may initially generate the adaptable representation of the physical space and may transmit the adaptable 3D representation to one or more recipients. In various embodiments, remote device 106 may generate a remote environment that includes at least a portion of the adaptable 3D representation of the physical space.

Figure 12:
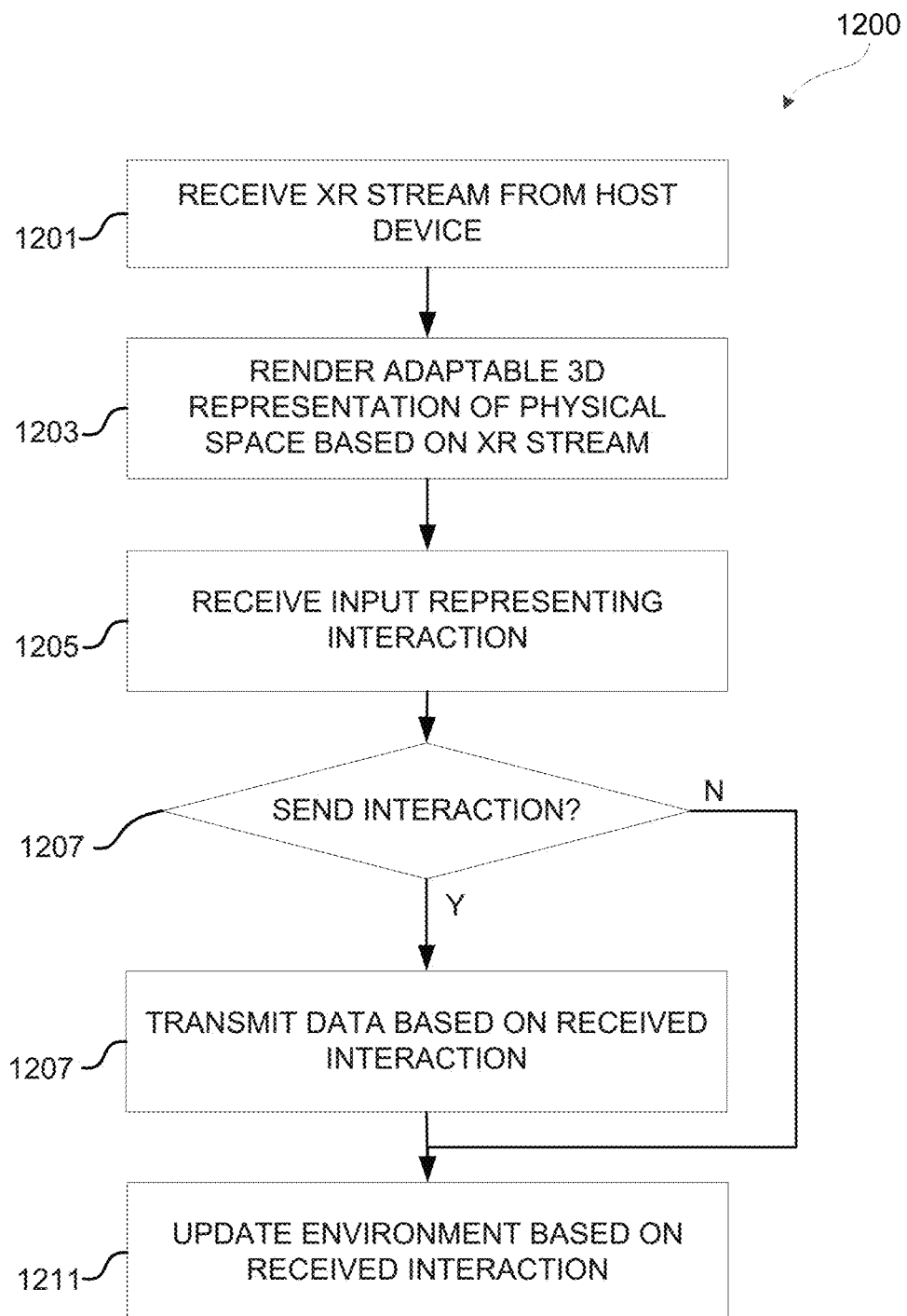
FIG. 12 sets forth a flow diagram of method steps for generating and interacting with a digital representation of a physical space, in accordance with example implementations.

FIG. 12 sets forth a flow diagram 1200 of method steps for generating and interacting with a digital representation of a physical space, in accordance with example implementations. Although the method steps are described in conjunction with FIGS. 1-22, persons of ordinary skill in the art will understand that any system configured to perform this method and/or other methods described herein, in any order, and in any combination not logically contradicted, is within the scope of the present invention.

As shown in method 1200, at step 1201, remote device 106 receives an XR stream originating from host device 106(1). In various embodiments remote device 106 receives an XR stream via tunnel bridge 706. In some embodiments, the XR stream may include continual chunks of combined 3D depth data and/or 2D surface data. Additionally or alternatively, the XR stream may include a discrete set of data that corresponds to a scene at a particular time (e.g., an initial set of geometry data at the start of the remote collaboration session). In some embodiments, workspace service 708 may specify that remote device is an intended recipient of the XR stream. In such instances, data processing service 702 may direct a copy of the XR stream, originating at host device 106(1), to remote device 106.

At step 1203, remote device 106 renders an adaptable 3D representation of the physical space based on the XR stream. In various embodiments, remote device 106 may render at least a portion of an adaptable representation of the physical space that is to be used during the remote collaboration session. For example, XR application 514 included in remote device 106(2) may generate the adaptable 3D representation for inclusion in remote XR environment 730. In another example, remote operations application 516 included in remote device 106(3) may generate the adaptable 3D representation for inclusion in remote environment 740. In various embodiments, when rendering adaptable 3D representation, remote device 106 may extract the 2D surface data and 3D depth data that is included in the XR stream to generate an adaptable 3D representation of the physical space corresponding to a scene of the physical space.

At step 1205, remote device 106 receives an input representing an interaction. In various embodiments, remote device 106 may receive an input from a remote user during the remote collaboration session. For example, remote device 106 may receive an input corresponding to the remote user highlighting a portion of the remote environment. In such instances, remote device 106 may determine the interaction corresponding to the input.

At step 1207, remote device 106 determines whether to send an interaction to a recipient. In various embodiments, remote device 106 may determine whether to publish the interaction corresponding to the received input to other participants in the remote collaboration session. For example, XR application 514 may determine whether the input corresponding to highlighting a portion of the remote XR environment 730 to be seen by other participants. When remote device 106 determines that the interaction is to be published to other participants, remote device 106 may proceed to step 1209. Otherwise, remote device 106 determines that the interaction is not to be published to other participants and proceeds to step 1211

At step 1209, remote device 106 transmits data based on the received interaction. In various embodiments, remote device 106 transmits one or more messages that corresponds to the interaction received by remote device 106. In such instances, remote device 106 may send the message that includes the interaction and associated data (e.g., type of interaction, coordinates for the interaction, etc.) via tunnel bridge 706 to workspace service 708 and/or host device 106(1). In such instances, other participants may update a corresponding workspace to reflect the interaction (e.g., host device 106(1) updating host XR environment 710 to highlight a corresponding portion of XR workspace 714).

At step 1211, remote device 106 updates the remote environment based on the received interaction. In various embodiments, remote device 106 updates the remote environment to reflect the interaction corresponding to the received input. For example, XR application 514 may update XR workspace 734 included in remote XR environment 730 to highlight a specific portion corresponding to the user input.

In various embodiments, remote device 106 may continually update the remote workspace based on the updated XR stream and/or additional inputs provided by the remote user. In such instances, remote device 106 may update the remote workspace to reflect the updates.

8.0 Collaboration Areas in Remote Collaboration Sessions

Figure 13B:
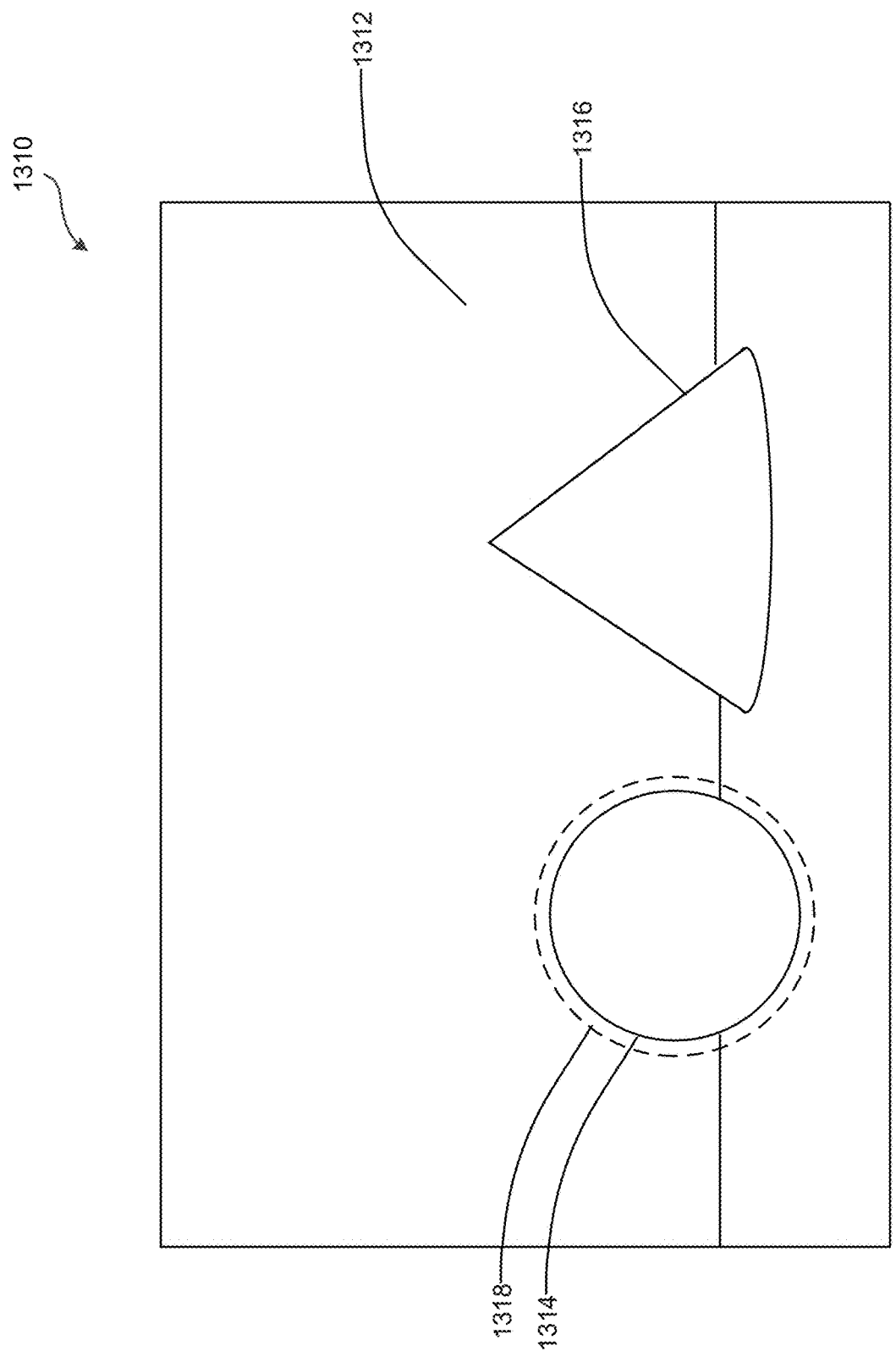
Figure 13C:
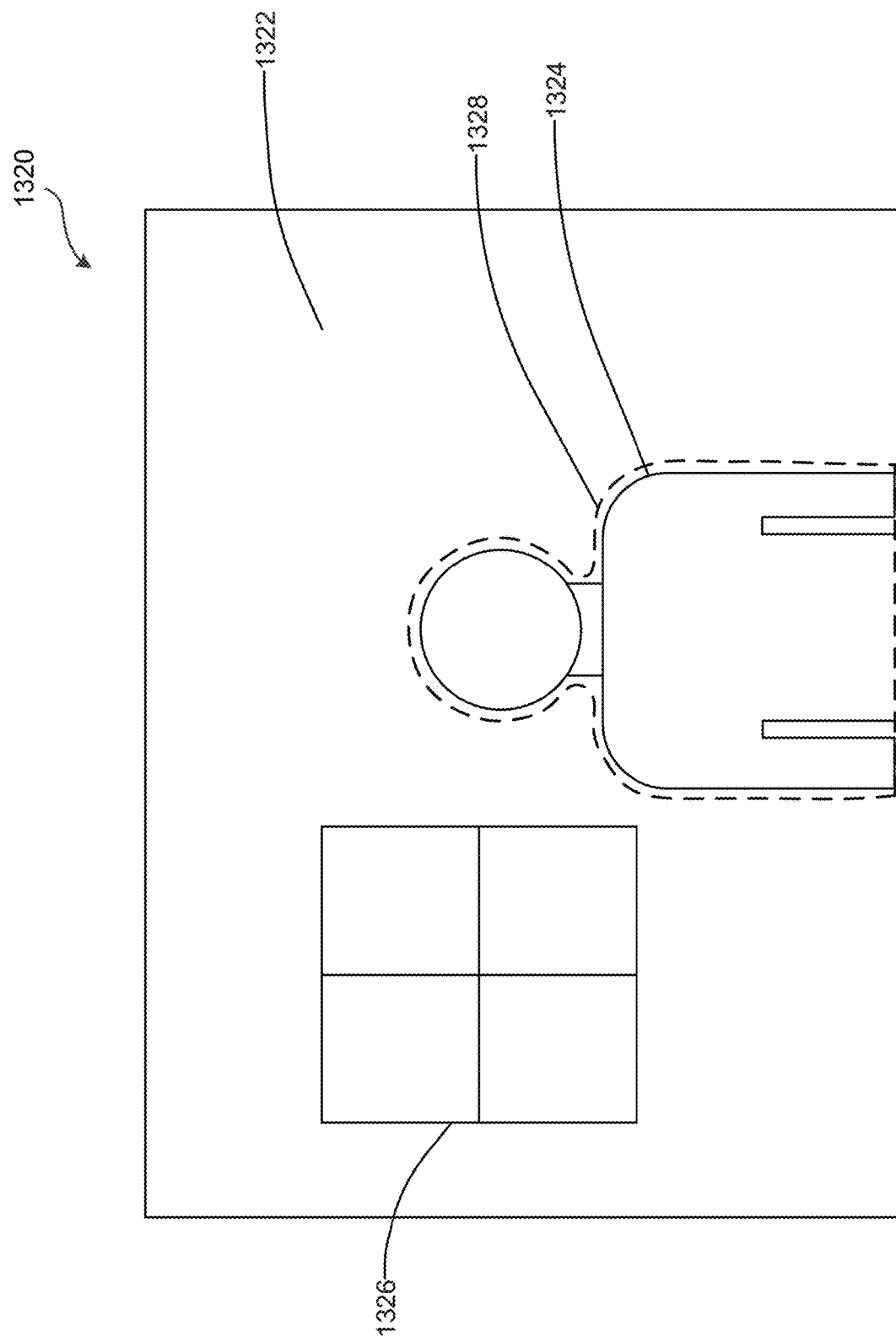

FIGS. 13A-13C illustrate example collaboration areas in remote collaboration sessions, in accordance with example implementations. In some embodiments, when a remote collaboration session is initiated, XR application 514 in host device 106(1) determines a collaboration area in host XR environment 710 that corresponds to a portion of a real-world environment to be scanned and shared by host device 106(1) with remote device 106(2). Although FIGS. 13A-13C are described with respect to a single collaboration area that is determined when a remote collaboration session is initiated, in some embodiments, any number of collaboration areas can be determined, and at any suitable time. For example, multiple collaboration areas could be determined when a remote collaboration session is initiated. As another example, one or more collaboration areas could be added or removed during a remote collaboration session. Although FIGS. 13A-13C are described with respect to a single remote device 106(2), the portion of the real-world environment corresponding to the collaboration area can be scanned and shared with any number of remote devices.

As shown in FIG. 13A, a view 1300 includes a host XR workspace 1302, objects 1304 and 1306, and a collaboration area 1308. In some embodiments, XR application 514 included in host device 106(1) determines collaboration area 1308 based on one or more interactions by a host participant (e.g., a user of host device 106(1)) when a remote collaboration session is initiated. Illustratively, collaboration area 1308 includes a cylindrical shape that encompasses object 1304. In other embodiments, collaboration area 1308 can be any technically feasible shape, such as a cuboid or a sphere.

As described in greater detail below in conjunction with FIGS. 17-20, XR application 514 causes one or more sensors associated with host device 106(1) to scan object 1304 that is within collaboration area 1308 in host XR environment 710. XR application 514 generates and transmits, to remote device 106(2), a 3D representation of object 1304 within collaboration area 1308. Remote device 106(2) can then render an adaptive representation of object 1304 in remote XR environment 1730 based on the 3D representation, as described in greater detail below in conjunction with FIG. 21. By only scanning and transmitting the 3D representation of object 1304 within collaboration area 1308, portions of the real-world environment that the host participant does not wish to share, such as object 1306, are not scanned or transmitted to remote device 106(2). In addition, host device 106(1) and remote device 106(2) can primarily process data associated with collaboration area 1308, which is more computationally efficient than processing data associated with the entire real-world environment.

As described, in some embodiments, XR application 514 determines collaboration area 1308 based on one or more interactions from a host participant. In such cases, XR application 514 may receive, from the host participant, a selection of a location within view 1300. For example, the host participant could select the location by tapping on a touchscreen associated with the host device 106(1), or in any other technically feasible manner.

XR application 514 detects a plane associated with the ground or another surface (e.g., a table) on which objects can be placed, and XR application 514 generates an initial collaboration area 1308 that is centered at the location selected by the host participant and slightly (e.g., a few inches) above the detected plane. Generating collaboration area 1308 to be above the detected plane can prevent noise from the ground, such as carpet or grass, from being shared with remote device 106(2). The host participant can then interact to move and/or re-size collaboration area 1308 in order to control a portion of the real-world environment that is scanned and transmitted to remote device 106(2). Illustratively, collaboration area 1308 has been positioned and sized to encompass object 1304, but not object 1306.

As shown in FIG. 13B, a view 1310 includes a host XR workspace 1312, objects 1314 and 1316, and a collaboration area 1318. Collaboration area 1318 is similar to collaboration area 1308, except collaboration area 1318 includes a silhouette around object 214, rather than a cylindrical shape. As described in greater detail below in conjunction with FIG. 18-20, in some embodiments, XR application 514 determines collaboration area 1308 based on object detection and/or saliency. For example, in some embodiments, XR application 514 may receive an interaction (e.g., a tap on a touchscreen) from the host participant indicating a location within host XR environment 710. In such cases, XR application 514 can detect, based on 3D depth data and/or 2D image data and an object detection model (e.g., a machine learning model) and/or a saliency model, an object (e.g., object 214) that is at the selected location, as well as a boundary of the object. XR application 514 then generates collaboration area 1318 to be slightly (e.g., a few inches)

wider than the detected boundary of the object. In other embodiments, XR application 514 may set the collaboration area to the detected boundary or generate a collaboration area having a predefined shape, such as a cylindrical or cuboid shape, that encompasses the detected boundary. By only scanning and transmitting a 3D representation of object 1314 within collaboration area 1318, portions of the real-world environment that the host participant does not wish to share, such as object 1316, are not scanned or transmitted to remote device 106(2). In addition, host device 106(1) and remote device 106(2) can primarily process data associated with collaboration area 1318, which is more computationally efficient than processing data associated with the entire real-world environment.

In some embodiments, XR application 514 may detect and present a list of objects in the real-world environment. For example, in some embodiments, XR application 514 may apply a machine learning model that performs entity detection to identify tables, chairs, and/or other objections within the real-world environment. In other embodiments, XR application 514 may reference a known list of 3D objects, and compare that list against detected 3D objects in the real-world environment. In still other embodiments, the list of 3D objects may be selected or filtered based on a location of host device 106(1). For example, in some implementations, host device 106(1) may transmit its location to a computing device that stores a list of known 3D objects in that vicinity. The objects detected at the location of host device 106(1) may be compared against that list of known objects to facilitate selection of objects and generation of a collaboration area. When XR application 514 receives an interaction (e.g., a tap on a touchscreen) from the host participant selecting an objects in the list, XR application 514 generates collaboration area 1318 based on a boundary of the selected object (by, e.g., setting the collaboration area 1318 equal to the boundary to or to be slightly wider than the boundary). Alternatively, XR application 514 may generate a collaboration area having a predefined shape, such as a cylindrical or cuboid shape, that encompasses the selected object.

As shown in FIG. 13C, a view 1320 includes a host XR workspace 1322, a host participant 1324, a windrow 1326, and a collaboration area 1328. Collaboration area 1328 is similar to collaboration area 1318, except collaboration area 1318 is in the shape of a silhouette around host participant 1324. In some embodiments, XR application 514 detects host participant 1324 and determines collaboration area 1328 around host participant 1324 based on a boundary around host participant 1324. Similar to the description above in conjunction with FIG. 13B, XR application 514 can detect the host participant and the boundary using object detection and/or saliency in some embodiments. Then, XR application 514 can set the collaboration area to be the detected boundary of the host participant, to be slightly wider than the detected boundary, or to include a predefined shape (e.g., a cylindrical or cuboid shape) that encompasses the detected boundary. By only scanning and transmitting a 3D representation of the host participant that is within collaboration area 1328, portions of the real-world environment that host participant 1324 does not wish to share, such as window 1326, are not scanned or transmitted to remote device 106(2). In addition, host device 106(1) and remote device 106(2) can primarily process data associated with collaboration area 1328, which is more computationally efficient than processing data associated with the entire real-world environment.

FIGS. 14A-14D illustrate example user interfaces for initiating a remote collaboration session, in accordance with example implementations. As described, in some embodiments, host device 106(1) receives one or more interactions from a host participant (e.g., a user of host device 106(1)) and determines one or more collaboration areas within host XR environment 710 based on the one or more interactions. For example, in some embodiments, XR application 514 detects a plane associated with the ground or another surface on which objects can be placed. Then, XR application 514 generates each collaboration area to include a predefined shape (e.g., a cylindrical or cuboid shape) that is at a location selected by the host participant and slightly (e.g., a few inches) above the detected plane. The host participant can then move and/or re-size the one or more collaboration areas in order to control which portion(s) of the real-world environment are to be scanned and transmitted to remote device 106(2). In other embodiments, XR application 514 may detect one or more objects based on one or more locations selected by a host participant, or receive, from the host participant, a selection of one or more objects from a list of detected objects. In such cases, XR application 514 can generate one or more collaboration areas based on boundaries around the one or more objects. In further embodiments, XR application 514 may detect one or more host participants and generate one or more collaboration areas based on boundaries around the one or more host participants.

Host device 106(1) can be used to scan one or more portions of the real-world environment that correspond to one or more collaboration areas, in order to obtain 2D image data and/or 3D depth data. Then, XR application 514 generates one or more 3D representations of the one or more portions of the real-world environment. For example, in some embodiments, each 3D representation may include one or more portions of 3D mesh(es) within a corresponding collaboration area in host XR environment 710, one or more frames of a video that can be applied as textures, and metadata indicating texture coordinates that define how portions of the one or more frames are mapped to faces in the one or more portions of 3D mesh(es). In some embodiments, host device 106(1) transmits the one or more 3D representations to remote device 106(2) (or multiple remote devices) in, e g., an XR stream. Thereafter, XR application 514 included in remote device 106(2) (or in each of multiple remote devices) can render the one or more 3D representations within remote XR environment 730.

Figure 14A:
FIGS. 14A-14D illustrate example user interfaces for initiating a remote collaboration session, in accordance with example implementations.

During the initiation of a remote collaboration session, XR application 514 generates various views 1400, 1420, 1430, 1440. As shown in FIG. 14A, XR application 514 presents a view 1400 that includes host XR workspace 1410, real-world asset 1412, collaboration area 1414, and prompt 1416. In some embodiments, XR application 514 may provide prompt 1416 that instructs a host participant to specify one or more collaboration areas (e.g., collaboration area 1414). As shown, XR application 514 also presents a representation of collaboration area 1414 in XR workspace 1410. In some embodiments, XR application 514 presents collaboration area 1414 using specific colors, filters, or other graphic representations. For example, XR application 514 could highlight collaboration area 1414 using a specific color or specific colors. As another example, XR application 514 could present collaboration area 1414 using a filter that desaturates colors outside collaboration area 1414, darkens areas outside collaboration area 1414, and/or displays areas outside collaboration area 1414 in grayscale. In some embodiments, a host participant can move and/or re-size collaboration area 1414 within host XR workspace 1410 to encompass real-world asset 1412. Then, the host participant can confirm collaboration area 1414 using a confirmation button within prompt 1416.

Figure 14B:

As shown in FIG. 14B, a view 1420 includes host XR workspace 1420, collaboration area 1414, and collaboration tools 1422. In some embodiments, XR application included in host device 106(1) presents view 1420 when initializing a remote collaboration session with one or more remote devices. In some embodiments, once the host participant confirms collaboration area 1414, XR application 514 may prompt the host participant to scan a portion of the real-world environment corresponding to collaboration area 1414. In addition, XR application 514 may indicate areas within collaboration area 1414 that need to be scanned or re-scanned using, e.g., particular colors, filters, animations, or other graphic representations. Once scanned, XR application 514 generates, and transmits to remote device 106(2), a 3D representation of the physical space corresponding to collaboration area 1414, as described above.

Figure 14C:
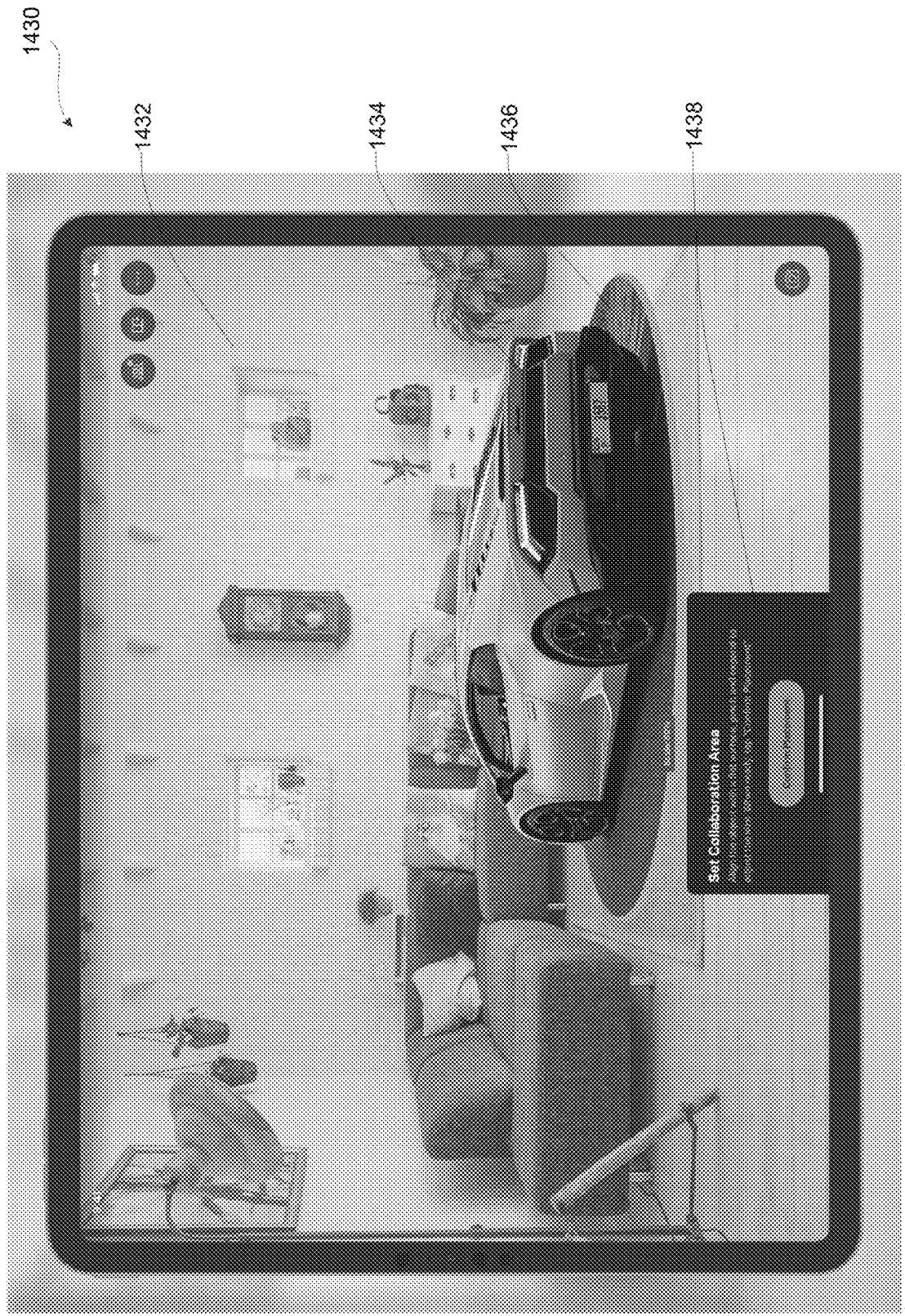

As shown in FIG. 14C, a view 1430 includes remote XR workspace 1432, real-world asset 1434, collaboration area 1436, and prompt 1438. In some embodiments, remote device 106(2) renders the 3D representation that is received from host device 106(1) and associated with a physical space corresponding to collaboration area 1436 that is scanned by host device 106(1), as an adaptable 3D representation. In some embodiments, a remote participant (e.g., a user of remote device 106(2)) can re-size and/or re-position collaboration area 1436 within remote XR workspace 1432, after which the remote participant can confirmation collaboration area 1436 using a confirmation button within prompt 1438. For example, the remote participant may pinch and drag collaboration area 1436 to appear on the surface of a table within remote XR workspace 1432. In addition, in some embodiments, XR application 514 may indicate a boundary of collaboration area 1436 using specific colors (e.g., highlighting the area within collaboration area 1436) and/or specific filters (e.g., desaturating colors outside collaboration area 1414 or displaying the area outside of collaboration area 1436 in grayscale), similar to the description above in conjunction with FIG. 14A.

Figure 14D:

As shown in FIG. 14D, a view 1440 includes XR workspace 1432, real-world asset 1434, collaboration area 1436, and collaboration tools 1442. In some embodiments, XR application 514 included in remote device 106(2) provides collaboration tools 1442 to interact with the collaboration area 1436. For example, collaboration tools 1442 can include tools for drawing, pointing to, pinning, highlighting, etc. within collaboration area 1436. Edits made using collaboration tools 1442 can be displayed in XR workspace 1432 and transmitted back to host device 106(1) for display in host XR environment 710 by XR application 514 included in host device 106(1).

FIGS. 15A-15D illustrate example user interfaces for initiating a remote collaboration session via host device 106(1), in accordance with example implementations. As described, host device 106(1) can receive one or more interactions from a host participant and generate one or more collaboration areas based on the interaction(s). In some embodiments, XR application 514 detects a plane associated with the ground or another surface on which objects can be placed, and XR application 514 generates, based on one or more locations selected by a host participant, one or more collaboration areas that include a predefined shape and are slightly above the detected plane. The host participant can then move and/or re-size one or more collaboration areas in order to control which portion(s) of the real-world environment are scanned and transmitted to remote device 106(2). Alternatively, XR application 514 may detect one or more objects based on one or more locations selected by the host participant or receive, from the host participant, a selection of one or more objects from a list of detected objects. XR application 514 may then generate one or more collaboration areas based on boundaries around the one or more objects. In further embodiments, XR application 514 may detect one or more host participants and generate one or more collaboration areas based on boundaries around the one or more host participants. Once the one or more collaboration areas are set, host device 106(1) can be used to scan and obtain 2D surface data and/or 3D depth data associated with one or more portions of the real-world environment that correspond to the one or more collaboration areas. XR application 514 then generates one or more 3D representations of the one or more portions of the real-world environment, and transmits the one or more 3D representations to remote device 106(2) (or multiple remote devices) for rendering within remote XR environment 730.

Figure 15A:
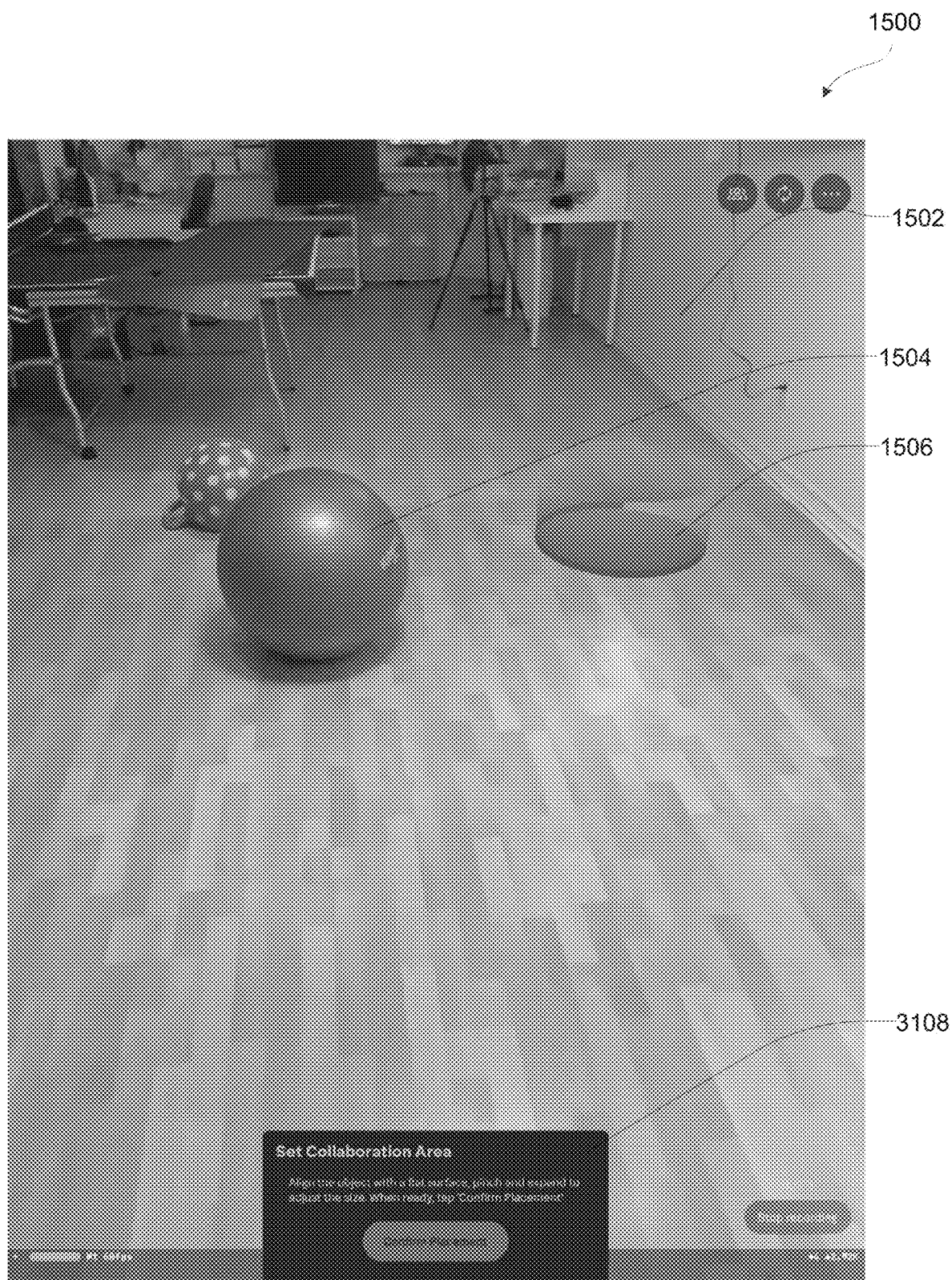
FIGS. 15A-15D illustrate example user interfaces for initiating a remote collaboration session via a host device, in accordance with example implementations.
Figure 15B:
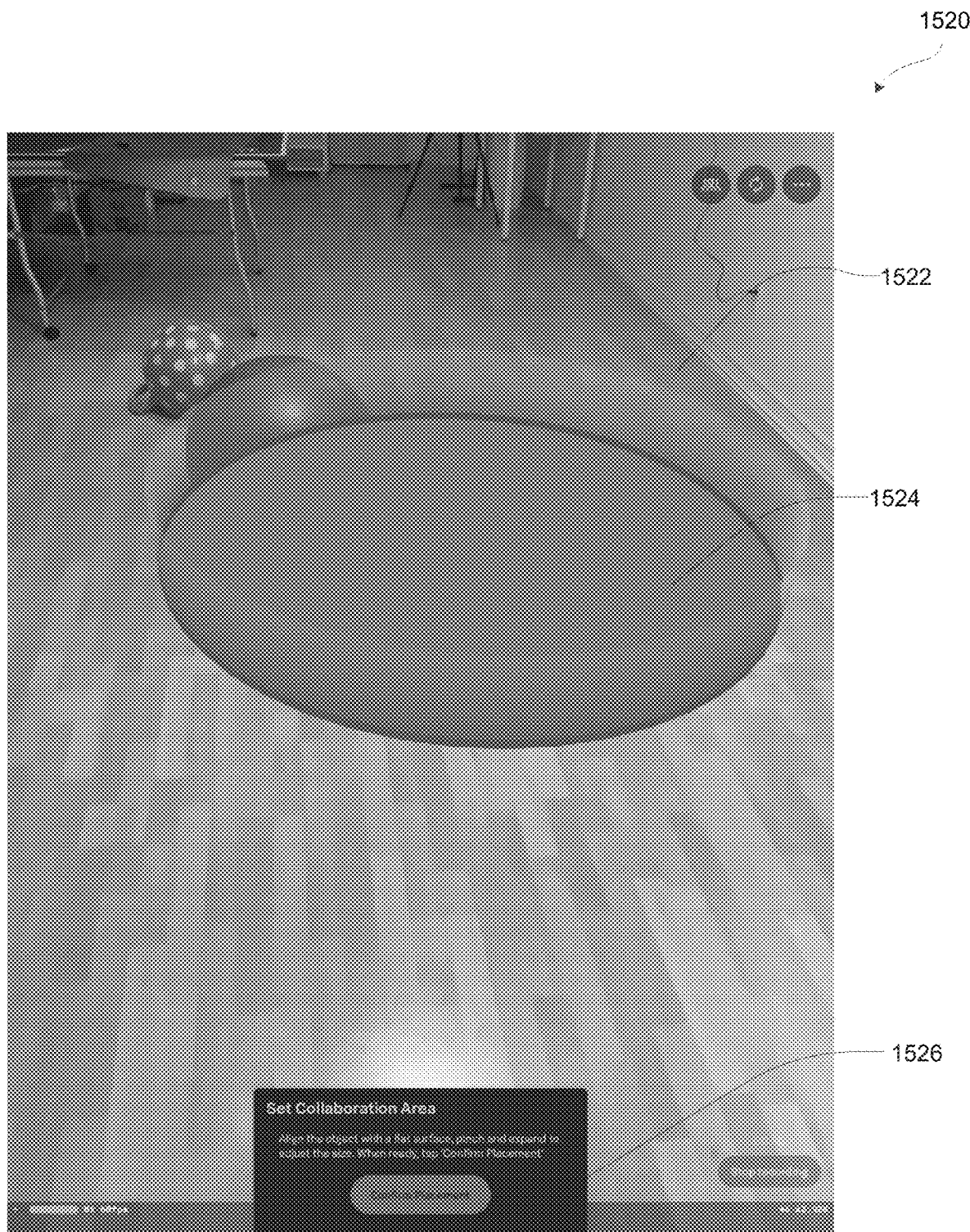

As shown in FIGS. 15A and 32A, XR application 514 presents views 1500 and 1520 for specifying a collaboration area. Similar to view 1400 described above in conjunction with FIG. 14A, view 1500 includes host XR workspace 1502, real-world asset 1504, collaboration area 1506, and prompt 1508; and view 1520 includes host XR workspace 1522, real-world asset 1524, collaboration area 1524, and prompt 1528. In some embodiments, XR application 514 provides prompt 1508 that instructs a host participant to specify collaboration area 1506. As described, in some embodiments, the host participant may move and/or re-size collaboration area 1524 within host XR workspace 1522 to control a portion of the real-world environment that is shared. In some embodiments, collaboration area 1524 may have various predefined shapes (e.g., a cylinder, cuboid, sphere, etc.).

Figure 15C:
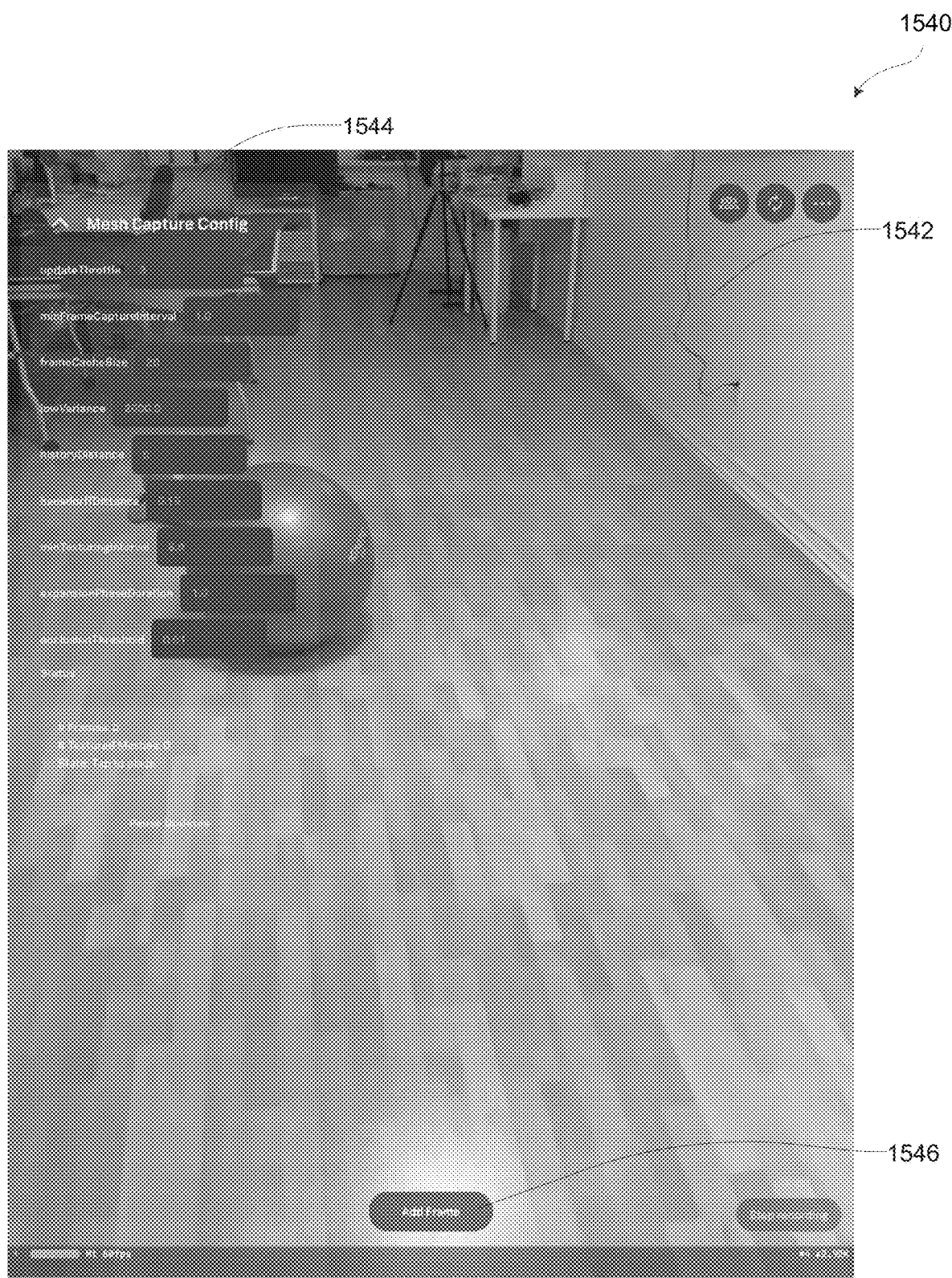

As shown in FIG. 15C, XR application 514 presents a view 1540 to configure scanning of the real-world environment. View 1540 includes host XR workspace 1542, configuration menu 1544, and frame selection icon 1546. In some embodiments, the host participant may modify one or more characteristics associated with scanning the real-world environment, including a frame capture interval, a texturing interval, an occlusion threshold, etc. Based on the configuration settings included in the configuration menu 1544, XR application 514 may determine video frames of the scanned scene that are stored and transmitted to remote device 106(2) for texturing 3D geometry within a collaboration area in host XR environment 710. After specifying the characteristics included in the configuration menu 1544, the host participant can use the add frame button 1546 to scan the scene and capture one or more frames that include image data.

In some embodiments, XR application 514 may indicate the collaboration area using specific colors (e.g., highlighting an area within the collaboration area) and/or using specific filters (e.g., desaturating colors outside the collaboration area or displaying the area outside the collaboration area in grayscale). In some embodiments, the host participant may move and/or re-size the collaboration area within the host XR workspace. For example, the host participant may re-size the collaboration area to encompass a real-world asset. After moving and/or re-sizing the collaboration area, the host participant can confirm the collaboration area (e.g., using the confirmation button within prompt 1526).

Figure 15D:
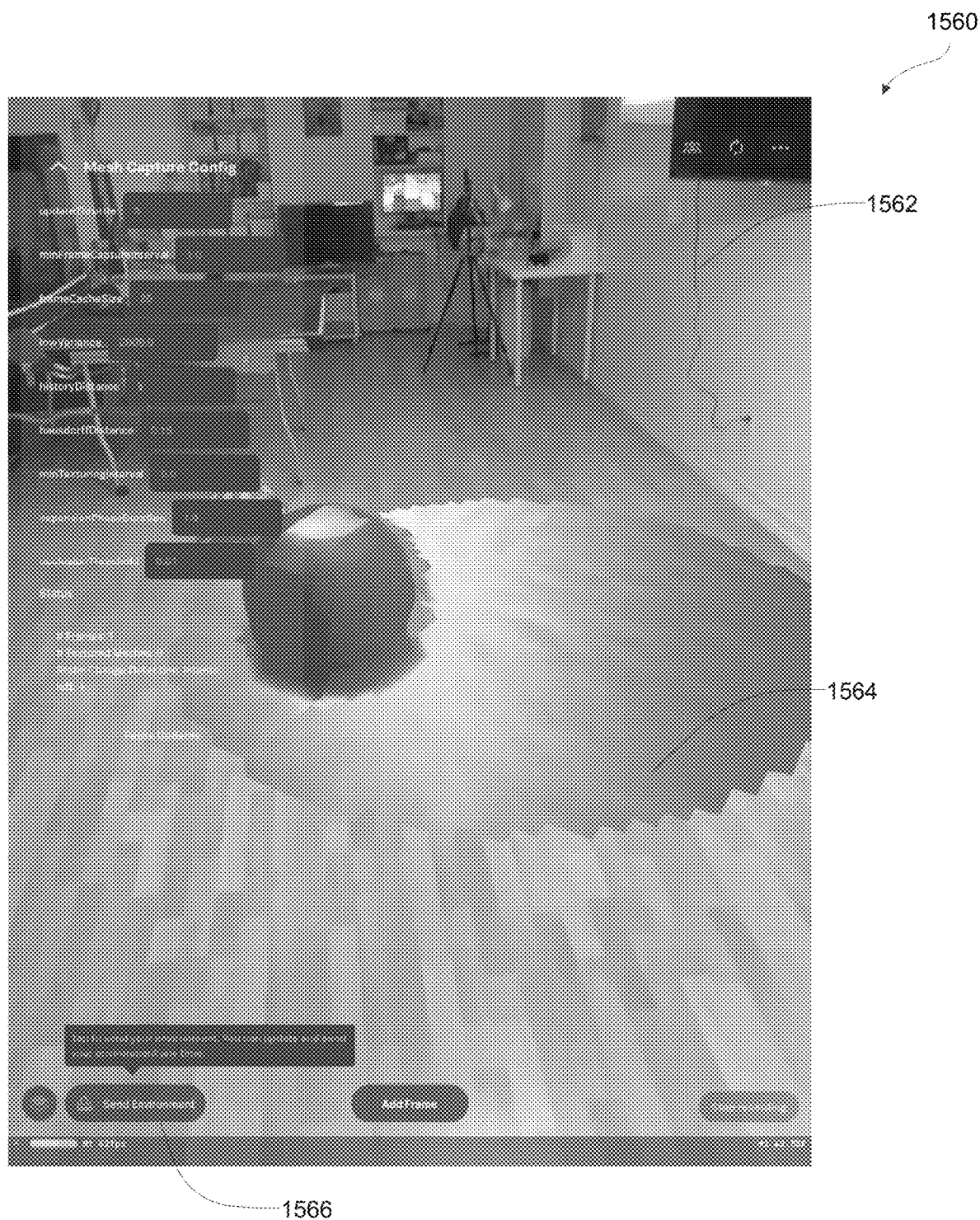

As shown in FIG. 15D, XR application 514 presents view 1560 for scanning a physical space corresponding to a collaboration area. View 1560 includes host XR workspace 1562, scanned collaboration area 1564, and environment transmission icon 1561. In some embodiments, XR application 514 prompts the host participant to scan the physical space corresponding to the collaboration area and causes the real-world environment to be scanned via one or more sensors of host device 106(1). In some embodiments, XR application 514 may indicate portions of the real-world environment that have completed scanning and/or portions that require scanning, using colors, filters, animations, and/or any other graphic representations. For example, XR application 514 could color portions of collaboration area 1564 that have been scanned, or that require scanning, using a specific color. As another embodiment, XR application 514 could indicate that 3D depth data used to generate 3D geometry has been captured using a first color (e.g., purple highlight) and that 2D image data used to texture the 3D geometry has been captured using a second color (e.g., green highlight). As yet another example, XR application 514 could use a specific color and animation to indicate edges of a 3D geometry associated with faces that have not yet been textured using 2D image data. For example, in some embodiments, XR application 514 may run a bar strip having a given width (e.g., a few inches) up and down a screen and determine, based on an associated height (e.g., y-coordinate) of a mesh within collaboration area 1564, whether texture coordinates associated with the mesh have been mapped to corresponding image data. In such a case, XR application 514 can further indicate, using a specific color (e.g., green) and animation (e.g., a pulsing animation), edges of the mesh that are associated with faces that have not yet been textured. After additional image data is acquired that can be used to texture one or more of the untextured faces, colors of the associated edges may be changed, or the animation of those edges may be stopped.

In some embodiments, XR application 514 may present a view that indicates progress in scanning collaboration area 1564. In such cases, XR application 514 may indicate the progress using different colors, filters, animations, and/or any other graphic representations. For example, XR application 514 could initially darken the entire collaboration area 1564, where the darkening indicates portions of collaboration area 1564 that have not yet been scanned. As host device 106(1) scans the portion of the real-world environment corresponding to collaboration area 1564, XR application 514 could progressively lighten and/or texture portions of collaboration area 1564 to indicate progress in scanning. In one example case, XR application 514 could lighten an area from a dark color (e.g., black) to a lighter color (e.g., blue) to indicate that 3D depth data has been captured. XR application 514 could further lighten the area (e.g., from blue to green) to indicate that 2D surface data has been captured, and change one or more colors of collaboration area 1564 yet again (e.g., from green to texture colors) to indicate that collaboration area 1564 has been fully scanned.

In some embodiments, XR application 514 may employ similar views to indicate progress of update scans. For example, XR application 514 could darken portions of collaboration area 1564 in order to indicate areas that should be scanned again. As another example, XR application 514 could modify a color of the boundary of collaboration area 1564 to indicate portions of collaboration area 1564 that have been fully scanned and portions of collaboration area 1564 that need to be scanned again. For example, XR application 514 may thicken the front boundary of collaboration area 1564 to indicate that a front portion of collaboration area 1564 has been fully scanned. In such a case, the remaining thin boundaries of collaboration area 1564 could indicate areas that still require scanning.

Figure 16:
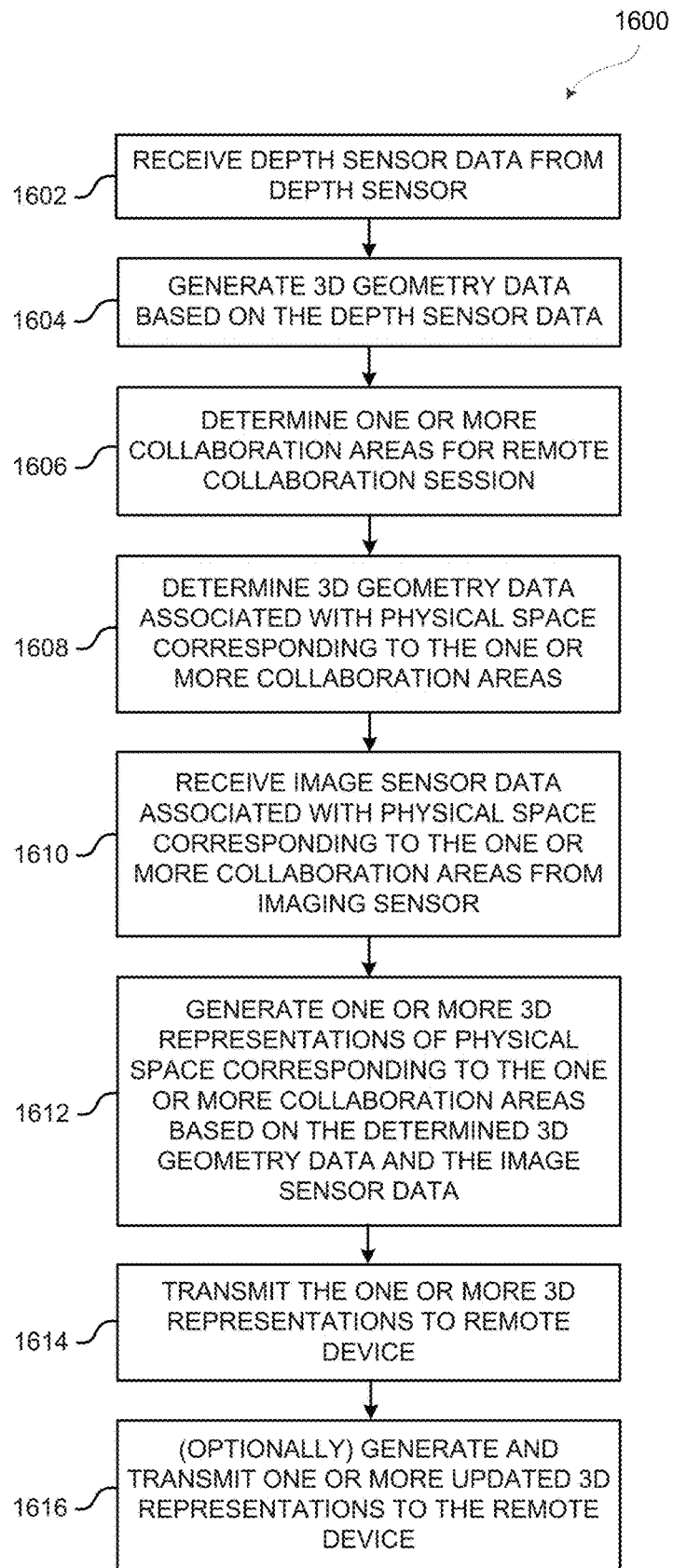
FIG. 16 sets forth a flow diagram of method steps for generating and transmitting a 3D representation of a physical space corresponding to a collaboration area during a remote collaboration session, in accordance with example implementations.

FIG. 16 sets forth a flow diagram of method steps for generating and transmitting a 3D representation of a physical space corresponding to a collaboration area during a remote collaboration session, in accordance with example implementations. Although the method steps are described in conjunction with FIGS. 1-15D, persons of ordinary skill in the art will understand that any system configured to perform this method and/or other methods described herein, in any order, and in any combination not logically contradicted, is within the scope of the present invention.

As shown, a method 1600 begins at step 1602, where host device 106(1) receives depth sensor data from depth sensor 724. For example, in some embodiments, host device 106(1) may include a LiDA® sensor that is used to scan a physical space and acquire depth sensor data associated with the physical space.

At step 1604, host device 106(1) generates 3D geometry data based on the depth sensor data. In some embodiments, the 3D geometry data includes one or more 3D meshes that are generated by XR application 514 or other software executing on host device 106(1), such as an operating system (OS) that generates 3D meshes and provides the same to XR application 514 via an application programming interface (API).

At step 1606, host device 106(1) determines one or more collaboration areas for a remote collaboration session. As described, each collaboration area may include a 3D region with host XR environment 710 that corresponds to a portion of the real-world environment that is to be scanned and transmitted to a remote device during the remote collaboration session. The one or more collaboration areas can be determined in any technically feasible manner. In some embodiments, host device 106(1) can determine one or more collaboration areas automatically and/or based on user inputs, as described below in conjunction with FIGS. 17-20.

At step 1608, host device 106(1) determines 3D geometry data within the one or more collaboration areas in host XR environment 710. In some embodiments, XR application 514 determines the 3D geometry data by extracting, from the 3D geometry data generated at step 1604, 3D geometry data that is within the collaboration area in host XR environment 710. For example, XR application 514 could receive, via the API provided by the OS described above in conjunction with step 1604, one or more 3D meshes that are within the collaboration area, where each 3D mesh includes vertices and faces formed from edges between pairs of vertices. In such a case, XR application 514 can extract vertices and faces from the 3D mesh(es) that are within the collaboration area. Returning to the example of a cylindrical collaboration area, XR application 514 could extract vertices and faces from the 3D mesh(es) that are within a radius (of the cylindrical collaboration area) from a center line associated with the cylindrical collaboration area. Other vertices and faces that are entirely or partially outside the collaboration area may be discarded in some embodiments. In other embodiments, faces that are partially outside the collaboration area may be split, and the split portions of those faces that are within the collaboration area are not discarded. In embodiments in which the one or collaboration areas are set above a plane representing the ground or another surface, XR application 514 may further extract only those vertices and faces that are associated with a height (e.g., a y-axis) value that is above the plane. In addition, in some embodiments, XR application 514 may prompt the host participant to scan a physical space corresponding to the collaboration area in order to acquire additional depth sensor data via depth sensor 724. In such cases, XR application 514 can determine the 3D geometry data at step 1608 based in part on the additional depth sensor data.

Although described herein primarily with respect to extracting, from previously generated 3D geometry data, 3D geometry data that is associated with the physical space corresponding to one or more collaboration areas, in some embodiments host device 106(1) may only capture depth sensor data for the physical space corresponding to one or more collaboration areas and generate, using the depth sensor data, 3D geometry data that is associated with the physical space corresponding to the one or more collaboration areas.

At step 1610, host device 106(1) receives, from imaging sensor 726, image sensor data associated with the physical space corresponding to the one or more collaboration areas. As described, once the collaboration area is set, host device 106(1) can be used to scan the physical space in order to obtain 2D image data for the physical space corresponding to the one or more collaboration areas. In some embodiments, areas that need to be scanned and/or a completion percentage of scanning may be presented to the host participant in any technically feasible manner, such as via the views described above in conjunction with FIGS. 14A, 14C, and 15C-D. In addition, in some embodiments, the physical space can also be scanned to obtain additional 3D depth data that can be used to generate additional 3D geometry data for the one or more collaboration areas.

At step 1612, host device 106(1) generates one or more 3D representations of the portions of the real-world environments associated with the one or more collaboration areas based on the determined 3D geometry data and the image sensor data. Any technically feasible 3D representation(s) can be generated. As described, in some embodiments, each 3D representation can include 3D geometry data, such as one or more portions of 3D mesh(es) that include vertices and faces formed from edges between pairs of vertices, which are within a corresponding collaboration area in the host XR environment 710, as well as one or more frames of a video that can be applied as textures and metadata indicating texture coordinates that define how portions of the one or more frames are mapped to faces in the one or more portions of 3D mesh(es).

At step 1614, host device 106(1) transmits the one or more 3D representations to remote device 106(2). In some embodiments, the one or more 3D representations may be included in an XR stream that is transmitted to remote device 106(2). Thereafter, XR application 514 included in remote device 106(2) can render the one or more 3D representations within remote XR environment 730.

At optional step 1616, host device 106(1) generates and transmits one or more updated 3D representations to remote device 106(2). Each updated 3D representation may include a representation of the entire physical spaces corresponding to collaboration areas, or only a portion of the physical space that has changed. For example, in some embodiments, XR application 514 may determine that 3D geometry data associated with the physical space corresponding to a collaboration area has changed and then transmit, to remote device 106(2), an updated 3D representation that includes the changed 3D geometry data along with one or more new video frames and metadata including texture coordinates mapping portions of those new video frame(s) to the changed 3D geometry data.

Figure 17:
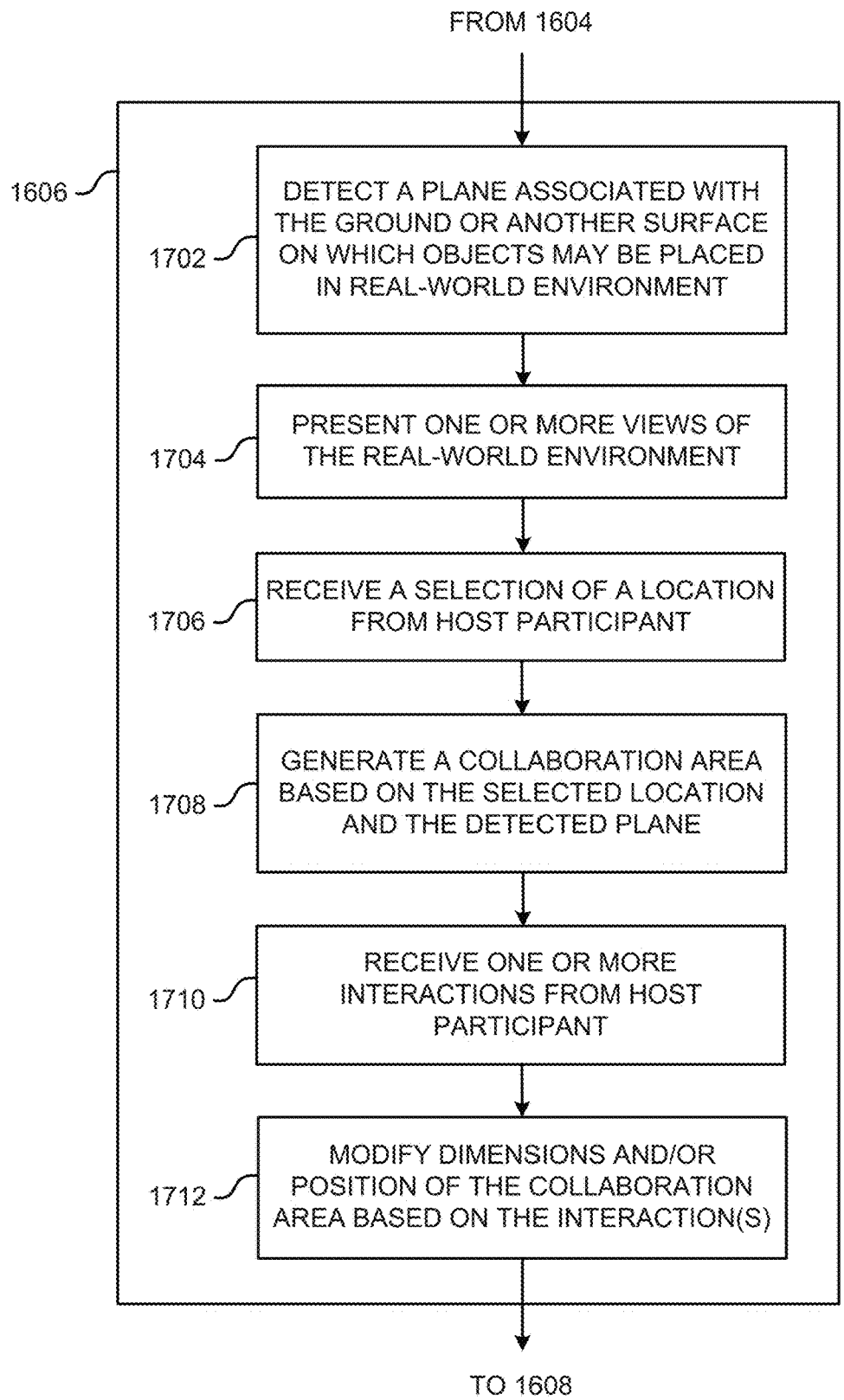
FIG. 17 sets forth a flow diagram of method steps for determining a collaboration area, in accordance with example implementations.

FIGS. 17-20 illustrate different techniques for determining one or more collaboration areas. FIG. 17 sets forth a flow diagram of method steps for determining the collaboration area at step 1606, in accordance with example implementations. Although the method steps are described in conjunction with FIGS. 1-15D, persons of ordinary skill in the art will understand that any system configured to perform this method and/or other methods described herein, in any order, and in any combination not logically contradicted, is within the scope of the present invention. Although described with respect to a single collaboration area, steps 1706-1710 of FIG. 17 can be repeated to determine multiple collaboration areas in some embodiments.

As shown, at step 1702, host device 106(1) detects a plane associated with the ground or another surface (e.g., a table) on which objects may be placed in a real-world environment. In some embodiments, the plane can be detected in any technically feasible manner, including using well-known plane detection techniques.

At step 1704, host device 106(1) presents one or more views of the real-world environment. In some embodiments, the one or more views can include frames of a video and/or standalone images that are generated based on image sensor data that is captured by imaging sensor 726.

At step 1706, host device 106(1) receives a selection of a location from a host participant. The selection may be detected in any technically feasible manner, including, without limitation, as an input received via a hardware controller device such as a joystick, a touch input received via a touchscreen, or a gesture received via a data glove. For example, XR application 514 could present, via a touchscreen device associated with host device 106(1), one or more views that include the physical space and a notification to tap on the touchscreen device at a location to select that location. In such a case, XR application 514 may receive the selection of a location when the host participant taps on the touchscreen device. As another example, XR application 514 could present, via a non-touchscreen display device associated with host device 106(1), one or more views that include the real-world environment and a notification to click on a location to select that location. In such a case, XR application 514 may receive the selection of a location when the host participant clicks on a location in one or more views that are being presented At step 1708, host device 106(1) generates a collaboration area based on the location selected by the host participant at step 1706 and the plane detected at step 1702. In some embodiments, the collaboration area is generated to be centered at the location selected by the host participant and slightly (e.g., a few inches) above the detected plane. For example, the collaboration area could be generated to be 1-5 inches above the detected plane. As described, generating the collaboration area to be slightly above the ground plane can prevent noise from the ground, such as carpet or grass, from being shared with remote device 106(2). In addition, the collaboration area can have a predefined shape, such as a cylindrical or cuboid shape, in some embodiments. In some embodiments, the host participant can select a shape to use from multiple predefined shapes.

At step 1710, host device 106(1) receives one or more interactions from the host participant, and host device 106(1) modifies the dimensions and/or the position of the collaboration area based on the one or more interactions at step 1712. In some embodiments, XR application 514 causes a 3D rendering of the collaboration area to be presented in a view that includes the real-world environment and the collaboration area. Examples of such a view are described above in conjunction with FIGS. 14A-D and 31A-D. Interactions from the host participant to modify the collaboration area can be detected in any technically feasible manner, including, without limitation, as an input received via a hardware controller device such as a joystick, a touch input received via a touchscreen, or a gesture received via a data glove. Returning to the example of a touchscreen device, the host participant could swipe with one finger to reposition the collaboration area and pinch or spread with two fingers to re-size the collaboration area.

In some embodiments, the host participant also confirms the collaboration area. For example, XR application 514 could present a button that the host participant taps on, or clicks, to confirm the collaboration area, as described above in conjunction with FIGS. 14A-D and 15A-D.

Figure 18:
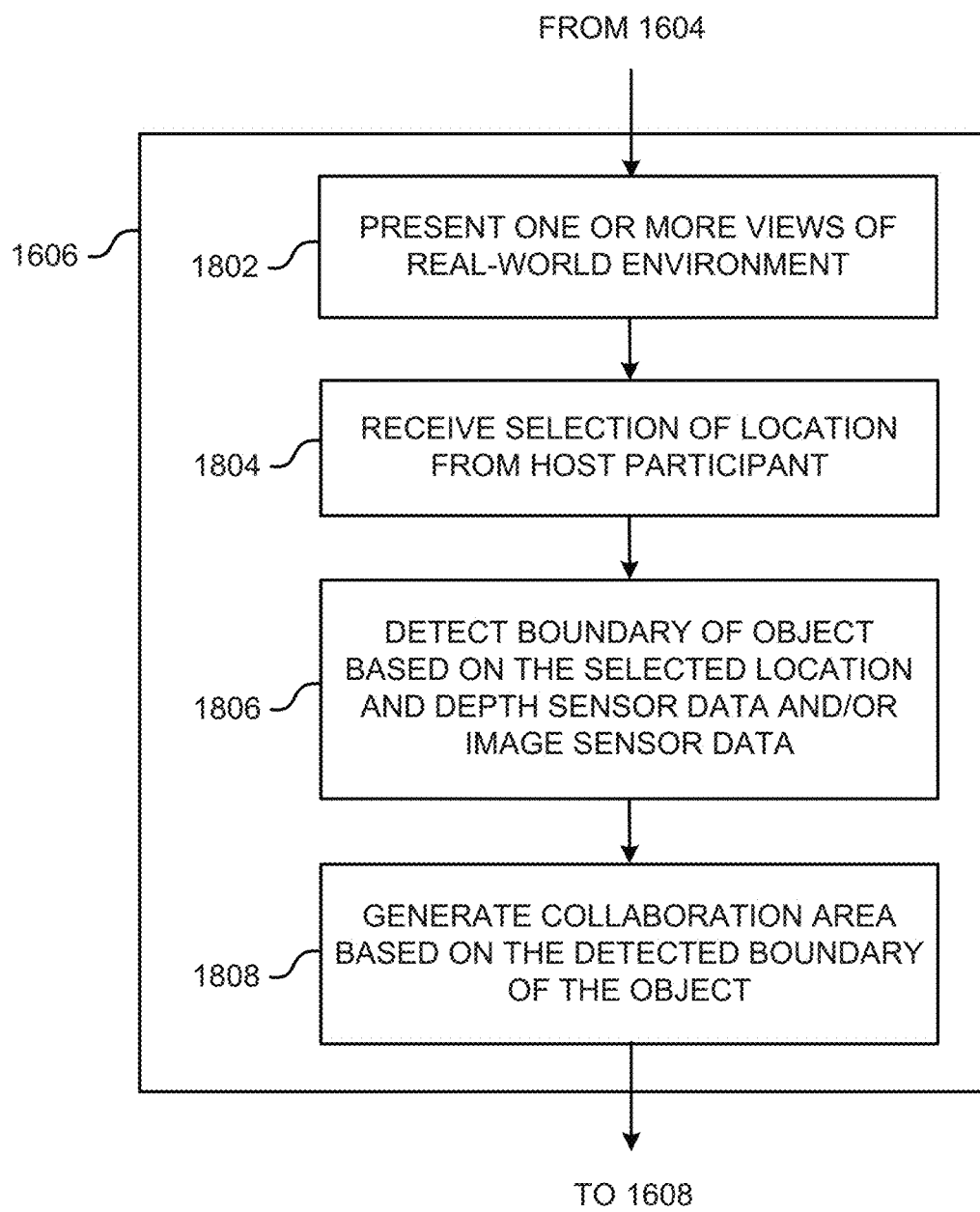
FIG. 18 sets forth a flow diagram of method steps for determining a collaboration area at step 3206, in accordance with other example implementations.

FIG. 18 sets forth a flow diagram of method steps for determining a collaboration area at step 1606, in accordance with other example implementations. Although the method steps are described in conjunction with FIGS. 1-15D, persons of ordinary skill in the art will understand that any system configured to perform this method and/or other methods described herein, in any order, and in any combination not logically contradicted, is within the scope of the present invention. Although described with respect to a single collaboration area, steps 1804-1808 of FIG. 18 can be repeated to determine multiple collaboration areas in some embodiments.

As shown, at step 1802, host device 106(1) presents one or more views of a real-world environment. Similar to step 1704, the one or more views can include frames of a video and/or standalone images that are generated based on image sensor data that is captured by imaging sensor 726.

At step 1804, host device 106(1) receives a selection of a location from a host participant. Similar to step 1706, the selection can be received in any technically feasible manner. For example, the user could tap on a touchscreen device or click on a location in the one or more views that are presented at step 1802.

At step 1806, host device 106(1) detects the boundary of an object based on the selected location and depth sensor data from depth sensor 724 and/or image sensor data from imaging sensor 726. The object boundary can be detected in any technically feasible manner. In some embodiments, an object detection model and/or a saliency model is applied to the depth sensor data and/or the image sensor data to detect the boundary of an object at the selected location. For example, a machine learning model that is trained to detect objects could be applied to detect a bounding box around an object at the selected location in the depth sensor data, or in a combination of the depth sensor data and the image sensor data. Then, a saliency model could be applied to detect a boundary of the object within the bounding box. As another example, an object detection model and/or a saliency model could be applied to detect an object in image sensor data, and the detected object in the image sensor data can then be mapped to depth sensor data in order to detect the same object and a boundary of the object within the depth sensor data. As yet another example, an object and a boundary of the object can be detected based on a comparison of depth sensor data and/or image sensor data with corresponding data that is associated with known objects within a physical area, such as an area defined by a geofence or a beacon location.

At step 1808, host device 106(1) generates the collaboration area based on the detected boundary of the object. In some embodiments, XR application 514 sets the collaboration area to the detected boundary. In other embodiments, XR application 514 may set the collaboration area to be slightly (e.g., a few inches) wider than the detected boundary. In further embodiments, XR application 514 may generate a collaboration area having a predefined shape, such as a cylindrical or cuboid shape, that encompasses the boundary of the object. In yet other embodiments, XR application 514 may set the collaboration area based on a detected region around the object, such as to a bounding box around the object that is detected via an object detection model.

In some embodiments, XR application 514 further detects a plane associated with the ground or another surface (e.g., a table), and generates the collaboration area to be slightly (e.g., a few inches) above the plane, similar to the description above in conjunction with FIG. 17. In some embodiments, XR application 514 can also modify the collaboration area based on one or more interactions from a host participant, similar to steps 1708-1710. In some embodiments, XR application 514 also permits the host participant to confirm the collaboration area, similar to the description above in conjunction with FIG. 17.

Figure 19:
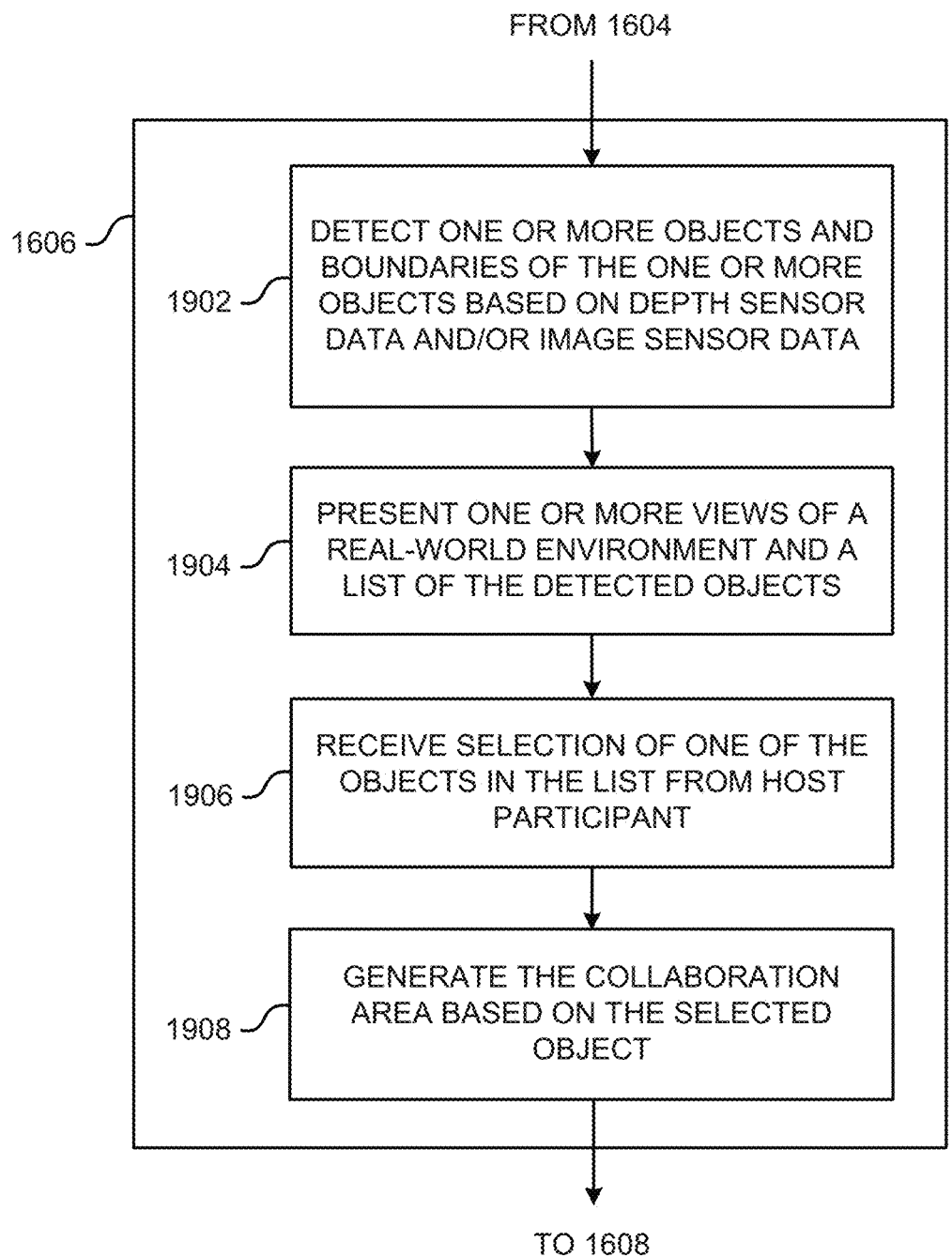
FIG. 19 sets forth a flow diagram of method steps for determining a collaboration area at step 3206, in accordance with other example implementations.

FIG. 19 sets forth a flow diagram of method steps for determining a collaboration area at step 1606, in accordance with other example implementations. Although the method steps are described in conjunction with FIGS. 1-15D, persons of ordinary skill in the art will understand that any system configured to perform this method and/or other methods described herein, in any order, and in any combination not logically contradicted, is within the scope of the present invention. Although described with respect to a single collaboration area, steps 1906-1908 of FIG. 19 can be repeated to determine multiple collaboration areas in some embodiments.

As shown, at step 1902, host device 106(1) detects one or more objects and boundaries of those object(s) based on depth sensor data from depth sensor 724 and/or image sensor data from imaging sensor 726. The one or more objects and boundaries can be detected in any technically feasible manner, including using an object detection model and/or a saliency model, similar to the description above in conjunction with step 1806.

At step 1904, host device 106(1) presents one or more views of a real-world environment and a list of the objects detected at step 1902. Similar to step 1704, the one or more views can include frames of a video and/or standalone images that are generated based on image sensor data that is captured by imaging sensor 726.

At step 1906, host device 106(1) receives a selection of one of the objects in the list from a host participant. Similar to step 1706, the selection can be received in any technically feasible manner. For example, the host participant could tap on a touchscreen device or click on a menu button associated with the object in the list to select that object.

At step 1908, host device 106(1) generates the collaboration area based on the selected object. Similar to step 1808, XR application 514 can set the collaboration area to the detected boundary, or to be slightly (e.g., a few inches) wider than the detected boundary in some embodiments. In other embodiments, XR application 514 may generate a collaboration area that has a predefined shape, such as a cylindrical or cuboid shape, that encompasses the boundary of the selected object. In further embodiments, XR application 514 may set the collaboration area based on a detected region around the object, such as to a bounding box around the object that is detected via an object detection model.

In some embodiments, XR application 514 further detects a plane associated with the ground or another surface (e.g., a table), and generates the collaboration area around the selected object to be slightly (e.g., a few inches) above the plane, similar to the description above in conjunction with FIG. 17. In some embodiments, XR application 514 can also modify the collaboration area based on one or more interactions from a host participant, similar to steps 1708-1710. In some embodiments, XR application 514 also permits the host participant to confirm the collaboration area, similar to the description above in conjunction with FIG. 17.

Figure 20:
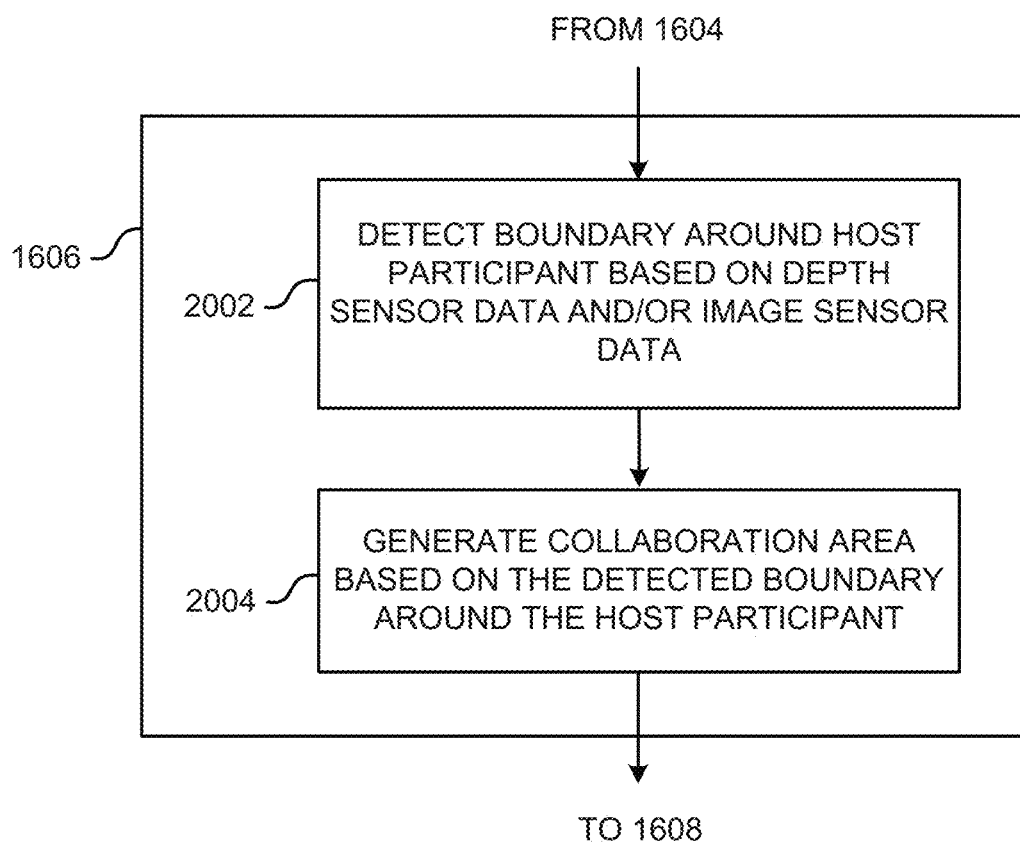
FIG. 20 sets forth a flow diagram of method steps for determining a collaboration area at step 3206, in accordance with other example implementations.

FIG. 20 sets forth a flow diagram of method steps for determining a collaboration area at step 1606, in accordance with other example implementations. Although the method steps are described in conjunction with FIGS. 1-15D, persons of ordinary skill in the art will understand that any system configured to perform this method and/or other methods described herein, in any order, and in any combination not logically contradicted, is within the scope of the present invention. Although described with respect to a single collaboration area, the method steps of FIG. 20 can be repeated to generate multiple collaboration areas.

As shown, at step 2002, host device 106(1) detects a boundary around a host participant in a physical space based on depth sensor data from depth sensor 724 and/or image sensor data from imaging sensor 726. The host participant can be detected in any technically feasible manner, such as using an object detection model and/or a saliency model, similar to the detection of an object described above in conjunction with step 1806, except the object being detected is the host participant. In some embodiments, other objects may be detected along with the host participant, such as objects the host participant is holding and/or wearing. In such cases, the boundary around the host participant may also encompass one or more of the detected objects.

At step 2004, host device 106(1) generates the collaboration area based on the detected boundary around the host participant. Similar to step 1808, XR application 514 can set the collaboration area to the detected boundary around the host participant or to be slightly (e.g., a few inches) wider than the detected boundary in some embodiments. In other embodiments, XR application 514 may generate a collaboration area that has a predefined shape, such as a cylindrical or cuboid shape, that encompasses the boundary around the host participant. In further embodiments, XR application 514 may set the collaboration area based on a detected region around the host participant, such as to a bounding box around the host participant that is detected via an object detection model.

In some embodiments, XR application 514 further detects a plane associated with the ground or another surface (e.g., a table), and generates the collaboration area around the host participant to be slightly (e.g., a few inches) above the plane, similar to the description above in conjunction with FIG. 17. In some embodiments, XR application 514 can also modify the collaboration area based on one or more interactions from the host participant, similar to steps 1708-1710. In some embodiments, XR application 514 also permits the host participant to confirm the collaboration area, similar to the description above in conjunction with FIG. 17.

Figure 21:
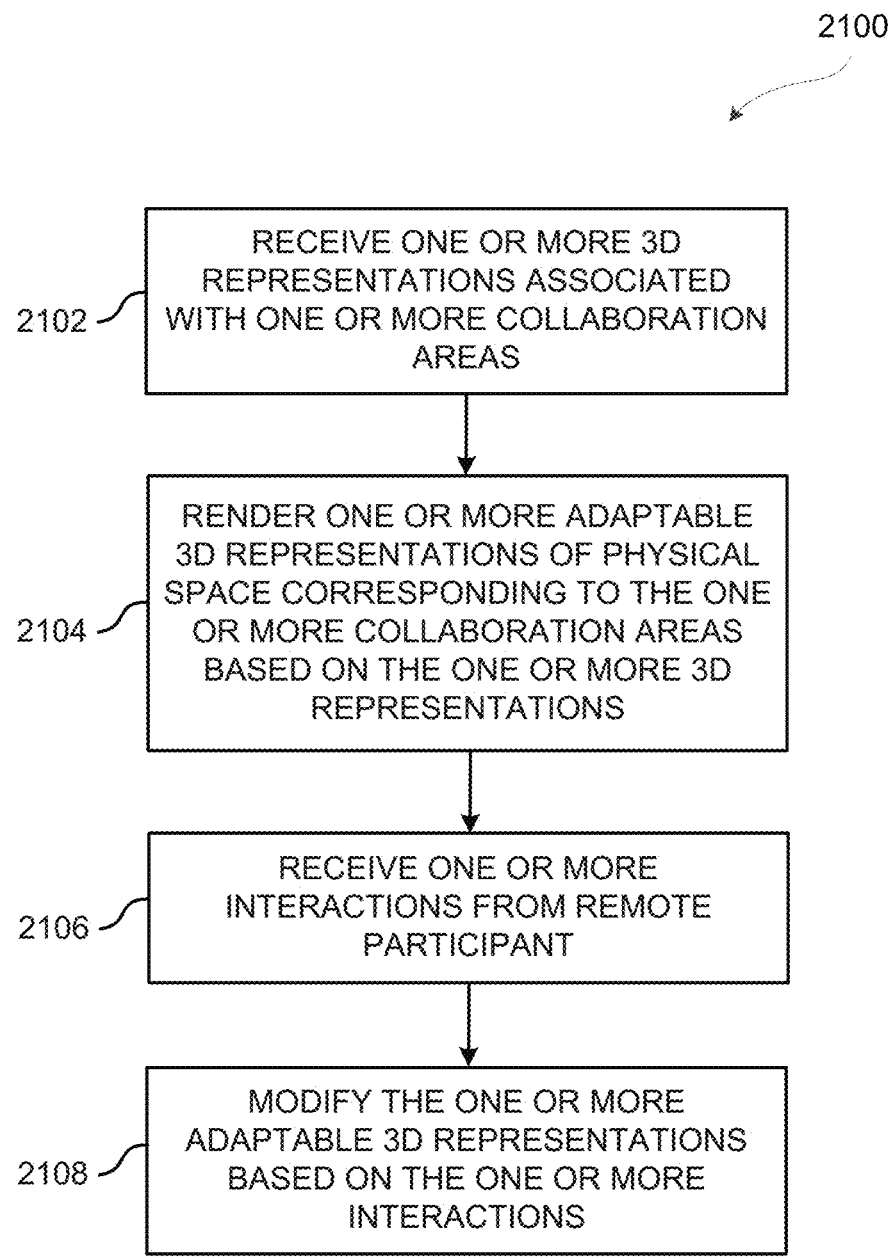
FIG. 21 sets forth a flow diagram of method steps for generating a digital representation of a physical space corresponding to a collaboration area, in accordance with example implementations.

FIG. 21 sets forth a flow diagram of method steps for generating a digital representation of a physical space corresponding to a collaboration area, in accordance with example implementations. Although the method steps are described in conjunction with FIGS. 1-15D, persons of ordinary skill in the art will understand that any system configured to perform this method and/or other methods described herein, in any order, and in any combination not logically contradicted, is within the scope of the present invention.

As shown, a method 2100 begins at step 2102, where a remote device (e.g., remote device 106(2), 106(3), etc.) receives one or more 3D representations associated with one or more collaboration areas from host device 106(1). In some embodiments, XR application 514 in remote device 106(2) and/or mobile operations application 516 in remote device 106(3) can receive the one or more 3D representations via tunnel bridge 706. In some embodiments, XR application 514 and/or mobile operations application 516 may receive the one or more 3D representations in a series of serialized chunks. Additionally or alternatively, XR application 514 and/or mobile operations application 516 may receive the one or more 3D representations as a discrete set of data that corresponds to a scene at a particular time (e.g., an initial set of geometry data at the start of a remote collaboration session). In some embodiments, workspace service 708 may specify that remote device 106(2) or 106(3) is an intended recipient of the one or more 3D representations. In such instances, data intake and query system 102 may direct a copy of the one or more 3D representations, originating at host device 106(1), to remote device 106(2) and/or remote device 106(3).

At step 2104, the remote device renders one or more adaptable 3D representations of the physical space corresponding to collaboration area(s) based on the one or more 3D representations. For example, XR application 514 included in remote device 106(2) could generate an adaptable 3D representation associated with each collaboration area for inclusion in remote XR environment 732. In another example, mobile operations application 516 included in remote device 106(3) could generate the adaptable 3D representation associated with each collaboration area for inclusion in remote XR environment 730.

In some embodiments, when rendering each adaptable 3D representation, XR application 514 and/or mobile operations application 516 may extract the 3D geometry data included in a 3D representation and render the 3D geometry data along with a surface texture based on texture coordinate metadata and textures (e.g., frames) that are included in the 3D representation. In some embodiments, XR application 514 in host device 106(1) may set an initial anchor point as the origin of a scene and then determine coordinate data (e.g., x-axis, y-axis, and z-axis coordinates) from the anchor point for portions of the 3D geometry data and/or texture data. Based on the determined coordinates, host device 106(1) may convert the texture data and/or the 3D geometry data into a set of vertices at specific coordinates, a set of faces comprising edges between pairs of vertices, and texture the 3D geometry based on the coordinates and texture coordinate metadata included in the 3D representation. In such instances, the remote device may set one or more remote anchor points within a remote environment and render the adaptable 3D representation of each collaboration region based on the one or more remote anchor points.

At step 2106, the remote device receives one or more interactions from a remote participant that modify one or more adaptable 3D representations. In some embodiments, XR application 514 in remote device 106(2) and/or mobile operations application 516 in remote device 106(3) provides controls that enable the remote participant to scale, move, and modify the remote environment. In such instances, the remote device may receive one or more interactions from a remote participant during the remote collaboration session that modify the rendering of one or more adaptable 3D representations. For example, the remote device could receive an input corresponding to the remote participant changing one or more dimensions (e.g., scaling the scene) or the location (e.g., moving a remote anchor point) of an adaptable 3D representation.

At step 2108, the remote device modifies the one or more adaptable 3D representations based on the one or more interactions. For example, after receiving an interaction from the remote participant that modifies the dimensions (e.g., separate controls for the x-axis, y-axis, and z-axis) and/or the position of a collaboration area, the remote device may respond by modifying the rendering of the adaptable 3D environment associated with the collaboration area within the remote environment.

In some embodiments, the remote device may also receive and render one or more updated 3D representations associated with one or more collaboration areas from host device 106(1). For example, host device 106(1) could transmit, to the remote device, one or more updated 3D representations that are generated at optional step 1616. In such a case, the remote device can render one or more adaptable 3D representations based on the one or more updated 3D representations in remote XR environment 732, similar to step 2104.

Figure 22:
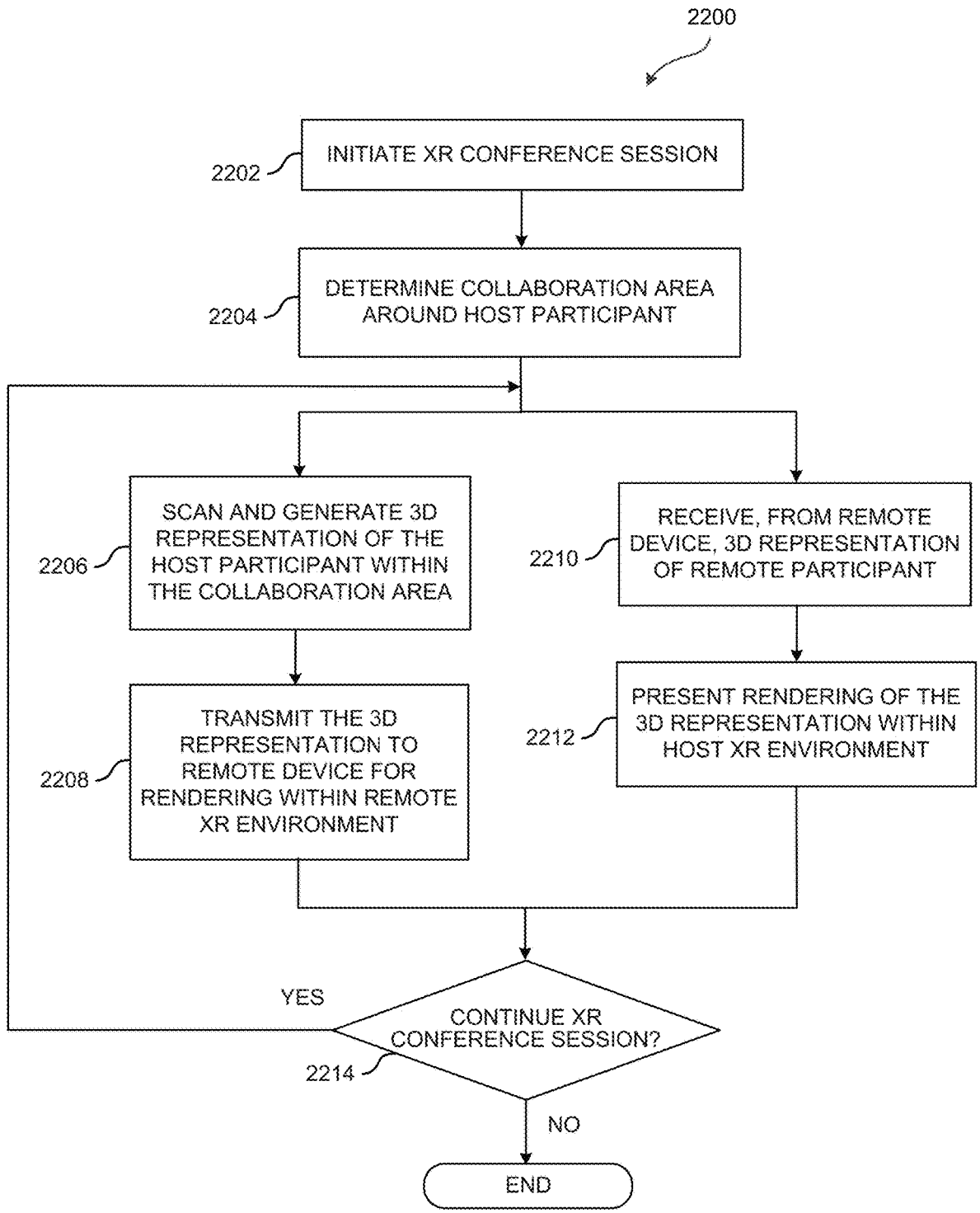
FIG. 22 sets forth a flow diagram of method steps for an extended reality conference session, in accordance with example implementations.

FIG. 22 sets forth a flow diagram of method steps for an extended reality conference session, in accordance with example implementations. Although the method steps are described in conjunction with FIGS. 1-15D, persons of ordinary skill in the art will understand that any system configured to perform this method and/or other methods described herein, in any order, and in any combination not logically contradicted, is within the scope of the present invention.

As shown, a method 2200 begins at step 2202, where host device 106(1) initiates an XR conference session. In some embodiments, the XR conference session is a remote session in which one or more host participants communicate with one or more remote participants. The XR conference session can be initiated in any technically feasible manner, such as via a reference (e.g., a hyperlink) to the XR conference session and/or in response a host participant selecting to start the XR conference session (e.g., via a start button).

At step 2204, host device 106(1) determines a collaboration area around the host participant in host XR environment 710. In some embodiments, the collaboration area can be determined in any technically feasible manner, such using an object detection model and/or a saliency model, and/or based on input by the host participant specifying a location and/or the position and dimensions of the collaboration area, as described above in conjunction with FIGS. 17-20. It should be noted that step 2204 assumes that sharing of a 3D representation of the host participant is enabled. In some embodiments, XR application 514 may present menu items that can be selected to enable or disable sharing of a 3D representation of the host participant.

Although described with respect to a single collaboration area around a host participant, multiple collaboration areas may be determined in some cases, such as when multiple host participants are identified in the host real-world environment. In addition, one or more collaboration areas can be added or discarded over time. For example, another collaboration area could be added when a new host participant is detected, or an existing collaboration area could be discarded if a host participant leaves and can no longer be detected.

At step 2206, host device 106(1) scans and generates a 3D representation of the host participant within the collaboration area in host XR environment 710. In some embodiments, XR application 514 causes one or more sensors associated with host device 106(1) to capture depth and image sensor data. Then, XR application 514 generates a 3D representation that includes one or more portions of 3D geometry data that are associated with the collaboration area, as well as one or more frames of a video that can be applied as textures and metadata indicating texture coordinates that define how portions of the one or more frames are mapped to faces in the geometry data, as described above in conjunction with FIGS. 14A and 16.

At step 2208, host device 106(1) transmits the 3D representation to remote device 106(2) for rendering within remote XR environment 730. In some embodiments, XR application 514 may also render the 3D representation in the host XR environment, either as a preview prior to transmitting the 3D representation to remote device 106(2) and/or at substantially the same time as the 3D representation is transmitted to remote device 106(2). Although described with respect to transmitting the 3D representation to a single remote device, a 3D representation of the host participant can be transmitted to any number of remote devices in some embodiments.

Concurrently with steps 2204-2208, at step 2210, host device 106(1) receives, from remote device 106(2), a 3D representation of a remote participant. The 3D representation of the remote participant can be generated in a similar manner as the 3D representation of the host participant, described above in conjunction with steps 2204-2206. In addition, step 2210 assumes that sharing of the 3D representation of the remote participant has been enabled. Although described with respect to receiving the 3D representation of a remote participant from a single remote device, 3D representations of the remote participants can be received from any number of remote devices in some embodiments.

At step 2212, host device 106(1) presents, via a display device associated with host device 106(1), a rendering of the 3D representation within host XR environment 710.

At step 2214, if the XR conference session should not continue, such as if either the host participant or the remote participant selects to terminate the XR conference session, then method 2200 ends. Otherwise, method 2200 returns to steps 2206 and 2210, where host device 106(1) scans and generates an updated 3D representation of the host participant within the collaboration area and receives an updated 3D representation of the remote participant, respectively. The updated 3D representations can be generated in any technically feasible manner, such as using techniques described above in conjunction with optional step 1616. In some embodiments, method 2200 can also return to step 2204 to determine an updated collaboration area around the host participant, either periodically and/or when XR application 1304 detects that the host participant has moved significantly and is no longer within a previous collaboration area.

In this way, visually enabled conference calls and other forms of communication may be expressed using extended reality techniques that allow active detection of the participants, including things they may be holding, or other items that they may interact with during the call. The expression of the collaboration area in three dimensions allows the participants in these communications to have more freedom to interact with items, such as a chalkboard, dry erase board, physical model, or other illustration or object that will facilitate communication. In addition, because the collaboration area is defined to exclude areas that the user does not want to show, privacy for the users may be maintained while efficiency is improved.

In sum, a host device and one or more remote devices interact in a common remote collaboration session. When initiating a remote collaboration session, an XR application in a host device determines a collaboration area (or multiple collaboration areas). The collaboration area corresponds to a portion of a real-world environment that is shared by the host device with the one or more remote devices. In some embodiments, the collaboration area can be determined automatically and/or based on user input. The XR application causes sensors associated with the host device to scan the collaboration area. Then, the XR application transmits, to the one or more remote devices, a three-dimensional representation of the collaboration area for rendering in one or more remote XR environments.

In some embodiments, a host participant specifies a location associated with a collaboration area and then adjusts the dimensions and/or a position of the collaboration area. In other embodiments, an object is detected based on a location that a host participant selects, and the collaboration area is generated based on a boundary around the object. In further embodiments, objects within a real-world environment are detected and presented in a list, and the collaboration area is generated based on the boundary around an object selected from the list by a host participant. In additional embodiments, a host participant may be detected, and the collaboration area is generated based on a boundary around the host participant.

In some embodiments, a depth sensor acquires three-dimensional depth data, and an imaging sensor acquires two-dimensional image data for the physical space corresponding to one or more collaboration areas. An extended reality application device combines correlated 2D image and 3D depth data corresponding to the one or more collaboration areas into one or more 3D representations that can be transmitted to a remote device in an XR stream.

The remote device receives the one or more 3D representations and renders, based on the received data, portions of the physical space corresponding to the one or more collaboration areas for presentation at a location of the remote device. In some embodiments, the rendering generated by the remote device includes a digital representation of one or more real-world assets that are included in the one or more collaboration areas. In some embodiments, the remote participant can modify the dimensions and the position of the rendered collaboration area(s). In some embodiments, the host device and the remote device may independently retrieve data values associated with the real-world asset and present the data within the respective host environment and remote environment.

During the remote collaboration session, the remote device can update a view including the one or more collaboration areas to correspond to different positions relative to the digital representation of a real-world asset within the collaboration area. The remote device updates the view including the one or more collaboration areas independent of the view that the host device is presenting to the host participant. In some embodiments, one or more devices may receive interaction data from other participants that correspond to actions performed by a participant during the remote collaboration session. The one or more devices receiving the interaction may then update portions of one or more host collaboration areas and/or one or more remote collaboration areas to reflect the interaction data. In some embodiments, participants may use a set of remote collaboration tools to add and manipulate various extended reality elements, such as highlighters, pins, pointers, color palettes, and similar interaction tools to modify one or more host collaboration areas and/or one or more remote collaboration areas.

At least one technological advantage of the disclosed techniques relative to prior techniques is that remote devices may view and interact with a digital representation of the physical space corresponding to one or more collaboration areas independent from the perspective of a host device. The one or more collaboration areas are generated to exclude portions of the real-world environment that a user of the host device does not wish to share with the remote devices. In addition, the host and remote devices primarily process data associated with the one or more collaboration areas, which is more computationally efficient than processing data associated with the entire real-world environment. These technical advantages represent one or more technological advancements over prior art approaches.

1. In some embodiments, a computer-implemented method comprises initiating a remote conference session, receiving, from one or more depth sensors associated with a host device, depth data associated with a three-dimensional (3D) environment, receiving, from one or more image sensors associated with the host device, image data associated with the 3D environment, determining a collaboration area around at least a portion of a first user in the 3D environment, generating a first 3D representation of the at least a portion of the first user based on the depth data, the image data, and the collaboration area, and transmitting the first 3D representation for rendering within a first extended reality (XR) environment associated with the remote conference session.

2. The method of clause 1, further comprising receiving a second 3D representation of at least a portion of a second user, and rendering, within a second XR environment associated with the remote conference session, the second 3D representation of the at least a portion of the second user.

3. The method of clauses 1 or 2, wherein determining the collaboration area comprises detecting, based on a machine learning model and at least one of the depth data or the image data, a boundary around the at least a portion of a first user in the 3D environment, and generating the collaboration area based on the boundary.

4. The method of any of clauses 1-3, wherein determining the collaboration area comprises detecting, based on a saliency model and at least one of the depth data or the image data, a boundary around the at least a portion of a first user in the 3D environment, and generating the collaboration area based on the boundary.

5. The method of any of clauses 1-4, wherein determining the collaboration area comprises determining, based on the depth data, a plane associated with the 3D environment, receiving, from the first user, a selection of a location, generating the collaboration area based on the location and the plane, receiving, via one or more input devices, one or more interactions by the first user, and modifying at least one of a size or a position of the collaboration area based on the one or more interactions.

6. The method of any of clauses 1-5, wherein determining the collaboration area comprises detecting the at least a portion of the first user in the image data, determining a mapping between the at least a portion of the first user in the image data and the depth data, and generating the collaboration area based on the mapping.

7. The method of any of clauses 1-6, wherein the collaboration area is a 3D region around the at least a portion of the first user and one or more objects within the 3D environment.
8. The method of any of clauses 1-7, further comprising displaying, via a display device associated with the host device, an indication that image data associated with at least a portion of the collaboration area needs to be captured via the one or more image sensors.
9. The method of any of clauses 1-8, wherein generating the first 3D representation comprises generating, based on the depth data, one or more 3D meshes, wherein each 3D mesh included in the one or more 3D meshes comprises a set of vertices and a set of faces formed from edges between pairs of vertices in the set of vertices, determining one or more vertices and one or more faces included in the one or more 3D meshes that are within the collaboration area, and determining one or more textures associated with the one or more faces based on the image data.
10. The method of any of clauses 1-9, further comprising generating a 3D background associated with a portion of the 3D environment that is outside the collaboration area, and transmitting, to the remote device, the 3D background for rendering in the first XR environment.
11. The method of any of clauses 1-10, further comprising receiving, from the one or more depth sensors, additional depth data associated with the 3D environment, receiving, from the one or more image sensors, additional image data associated with the 3D environment, determining, based on the additional depth data, changes in one or more geometries within the collaboration area, and generating a second 3D representation of the first user based on the additional depth data, the additional image data, and the collaboration area, and transmitting, to the remote device, the second 3D representation for rendering in the first XR environment.
12. The method of any of clauses 1-11, further comprising detecting, based on at least one of the depth data or the image data, a third user within the 3D environment, determining another collaboration area around at least a portion of the third user in the 3D environment, generating a third 3D representation of the at least a portion of the third user based on the depth data, the image data, and the other collaboration area, and transmitting, to the remote device, the third 3D representation for rendering in the first XR environment.
13. In some embodiments, one or more non-transitory computer-readable media store program instructions that, when executed by at least one processor, cause the at least one processor to perform the steps of initiating a remote conference session, receiving, from one or more depth sensors associated with a host device, depth data associated with a three-dimensional (3D) environment, receiving, from one or more image sensors associated with the host device, image data associated with the 3D environment, determining a collaboration area around at least a portion of a first user in the 3D environment, generating a first 3D representation of the at least a portion of the first user based on the depth data, the image data, and the collaboration area, and transmitting, to a remote device, the first 3D representation for rendering in a first extended reality (XR) environment associated with the remote conference session.
14. The one or more non-transitory computer-readable media of clause 13, the steps further comprising receiving a second 3D representation of at least a portion of a second user, and rendering, in a second XR environment associated with the remote conference session, the second 3D representation of the at least a portion of the second user.
15. The one or more non-transitory computer-readable media of clauses 13 or 14, wherein determining the collaboration area comprises detecting, based on at least one of a machine learning model or a saliency model and at least one of the depth data or the image data, a boundary around the at least a portion of a first user in the 3D environment, and generating the collaboration area based on the boundary.
16. The one or more non-transitory computer-readable media of any of clauses 13-15, wherein determining the collaboration area comprises determining, based on the depth data, a plane associated with the 3D environment, receiving, from the first user, a selection of a location, generating the collaboration area based on the location and the plane, receiving, via one or more input devices, one or more interactions by the first user, and modifying at least one of a size or a position of the collaboration area based on the one or more interactions.
17. The one or more non-transitory computer-readable media of any of clauses 13-16, wherein the collaboration area is a 3D region around the at least a portion of the first user and one or more objects within the 3D environment.
18. The one or more non-transitory computer-readable media of any of clauses 13-17, wherein generating the first 3D representation comprises generating, based on the depth data, one or more 3D meshes, wherein each 3D mesh included in the one or more 3D meshes comprises a set of vertices and a set of faces formed from edges between pairs of vertices in the set of vertices, determining one or more vertices and one or more faces included in the one or more 3D meshes that are within the collaboration area, and determining one or more textures associated with the one or more faces based on the image data.
19. The one or more non-transitory computer-readable media of any of clauses 13-18, the steps further comprising generating a two-dimensional (2D) or 3D background associated with a portion of the 3D environment that is outside the collaboration area, and transmitting, to the remote device, the 2D or 3D background for rendering in the first XR environment.
20. In some embodiments, a system comprises one or more memories storing instructions, and one or more processors that are coupled to the one or more memories and, when executing the instructions, are configured to initiate a remote conference session, receive, from one or more depth sensors associated with a host device, depth data associated with a three-dimensional (3D) environment, receive, from one or more image sensors associated with the host device, image data associated with the 3D environment, determine a collaboration area around at least a portion of a first user in the 3D environment, generate a first 3D representation of the at least a portion of the first user based on the depth data, the image data, and the collaboration area, and transmit, to a remote device, the first 3D representation for rendering in a first extended reality (XR) environment associated with the remote conference session.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products in accordance with example implementations of the present disclosure. In this regard, each block in the flowchart or block diagrams may represent one or more modules, segments, or portions of code, which each comprise one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method comprising:
   initiating a remote conference session;
   receiving, from one or more depth sensors associated with a host device, depth data associated with a three-dimensional (3D) environment;
   receiving, from one or more image sensors associated with the host device, image data associated with the 3D environment;
   determining a collaboration area around at least one automatically detected portion of a first user in the 3D environment, wherein the collaboration area is at least one of (i) a predefined 3D shape encompassing the at least one automatically detected portion of the first user, or (ii) determined based on a boundary of the at least one automatically detected portion of the first user, and wherein the at least one automatically detected portion can be moved or re-sized responsive to user interaction to control a size or location of the collaboration area;
   generating a first 3D representation of the at least one automatically detected portion of the first user based on the depth data, the image data, and the collaboration area; and
   transmitting the first 3D representation for rendering within a first extended reality (XR) environment associated with the remote conference session.

2. The method of claim 1, further comprising:
   receiving a second 3D representation of at least a portion of a second user; and
   rendering, within a second XR environment associated with the remote conference session, the second 3D representation of the at least a portion of the second user.

3. The method of claim 1, wherein determining the collaboration area comprises:
   detecting, based on a machine learning model and at least one of the depth data or the image data, the boundary of the at least one automatically detected portion of the first user in the 3D environment; and
   generating the collaboration area based on the boundary.

4. The method of claim 1, wherein determining the collaboration area comprises:

detecting, based on a saliency model and at least one of the depth data or the image data, the boundary of the at least one automatically detected portion of the first user in the 3D environment; and generating the collaboration area based on the boundary.

5. The method of claim 1, wherein determining the collaboration area comprises:

determining, based on the depth data, a plane associated with the 3D environment;

receiving, from the first user, a selection of a location;

generating the collaboration area based on the location and the plane;

receiving, via one or more input devices, one or more interactions by the first user; and modifying at least one of a size or a position of the collaboration area based on the one or more interactions.

6. The method of claim 1, wherein determining the collaboration area comprises:

detecting the at least one automatically detected portion of the first user in the image data;

determining a mapping between the at least one automatically detected portion of the first user in the image data and the depth data; and generating the collaboration area based on the mapping.

7. The method of claim 1, wherein the collaboration area is a 3D region around the at least one automatically detected portion of the first user and one or more objects within the 3D environment.

8. The method of claim 1, further comprising displaying, via a display device associated with the host device, an indication that image data associated with at least a portion of the collaboration area needs to be captured via the one or more image sensors.

9. The method of claim 1, wherein generating the first 3D representation comprises:

generating, based on the depth data, one or more 3D meshes, wherein each 3D mesh included in the one or more 3D meshes comprises a set of vertices and a set of faces formed from edges between pairs of vertices in the set of vertices;

determining one or more vertices and one or more faces included in the one or more 3D meshes that are within the collaboration area; and determining one or more textures associated with the one or more faces based on the image data.

10. The method of claim 1, further comprising:

generating a 3D background associated with a portion of the 3D environment that is outside the collaboration area; and transmitting, to the remote device, the 3D background for rendering in the first XR environment.

11. The method of claim 1, further comprising:

receiving, from the one or more depth sensors, additional depth data associated with the 3D environment;

receiving, from the one or more image sensors, additional image data associated with the 3D environment;

determining, based on the additional depth data, changes in one or more geometries within the collaboration area; and generating a second 3D representation of the first user based on the additional depth data, the additional image data, and the collaboration area; and transmitting, to the remote device, the second 3D representation for rendering in the first XR environment.

12. The method of claim 1, further comprising:

detecting, based on at least one of the depth data or the image data, a third user within the 3D environment;

determining another collaboration area around at least a portion of the third user in the 3D environment;

generating a third 3D representation of the at least a portion of the third user based on the depth data, the image data, and the another collaboration area; and transmitting, to the remote device, the third 3D representation for rendering in the first XR environment.

13. One or more non-transitory computer-readable media storing program instructions that, when executed by at least one processor, cause the at least one processor to perform the steps of:

initiating a remote conference session;

receiving, from one or more depth sensors associated with a host device, depth data associated with a three-dimensional (3D) environment;

receiving, from one or more image sensors associated with the host device, image data associated with the 3D environment;

determining a collaboration area around at least one automatically detected portion of a first user in the 3D environment, wherein the collaboration area is at least one of (i) a predefined 3D shape encompassing the at least one automatically detected portion of the first user, or (ii) determined based on a boundary of the at least one automatically detected portion of the first user, and wherein the at least one automatically detected portion can be moved or re-sized responsive to user interaction to control a size or location of the collaboration area;

generating a first 3D representation of the at least one automatically detected portion of the first user based on the depth data, the image data, and the collaboration area; and transmitting, to a remote device, the first 3D representation for rendering in a first extended reality (XR) environment associated with the remote conference session.

14. The one or more non-transitory computer-readable media of claim 13, the steps further comprising:

receiving a second 3D representation of at least a portion of a second user; and rendering, in a second XR environment associated with the remote conference session, the second 3D representation of the at least a portion of the second user.

15. The one or more non-transitory computer-readable media of claim 13, wherein determining the collaboration area comprises:

detecting, based on at least one of a machine learning model or a saliency model and at least one of the depth data or the image data, the boundary of the at least one automatically detected portion of the first user in the 3D environment; and generating the collaboration area based on the boundary.

16. The one or more non-transitory computer-readable media of claim 13, wherein determining the collaboration area comprises:

determining, based on the depth data, a plane associated with the 3D environment;

receiving, from the first user, a selection of a location;

generating the collaboration area based on the location and the plane;

receiving, via one or more input devices, one or more interactions by the first user; and modifying at least one of a size or a position of the collaboration area based on the one or more interactions.

17. The one or more non-transitory computer-readable media of claim 13, wherein the collaboration area is a 3D region around the at least one automatically detected portion of the first user and one or more objects within the 3D environment.

18. The one or more non-transitory computer-readable media of claim 13, wherein generating the first 3D representation comprises:
   generating, based on the depth data, one or more 3D meshes, wherein each 3D mesh included in the one or more 3D meshes comprises a set of vertices and a set of faces formed from edges between pairs of vertices in the set of vertices;
   determining one or more vertices and one or more faces included in the one or more 3D meshes that are within the collaboration area; and
   determining one or more textures associated with the one or more faces based on the image data.

19. The one or more non-transitory computer-readable media of claim 13, the steps further comprising:
   generating a two-dimensional (2D) or 3D background associated with a portion of the 3D environment that is outside the collaboration area; and
   transmitting, to the remote device, the 2D or 3D background for rendering in the first XR environment.

20. A system, comprising:
   one or more memories storing instructions; and
   one or more processors that are coupled to the one or more memories and, when executing the instructions, are configured to:
   initiate a remote conference session,
   receive, from one or more depth sensors associated with a host device, depth data associated with a three-dimensional (3D) environment, receive, from one or more image sensors associated with the host device, image data associated with the 3D environment,
   determine a collaboration area around at least one automatically detected portion of a first user in the 3D environment, wherein the collaboration area is at least one of (i) a predefined 3D shape encompassing the at least one automatically detected portion of the first user, or (ii) determined based on a boundary of the at least one automatically detected portion of the first user, and wherein the at least one automatically detected portion can be moved or re-sized responsive to user interaction to control a size or location of the collaboration area,
   generate a first 3D representation of the at least one automatically detected portion of the first user based on the depth data, the image data, and the collaboration area, and
   transmit, to a remote device, the first 3D representation for rendering in a first extended reality (XR) environment associated with the remote conference session.

* * * * *